United States Patent
Son et al.

(10) Patent No.: US 11,356,947 B2
(45) Date of Patent: Jun. 7, 2022

(54) WIRELESS COMMUNICATION METHOD AND WIRELESS COMMUNICATION TERMINAL, WHICH USE DISCONTINUOUS CHANNEL

(71) Applicants: WILUS INSTITUTE OF STANDARDS AND TECHNOLOGY INC., Gyeonggi-do (KR); SK TELECOM CO., LTD., Seoul (KR)

(72) Inventors: Juhyung Son, Gyeonggi-do (KR); Jinsam Kwak, Gyeonggi-do (KR); Geonjung Ko, Gyeonggi-do (KR); Woojin Ahn, Seoul (KR)

(73) Assignees: WILUS INSTITUTE OF STANDARDS AND TECHNOLOGY INC., Gyeonggi-Do (KR); SK TELECOM CO., LTD., Seoul (KR)

( * ) Notice: Subject to any disclaimer, the term of this patent is extended or adjusted under 35 U.S.C. 154(b) by 38 days.

(21) Appl. No.: 16/868,536

(22) Filed: May 7, 2020

(65) Prior Publication Data
US 2020/0267654 A1    Aug. 20, 2020

Related U.S. Application Data

(63) Continuation of application No. 16/016,520, filed on Jun. 22, 2018, now Pat. No. 10,687,281, which is a
(Continued)

(30) Foreign Application Priority Data

Dec. 24, 2015  (KR) .................. 10-2015-0186871
Jan. 13, 2016  (KR) .................. 10-2016-0004471
(Continued)

(51) Int. Cl.
*H04W 52/02* (2009.01)
*H04W 74/08* (2009.01)
(Continued)

(52) U.S. Cl.
CPC .......... *H04W 52/0229* (2013.01); *H04L 1/00* (2013.01); *H04L 5/0041* (2013.01);
(Continued)

(58) Field of Classification Search
CPC .......... H04W 52/0229; H04W 72/042; H04W 74/00; H04W 74/08; H04W 84/12;
(Continued)

(56) References Cited

U.S. PATENT DOCUMENTS 8,582,592 B2    11/2013  Gorokhov et al.
10,219,271 B1*   2/2019  Hedayat ............... H04L 5/0055
(Continued)

FOREIGN PATENT DOCUMENTS

CN    102835061    12/2012
CN    104995982    10/2015
(Continued)

OTHER PUBLICATIONS

International Search Report for PCT/KR2016/015297 dated Apr. 13, 2017 and its English translation from WIPO (published as WO 2017/111567).
(Continued)

*Primary Examiner* — Ricky Q Ngo
*Assistant Examiner* — Stephen N Steiner
(74) *Attorney, Agent, or Firm* — Ladas & Parry, LLP

(57) ABSTRACT

The present invention relates to a wireless communication method and a wireless communication terminal using a non-contiguous channel. To this end, provided are a wireless communication terminal including a processor and a transceiver, wherein the processor receives a wireless packet
(Continued)

through the communication unit, obtains total bandwidth information indicated via a bandwidth field of HE-SIG-A of the received packet, obtains information of an unassigned resource unit via at least one of the bandwidth field of the HE-SIG-A and a subfield of HE-SIG-B of the received packet, and decodes the received packet based on the total bandwidth information and the information of the unassigned resource unit and a wireless communication method using the same.

16 Claims, 32 Drawing Sheets

Related U.S. Application Data continuation of application No. PCT/KR2016/015297, filed on Dec. 26, 2016.

(30) Foreign Application Priority Data

| | | |
|---|---|---|
| Jan. 18, 2016 | (KR) | 10-2016-0005835 |
| Mar. 4, 2016 | (KR) | 10-2016-0026683 |
| Mar. 13, 2016 | (KR) | 10-2016-0030006 |
| May 14, 2016 | (KR) | 10-2016-0059182 |
| May 20, 2016 | (KR) | 10-2016-0062422 |
| Jul. 1, 2016 | (KR) | 10-2016-0083756 |

(51) Int. Cl.

| | |
|---|---|
| *H04W 84/12* | (2009.01) |
| *H04L 27/26* | (2006.01) |
| *H04L 5/00* | (2006.01) |
| *H04L 29/08* | (2006.01) |
| *H04W 74/00* | (2009.01) |
| *H04L 1/00* | (2006.01) |
| *H04W 72/04* | (2009.01) |
| *H04L 65/40* | (2022.01) |

(52) U.S. Cl.
CPC ............ *H04L 5/0094* (2013.01); *H04L 27/26* (2013.01); *H04L 29/08* (2013.01); *H04W 72/042* (2013.01); *H04W 74/00* (2013.01); *H04W 74/08* (2013.01); *H04W 84/12* (2013.01); *H04L 5/0007* (2013.01); *H04W 72/0453* (2013.01); *Y02D 30/70* (2020.08)

(58) Field of Classification Search
CPC .... H04W 72/0453; H04L 1/00; H04L 5/0041; H04L 5/0094; H04L 27/26; H04L 29/08; H04L 5/0007; Y02D 30/70
See application file for complete search history.

(56) References Cited

U.S. PATENT DOCUMENTS

| | | | |
|---|---|---|---|
| 2015/0334708 A1 | 11/2015 | Lee et al. | |
| 2015/0349995 A1 | 12/2015 | Zhang et al. | |
| 2016/0330058 A1* | 11/2016 | Chen | H04L 27/2602 |
| 2016/0366666 A1* | 12/2016 | Yang | H04W 72/042 |
| 2017/0006608 A1* | 1/2017 | Josiam | H04L 5/0023 |
| 2017/0041929 A1* | 2/2017 | Noh | H04L 5/0007 |
| 2018/0302858 A1 | 10/2018 | Son et al. | |
| 2019/0124657 A1 | 4/2019 | Kim et al. | |

FOREIGN PATENT DOCUMENTS

| | | |
|---|---|---|
| CN | 105120520 | 12/2015 |
| CN | 105122754 | 12/2015 |
| CN | 105165055 | 12/2015 |
| JP | 2014-511651 | 5/2014 |
| JP | 2015-527780 | 9/2015 |
| KR | 10-2012-0097514 | 9/2012 |
| KR | 10-2014-0070528 | 6/2014 |
| KR | 10-2015-0035569 | 4/2015 |
| KR | 10-2015-0044875 | 4/2015 |
| KR | 10-2015-0143748 | 12/2015 |
| WO | 2015/119374 | 8/2015 |
| WO | 2017/111567 | 6/2017 |

OTHER PUBLICATIONS

Written Opinion of the International Searching Authority for PCT/KR2016/015297 dated Apr. 13, 2017 and its English from WIPO (published as WO 2017/111567).
International Preliminary Report on Patentability for PCT/KR2016/015297 dated Jun. 26, 2018 and its English translation from WIPO (published as WO 2017/111567).
Office Action dated June 11, 2019 for Japanese Patent Application No. 2018-553036 and its English translation provided by Applicant's foreign council.
Communication dated Jun. 24, 2019 for EP Application No. 16879434.5.
Robert Stacey, "Specification Framework for TGax", doc.: IEEE 802.11-15/0132r13, Dec. 7, 2015, pp. 1-38.
Sungho Moon, et al., "Supported Resource Allocations in SIG-B", doc.: IEEE 802.11-15/1304r1, Nov. 9, 2015, slides 1-15.
Katsuo Yunoki, et al., "Considerations on HE-SIG-A/B", doc.: IEEE 802.11-15/827r2, Jul. 15, 2015, slides 1-14.
Young Hoon Kwon, et al., "SIG-B Field for HEW PPDU", doc.: IEEE 802.11-15/0805r2, Jul. 13, 2015, slides 1-11.
Notice of Allowance dated Feb. 5, 2020 for U.S. Appl. No. 16/016,520 (now published as U.S. 2018/0302858).
Non-Final Office Action dated Sep. 27, 2019 for U.S. Appl. No. 16/016,520 (now published as U.S. 2018/0302858).
Office Action dated Aug. 11, 2020 for Japanese Patent Application No. 2019-193365 and its English translation provided by Applicant's foreign counsel.
Shahrnaz Azizi et al.: "OFDMA Numerology and Structure", IEEE 802.11-15/0330r5, Mar. 13, 2015, slides 1-50.
Notice of Allowance dated Oct. 1, 2020 for European Patent Application No. 16 879 434.5.
Office Action dated Nov. 27, 2020 for Korean Patent Application No. 10-2020-7021451 and its English translation provided by Applicant's foreign counsel.
Office Action dated Nov. 27, 2020 for Korean Patent Application No. 10-2020-7021450 and its English translation provided by Applicant's foreign counsel.
Extended European Search Report dated Apr. 8, 2021 for European Patent Application No. 21155498.5.
Young Hoon Kwon et al.: "SIG Field Design Principle for 1 lax", IEEE 802.11-15/0344R2, Mar. 9, 2015, see slides 1-18.
Notice of Allowance dated May 11, 2020 for European Patent Application No. 16879434.5.
Office Action dated Jul. 6, 2020 for Indian Patent Application No. 201827026123.
Office Action dated Jun. 30, 2020 for Chinese Patent Application No. 201680076119.4 and its English translation provided by Applicant's foreign counsel.
Chai et al. "A Novel Time Interpolation Channel Estimation for IEEE802.11ac System", 2015, IEEE Xplore (SIG and IEEE802.11), pp. 722-725.
Office Action dated Sep. 17, 2021 for U.S. Appl. No. 16/868,525.
Office Action dated Mar. 11, 2022 for U.S. Appl. No. 16/868,525.

* cited by examiner

| L-STF | L-LTF | L-SIG | RL-SIG | HE-SIG-A | HE-SIG-B | HE-STF | HE-LTF | ... | A-MPDU |

(a)

| Field | Bit | Descriptions |
|---|---|---|
| UL/DL | 1 | SU(x)/Trigger(o) |
| Format | 1 | |
| BSS Color | 6 | BSS identification information |
| Spatial Reuse | 4 | |
| TXOP Duration | 7 | |
| Bandwidth | 2 | 20/40/80/160 |
| MCS | 4 | |
| CP+LTF Size | 3 | 1x_LTF+0.8us_CP<br>2x_LTF+0.8us_CP<br>2x_LTF+1.6us_CP<br>4x_LTF+3.2us_CP<br>TBD |
| Coding | 2 | BCC/LDPC, LDPC Extra SYM |
| NSTS | 3 | 1~8 |
| STBC | 1 | on/off |
| TxBF | 1 | on/off |
| DCM | 1 | Dual carrier modulation |
| Packet Extension | 3 | a-factor, PE dis-ambiguity |
| Beam Change | 1 | |
| Doppler | 1 | |
| Reserved | 1 | |
| CRC | 4 | |
| Tail | 6 | |
| Total | 52 | |

(b)

| Field | Bit | Descriptions |
|---|---|---|
| UL/DL | 1 | UL |
| BSS Color | 6 | BSS identification information |
| Spatial Reuse | 4 | |
| TXOP Duration | 7 | |
| Bandwidth | 3 | 20/40/80/160/non-contiguous |
| SIG-B MCS | 3 | MCS0~MCS5 |
| CP+LTF Size | 3 | 4x_LTF+0.8us_CP<br>2x_LTF+0.8us_CP<br>2x_LTF+1.6us_CP<br>4x_LTF+3.2us_CP |
| LDPC Extra SYM | 1 | |
| Number of HE-LTF symbols | 3 | 1, 2, 4, 6, 8 |
| SIG-B Compression | 1 | |
| SIG-B DCM | 1 | Dual carrier modulation |
| Packet Extension | 3 | a-factor, PE dis-ambiguity |
| Number of HE-SIG-B symbols | 4 | |
| Doppler | 1 | |
| Reserved | 1 | |
| CRC | 4 | |
| Tail | 6 | |
| Total | 52 | |

(c)

| Field | Bit | Descriptions |
|---|---|---|
| Format | 1 | SU(x)/Trigger(o) |
| BSS Color | 6 | BSS identification information |
| Spatial Reuse (1~4) | 16 | Per 20 MHz |
| TXOP Duration | 7 | |
| Bandwidth | 2 | 20/40/80/160 |
| Reserved | 1 | |
| CRC | 4 | |
| Tail | 6 | |
| Total | 43 | |

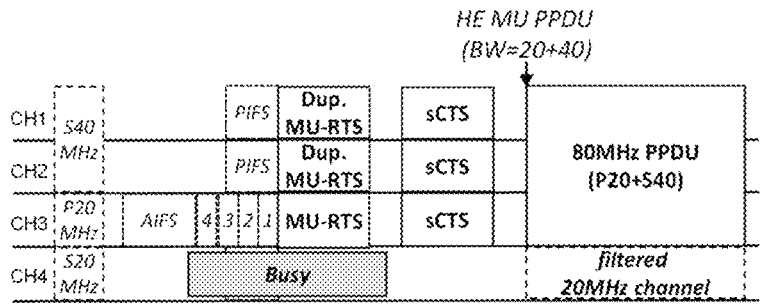
(a)
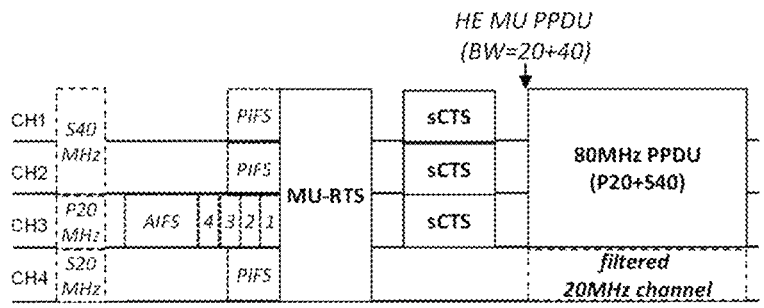
(b)
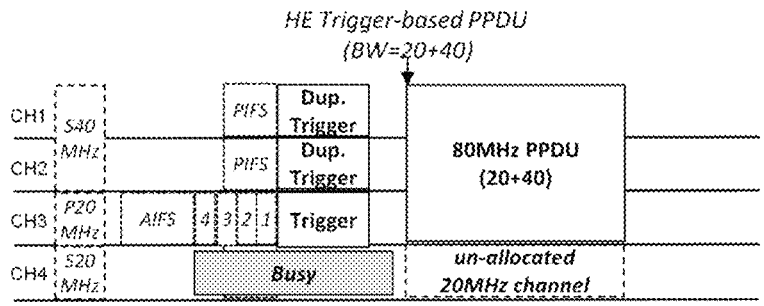
(c)
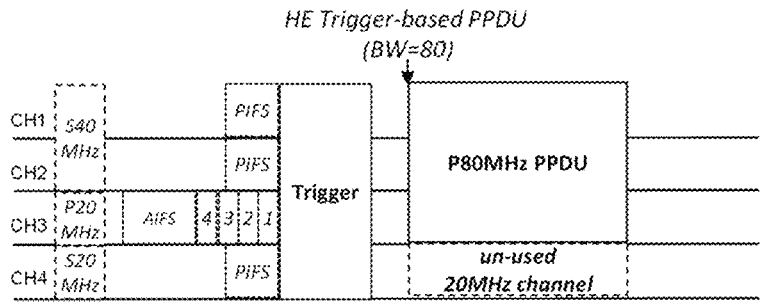
(d)
*FIG. 21*

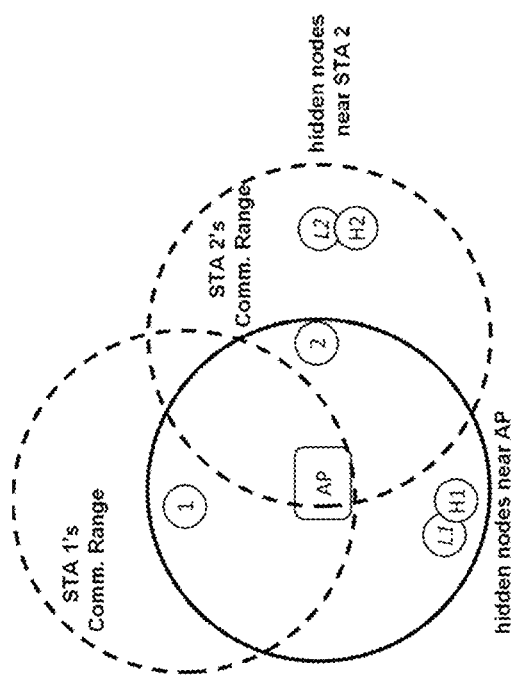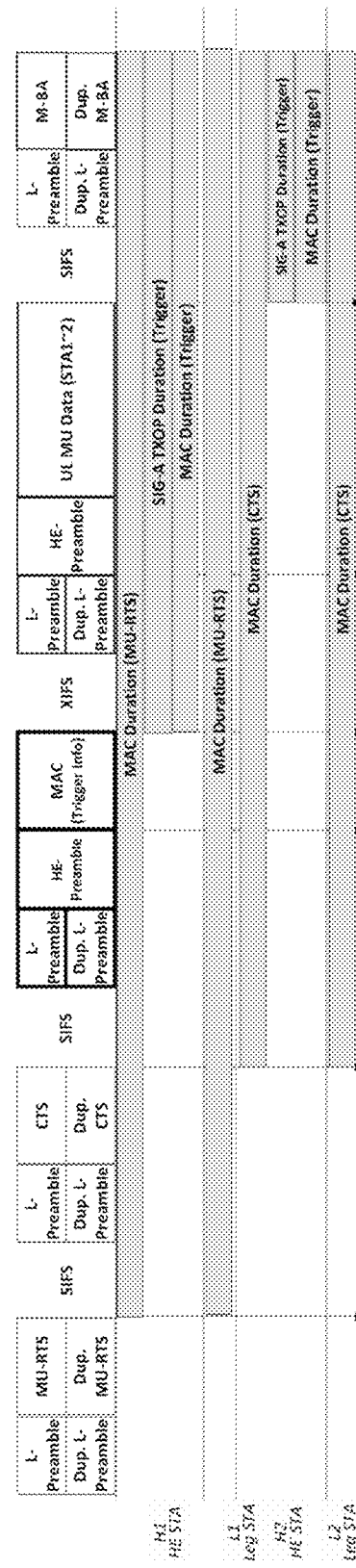
FIG. 24

WIRELESS COMMUNICATION METHOD AND WIRELESS COMMUNICATION TERMINAL, WHICH USE DISCONTINUOUS CHANNEL

CROSS-REFERENCE TO RELATED APPLICATIONS

This application is a continuation of U.S. patent application Ser. No. 16/016,520 filed on Jun. 22, 2018, which is a continuation of the International Patent Application No. PCT/KR2016/015297 filed on Dec. 26, 2016, which claims the priority to Korean Patent Application No. 10-2015-0186871 filed in the Korean Intellectual Property Office on Dec. 24, 2015, Korean Patent Application No. 10-2016-0004471 filed in the Korean Intellectual Property Office on Jan. 13, 2016, Korean Patent Application No. 10-2016-0005835 filed in the Korean Intellectual Property Office on Jan. 18, 2016, Korean Patent Application No. 10-2016-0026683 filed in the Korean Intellectual Property Office on Mar. 4, 2016, Korean Patent Application No. 10-2016-0030006 filed in the Korean Intellectual Property Office on Mar. 13, 2016, Korean Patent Application No. 10-2016-0059182 filed in the Korean Intellectual Property Office on May 14, 2016, Korean Patent Application No. 10-2016-0062422 filed in the Korean Intellectual Property Office on May 20, 2016, and Korean Patent Application No. 10-2016-0083756 filed in the Korean Intellectual Property Office on Jul. 1, 2016, the entire contents of which are incorporated herein by reference.

TECHNICAL FIELD

The present invention relates to a wireless communication method and a wireless communication terminal which use non-contiguous channel, and more particularly, to a wireless communication method and a wireless communication terminal for efficiently signaling non-contiguous channel allocation information.

BACKGROUND ART

In recent years, with supply expansion of mobile apparatuses, a wireless LAN technology that can provide a rapid wireless Internet service to the mobile apparatuses has been significantly spotlighted. The wireless LAN technology allows mobile apparatuses including a smart phone, a smart pad, a laptop computer, a portable multimedia player, an embedded apparatus, and the like to wirelessly access the Internet in home or a company or a specific service providing area based on a wireless communication technology in a short range.

Institute of Electrical and Electronics Engineers (IEEE) 802.11 has commercialized or developed various technological standards since an initial wireless LAN technology is supported using frequencies of 2.4 GHz. First, the IEEE 802.11b supports a communication speed of a maximum of 11 Mbps while using frequencies of a 2.4 GHz band. IEEE 802.11a which is commercialized after the IEEE 802.11b uses frequencies of not the 2.4 GHz band but a 5 GHz band to reduce an influence by interference as compared with the frequencies of the 2.4 GHz band which are significantly congested and improves the communication speed up to a maximum of 54 Mbps by using an OFDM technology. However, the IEEE 802.11a has a disadvantage in that a communication distance is shorter than the IEEE 802.11b. In addition, IEEE 802.11g uses the frequencies of the 2.4 GHz band similarly to the IEEE 802.11b to implement the communication speed of a maximum of 54 Mbps and satisfies backward compatibility to significantly come into the spotlight and further, is superior to the IEEE 802.11a in terms of the communication distance.

Moreover, as a technology standard established to overcome a limitation of the communication speed which is pointed out as a weak point in a wireless LAN, IEEE 802.11n has been provided. The IEEE 802.11n aims at increasing the speed and reliability of a network and extending an operating distance of a wireless network. In more detail, the IEEE 802.11n supports a high throughput (HT) in which a data processing speed is a maximum of 540 Mbps or more and further, is based on a multiple inputs and multiple outputs (MIMO) technology in which multiple antennas are used at both sides of a transmitting unit and a receiving unit in order to minimize a transmission error and optimize a data speed. Further, the standard can use a coding scheme that transmits multiple copies which overlap with each other in order to increase data reliability.

As the supply of the wireless LAN is activated and further, applications using the wireless LAN are diversified, the need for new wireless LAN systems for supporting a higher throughput (very high throughput (VHT)) than the data processing speed supported by the IEEE 802.11n has come into the spotlight. Among them, IEEE 802.11ac supports a wide bandwidth (80 to 160 MHz) in the 5 GHz frequencies. The IEEE 802.11ac standard is defined only in the 5 GHz band, but initial 11ac chipsets will support even operations in the 2.4 GHz band for the backward compatibility with the existing 2.4 GHz band products. Theoretically, according to the standard, wireless LAN speeds of multiple stations are enabled up to a minimum of 1 Gbps and a maximum single link speed is enabled up to a minimum of 500 Mbps. This is achieved by extending concepts of a wireless interface accepted by 802.11n, such as a wider wireless frequency bandwidth (a maximum of 160 MHz), more MIMO spatial streams (a maximum of 8), multi-user MIMO, and high-density modulation (a maximum of 256 QAM). Further, as a scheme that transmits data by using a 60 GHz band instead of the existing 2.4 GHz/5 GHz, IEEE 802.11ad has been provided. The IEEE 802.11ad is a transmission standard that provides a speed of a maximum of 7 Gbps by using a beamforming technology and is suitable for high bit rate moving picture streaming such as massive data or non-compression HD video. However, since it is difficult for the 60 GHz frequency band to pass through an obstacle, it is disadvantageous in that the 60 GHz frequency band can be used only among devices in a short-distance space.

Meanwhile, in recent years, as next-generation wireless LAN standards after the 802.11ac and 802.11ad, discussion for providing a high-efficiency and high-performance wireless LAN communication technology in a high-density environment is continuously performed. That is, in a next-generation wireless LAN environment, communication having high frequency efficiency needs to be provided indoors/outdoors under the presence of high-density stations and access points (APs) and various technologies for implementing the communication are required.

DISCLOSURE

Technical Problem

The present invention has an object to provide high-efficiency/high-performance wireless LAN communication in a high-density environment as described above.

Technical Solution

In order to achieve the objects, the present invention provides a wireless communication method and a wireless communication terminal as below.

First, an exemplary embodiment of the present invention provides a wireless communication terminal, the terminal including: a processor; and a communication unit, wherein the processor receives a wireless packet through the communication unit, obtains non-contiguous channel allocation information of the received packet, and decodes the received packet based on the obtained non-contiguous channel allocation information.

In addition, an exemplary embodiment of the present invention provides a wireless communication method of a wireless communication terminal, including: receiving a wireless packet; obtaining non-contiguous channel allocation information of the received packet; and decoding the received packet based on the obtained non-contiguous channel allocation information.

Another exemplary embodiment of the present invention provides a base wireless communication terminal, the terminal including: a processor; and a communication unit, wherein the processor performs a CCA of multiple channels for a wideband packet transmission, and transmits a packet through at least one channel which is idle based on a result of performing the CCA of multiple channels, wherein when the packet is transmitted through a non-contiguous channel, the processor signals non-contiguous channel allocation information via a non-legacy preamble of the packet.

In addition, another exemplary embodiment of the present invention provides a wireless communication method of a base wireless communication terminal, including: performing a CCA of multiple channels for a wideband packet transmission, and transmitting a packet through at least one channel which is idle based on a result of performing the CCA of multiple channels, wherein when the packet is transmitted through a non-contiguous channel, non-contiguous channel allocation information is signaled via a non-legacy preamble of the packet.

The non-contiguous channel allocation information may be indicated via at least one of a subfield of HE-SIG-A and a subfield of HE-SIG-B of the received packet.

The non-contiguous channel allocation information may indicate unassigned channel information in units of 20 MHz.

The non-contiguous channel allocation information may be indicated via a bandwidth field of the HE-SIG-A, and the bandwidth field may indicate total bandwidth information through which the packet is transmitted, and channel information to be punctured within the total bandwidth.

The bandwidth field may index puncturing of a secondary 20 MHz channel and puncturing of at least one of two 20 MHz channels in a secondary 40 MHz channel, respectively.

The non-contiguous channel allocation information may be indicated through a predetermined index of a resource unit allocation field of the HE-SIG-B.

The resource unit allocation field may indicate a specific resource unit (RU) not assigned to a user through a predetermined index.

The specific resource unit not assigned to a user may be at least one of a 242-tone resource unit, a 484-tone resource unit, and a 996-tone resource unit.

The non-contiguous channel allocation information may be obtained through resource unit arrangement information indicated by the resource unit allocation field of the HE-SIG-B and a Null STA ID contained in a user field corresponding to a specific resource unit in the resource unit arrangement.

The specific resource unit may be at least one of a 26-tone resource unit, a 52-tone resource unit, and a 106-tone resource unit.

The non-contiguous channel allocation information may be indicated via a combination of a bandwidth field of the HE-SIG-A and a resource unit allocation field of the HE-SIG-B.

The bandwidth field may indicate total bandwidth information through which the packet is transmitted and channel information to be punctured within the total bandwidth, and the resource unit allocation field may indicate additional puncturing information within the total bandwidth.

When the bandwidth field indicates puncturing of one of two 20 MHz channels in a secondary 40 MHz channel in a total bandwidth of 80 MHz, the resource unit allocation field may indicate which 20 MHz channel in the secondary 40 MHz channel is punctured.

When the bandwidth field indicates puncturing of a secondary 20 MHz channel in a total bandwidth of 160 MHz or 80+80 MHz, the resource unit allocation field may indicate additional puncturing in a secondary 80 MHz channel.

When the bandwidth field indicates puncturing of at least one of two 20 MHz channels in a secondary 40 MHz channel in a total bandwidth of 160 MHz or 80+80 MHz, the resource unit allocation field may indicate which 20 MHz channel in the secondary 40 MHz channel is punctured.

When the bandwidth field indicates puncturing of at least one of two 20 MHz channels in a secondary 40 MHz channel in a total bandwidth of 160 MHz or 80+80 MHz, the resource unit allocation field may indicate additional puncturing in a secondary 80 MHz channel.

When the packet is transmitted in a total bandwidth of 80 MHz or more, the non-contiguous channel allocation information may further include information of a field (C26 field) indicating whether a user is allocated to a center 26-tone resource unit of 80 MHz.

An HE-SIG-B field of the packet may consist of HE-SIG-B content channel 1 and HE-SIG-B content channel 2 in units of 20 MHz, and the C26 field may be carried in both the HE-SIG-B content channel 1 and the HE-SIG-B content channel 2.

When the packet is transmitted in a total bandwidth of 80 MHz, both of a C26 field carried in the HE-SIG-B content channel 1 and a C26 field carried in the HE-SIG-B content channel 2 may indicate whether a user is allocated to a center 26-tone resource unit in the total bandwidth of 80 MHz.

When the C26 field indicates assignment of the center 26-tone resource unit, the user field corresponding to the center 26-tone resource unit may be carried in a user specific field of the HE-SIG-B content channel 1.

When the packet is transmitted in a total bandwidth of 160 MHz or 80+80 MHz, the total bandwidth may consist of a first 80 MHz bandwidth and a second 80 MHz bandwidth, a first C26 field carried in the HE-SIG-B content channel 1 may indicate whether a user is allocated to a first center 26-tone resource unit in the first 80 MHz bandwidth, and a second C26 field carried in the HE-SIG-B content channel 2 may indicate whether a user is allocated to a second center 26-tone resource unit in the second 80 MHz bandwidth.

When the first C26 field indicates assignment of the first center 26-tone resource unit, a user field corresponding to the first center 26-tone resource unit may be carried in a user specific field of the HE-SIG-B content channel 1, and when the second C26 field indicates assignment of the second center 26-tone resource unit, a user field corresponding to the second center 26-tone resource unit may be carried in a user specific field of the HE-SIG-B content channel 2.

Advantageous Effects

According to the embodiment of the present invention, non-contiguous channel allocation information can be efficiently signaled.

According to an embodiment of the present invention, it is possible to increase the total resource utilization rate in the contention-based channel access system and improve the performance of the wireless LAN system.

DESCRIPTION OF DRAWINGS

FIG. 14 illustrates an embodiment of a configuration of an HE-SIG-A field according to the HE PPDU format.

FIG. 15 illustrates a configuration of an HE-SIG-B field according to an embodiment of the present invention.

FIGS. 21 to 23 illustrate transmission sequences of a non-contiguous PPDU according to embodiments of the present invention.

FIG. 24 illustrates a method of setting a TXOP of an MU transmission process as an additional embodiment of the present invention.

DETAILED DESCRIPTION OF THE INVENTION

Terms used in the specification adopt general terms which are currently widely used by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it should be revealed that a term used in the specification should be analyzed based on not just a name of the term but a substantial meaning of the term and contents throughout the specification.

Throughout this specification and the claims that follow, when it is described that an element is "coupled" to another element, the element may be "directly coupled" to the other element or "electrically coupled" to the other element through a third element. Further, unless explicitly described to the contrary, the word "comprise" and variations such as "comprises" or "comprising", will be understood to imply the inclusion of stated elements but not the exclusion of any other elements. Moreover, limitations such as "or more" or "or less" based on a specific threshold may be appropriately substituted with "more than" or "less than", respectively.

This application claims priority to and the benefit of Korean Patent Application Nos. 10-2015-0186871, 10-2016-0004471, 10-2016-0005835, 10-2016-0026683, 10-2016-00300006, 10-2016-0059182, 10-2016-0062422 and 10-2016-0083756 filed in the Korean Intellectual Property Office and the embodiments and mentioned items described in the respective application, which forms the basis of the priority, shall be included in the Detailed Description of the present application.

Figure 1:
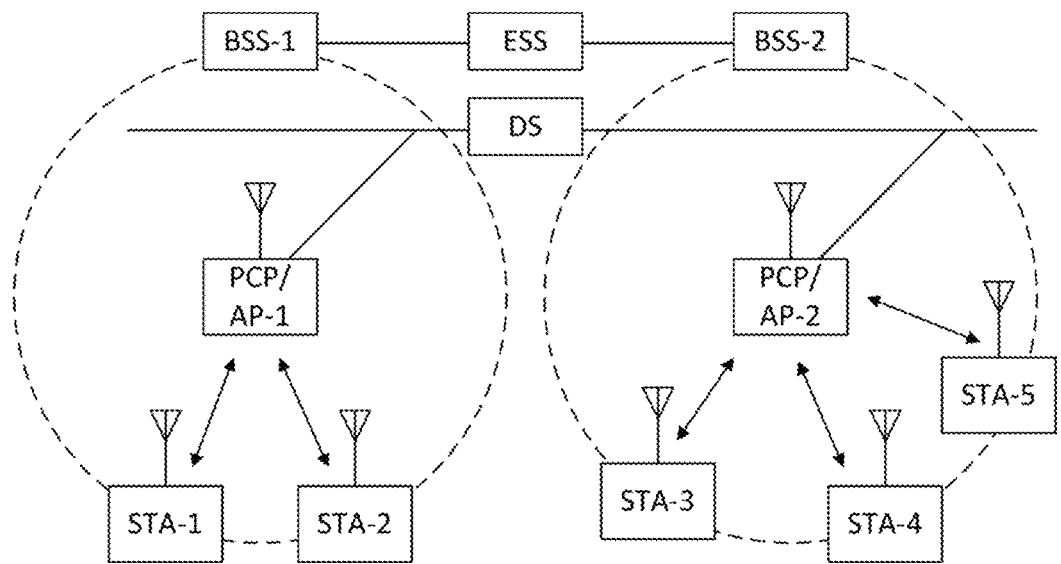
FIG. 1 illustrates a wireless LAN system according to an embodiment of the present invention.

FIG. 1 is a diagram illustrating a wireless LAN system according to an embodiment of the present invention. The wireless LAN system includes one or more basic service sets (BSS) and the BSS represents a set of apparatuses which are successfully synchronized with each other to communicate with each other. In general, the BSS may be classified into an infrastructure BSS and an independent BSS (IBSS) and FIG. 1 illustrates the infrastructure BSS between them.

As illustrated in FIG. 1, the infrastructure BSS (BSS1 and BSS2) includes one or more stations STA1, STA2, STA3, STA4, and STA5, access points PCP/AP-1 and PCP/AP-2 which are stations providing a distribution service, and a distribution system (DS) connecting the multiple access points PCP/AP-1 and PCP/AP-2.

The station (STA) is a predetermined device including medium access control (MAC) following a regulation of an IEEE 802.11 standard and a physical layer interface for a wireless medium, and includes both a non-access point (non-AP) station and an access point (AP) in a broad sense. Further, in the present specification, a term 'terminal' may be used to refer to a non-AP STA, or an AP, or to both terms. A station for wireless communication includes a processor and a communication unit and according to the embodiment, may further include a user interface unit and a display unit. The processor may generate a frame to be transmitted through a wireless network or process a frame received through the wireless network and besides, perform various processing for controlling the station. In addition, the communication unit is functionally connected with the processor and transmits and receives frames through the wireless network for the station. According to the present invention, a terminal may be used as a term which includes user equipment (UE).

The access point (AP) is an entity that provides access to the distribution system (DS) via wireless medium for the station associated therewith. In the infrastructure BSS, communication among non-AP stations is, in principle, performed via the AP, but when a direct link is configured, direct communication is enabled even among the non-AP stations. Meanwhile, in the present invention, the AP is used as a concept including a personal BSS coordination point (PCP) and may include concepts including a centralized controller, a base station (BS), a node-B, a base transceiver system (BTS), and a site controller in a broad sense. In the present invention, an AP may also be referred to as a base wireless communication terminal. The base wireless communication terminal may be used as a term which includes an AP, a base station, an eNB (i.e. eNodeB) and a transmission point (TP) in a broad sense. In addition, the base wireless communication terminal may include various types of wireless communication terminals that allocate medium resources and perform scheduling in communication with a plurality of wireless communication terminals.

A plurality of infrastructure BSSs may be connected with each other through the distribution system (DS). In this case, a plurality of BSSs connected through the distribution system is referred to as an extended service set (ESS).

Figure 2:
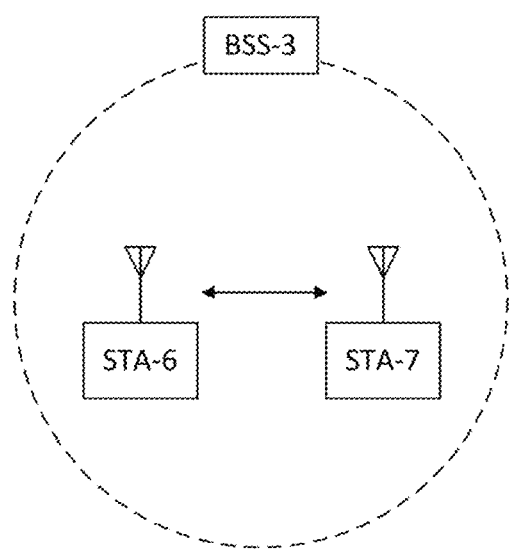
FIG. 2 illustrates a wireless LAN system according to another embodiment of the present invention.

FIG. 2 illustrates an independent BSS which is a wireless LAN system according to another embodiment of the present invention. In the embodiment of FIG. 2, duplicative description of parts, which are the same as or correspond to the embodiment of FIG. 1, will be omitted.

Since a BSS3 illustrated in FIG. 2 is the independent BSS and does not include the AP, all stations STA6 and STAT are not connected with the AP. The independent BSS is not permitted to access the distribution system and forms a self-contained network. In the independent BSS, the respective stations STA6 and STAT may be directly connected with each other.

Figure 3:
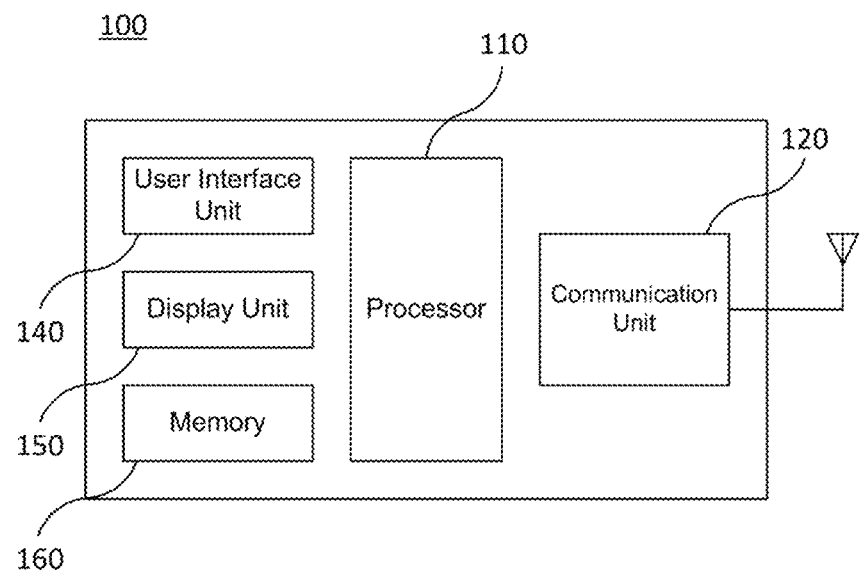
FIG. 3 illustrates a configuration of a station according to an embodiment of the present invention.

FIG. 3 is a block diagram illustrating a configuration of a station 100 according to an embodiment of the present invention. As illustrated in FIG. 3, the station 100 according to the embodiment of the present invention may include a processor 110, a communication unit 120, a user interface unit 140, a display unit 150, and a memory 160.

First, the communication unit 120 transmits and receives a wireless signal such as a wireless LAN packet, or the like and may be embedded in the station 100 or provided as an exterior. According to the embodiment, the communication unit 120 may include at least one communication module using different frequency bands. For example, the communication unit 120 may include communication modules having different frequency bands such as 2.4 GHz, 5 GHz, and 60 GHz. According to an embodiment, the station 100 may include a communication module using a frequency band of 6 GHz or more and a communication module using a frequency band of 6 GHz or less. The respective communication modules may perform wireless communication with the AP or an external station according to a wireless LAN standard of a frequency band supported by the corresponding communication module. The communication unit 120 may operate only one communication module at a time or simultaneously operate multiple communication modules together according to the performance and requirements of the station 100. When the station 100 includes a plurality of communication modules, each communication module may be implemented by independent elements or a plurality of modules may be integrated into one chip. In an embodiment of the present invention, the communication unit 120 may represent a radio frequency (RF) communication module for processing an RF signal.

Next, the user interface unit 140 includes various types of input/output means provided in the station 100. That is, the user interface unit 140 may receive a user input by using various input means and the processor 110 may control the station 100 based on the received user input. Further, the user interface unit 140 may perform output based on a command of the processor 110 by using various output means.

Next, the display unit 150 outputs an image on a display screen. The display unit 150 may output various display objects such as contents executed by the processor 110 or a user interface based on a control command of the processor 110, and the like. Further, the memory 160 stores a control program used in the station 100 and various resulting data. The control program may include an access program required for the station 100 to access the AP or the external station.

The processor 110 of the present invention may execute various commands or programs and process data in the station 100. Further, the processor 110 may control the respective units of the station 100 and control data transmission/reception among the units. According to the embodiment of the present invention, the processor 110 may execute the program for accessing the AP stored in the memory 160 and receive a communication configuration message transmitted by the AP. Further, the processor 110 may read information on a priority condition of the station 100 included in the communication configuration message and request the access to the AP based on the information on the priority condition of the station 100. The processor 110 of the present invention may represent a main control unit of the station 100 and according to the embodiment, the processor 110 may represent a control unit for individually controlling some component of the station 100, for example, the communication unit 120, and the like. That is, the processor 110 may be a modem or a modulator/demodulator for modulating and demodulating wireless signals transmitted to and received from the communication unit 120. The processor 110 controls various operations of wireless signal transmission/reception of the station 100 according to the embodiment of the present invention. A detailed embodiment thereof will be described below.

The station 100 illustrated in FIG. 3 is a block diagram according to an embodiment of the present invention, where separate blocks are illustrated as logically distinguished elements of the device. Accordingly, the elements of the device may be mounted in a single chip or multiple chips depending on design of the device. For example, the processor 110 and the communication unit 120 may be implemented while being integrated into a single chip or implemented as a separate chip. Further, in the embodiment of the present invention, some components of the station 100, for example, the user interface unit 140 and the display unit 150 may be optionally provided in the station 100.

Figure 4:
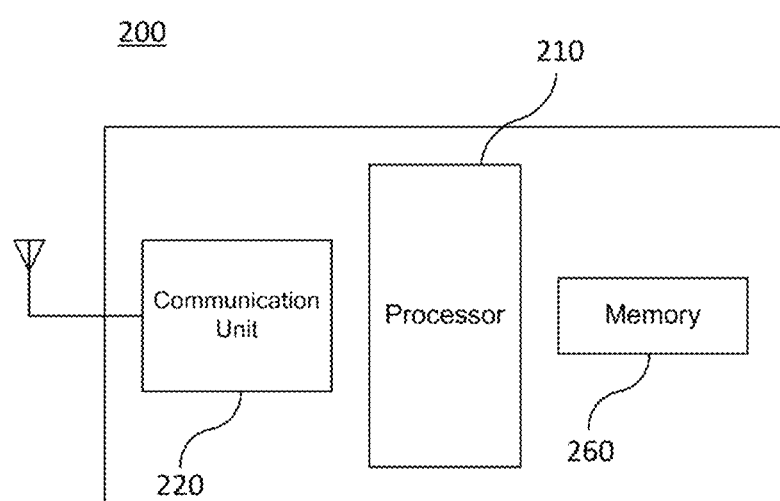
FIG. 4 illustrates a configuration of an access point according to an embodiment of the present invention.

FIG. 4 is a block diagram illustrating a configuration of an AP 200 according to an embodiment of the present invention. As illustrated in FIG. 4, the AP 200 according to the embodiment of the present invention may include a processor 210, a communication unit 220, and a memory 260. In FIG. 4, among the components of the AP 200, duplicative description of parts which are the same as or correspond to the components of the station 100 of FIG. 2 will be omitted.

Referring to FIG. 4, the AP 200 according to the present invention includes the communication unit 220 for operating the BSS in at least one frequency band. As described in the embodiment of FIG. 3, the communication unit 220 of the AP 200 may also include a plurality of communication modules using different frequency bands. That is, the AP 200 according to the embodiment of the present invention may include two or more communication modules among different frequency bands, for example, 2.4 GHz, 5 GHz, and 60 GHz together. Preferably, the AP 200 may include a communication module using a frequency band of 6 GHz or more and a communication module using a frequency band of 6 GHz or less. The respective communication modules may perform wireless communication with the station according to a wireless LAN standard of a frequency band supported by the corresponding communication module. The communication unit 220 may operate only one communication module at a time or simultaneously operate multiple communication modules together according to the performance and requirements of the AP 200. In an embodiment of the present invention, the communication unit 220 may represent a radio frequency (RF) communication module for processing an RF signal.

Next, the memory 260 stores a control program used in the AP 200 and various resulting data. The control program may include an access program for managing the access of the station. Further, the processor 210 may control the respective units of the AP 200 and control data transmission/reception among the units. According to the embodiment of the present invention, the processor 210 may execute the program for accessing the station stored in the memory 260 and transmit communication configuration messages for one or more stations. In this case, the communication configuration messages may include information about access priority conditions of the respective stations. Further, the processor 210 performs an access configuration according to an access request of the station. According to an embodiment, the processor 210 may be a modem or a modulator/demodulator for modulating and demodulating wireless signals transmitted to and received from the communication unit 220. The processor 210 controls various operations such as wireless signal transmission/reception of the AP 200 according to the embodiment of the present invention. A detailed embodiment thereof will be described below.

Figure 5:
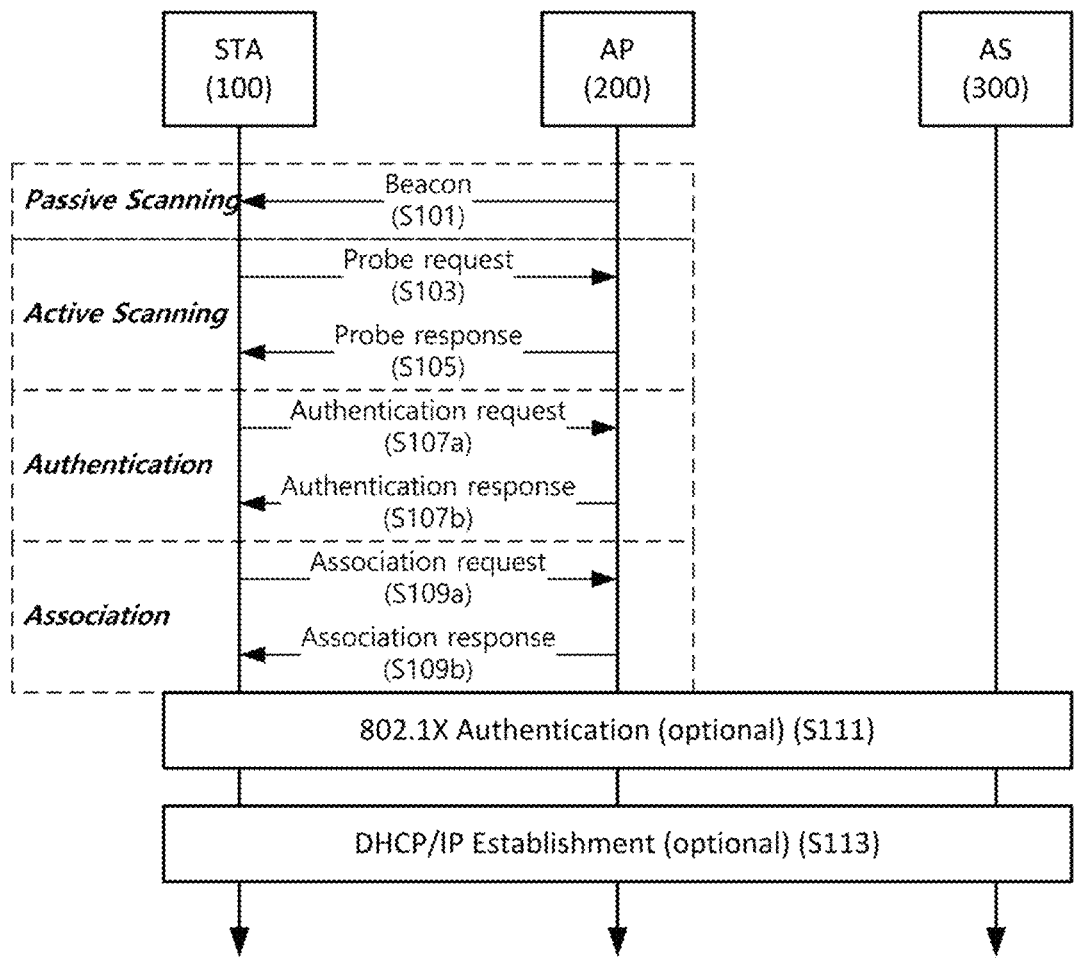
FIG. 5 schematically illustrates a process in which a STA and an AP set a link.

FIG. 5 is a diagram schematically illustrating a process in which a STA sets a link with an AP.

Referring to FIG. 5, the link between the STA 100 and the AP 200 is set through three steps of scanning, authentication, and association in a broad way. First, the scanning step is a step in which the STA 100 obtains access information of BSS operated by the AP 200. A method for performing the scanning includes a passive scanning method in which the AP 200 obtains information by using a beacon message (S101) which is periodically transmitted and an active scanning method in which the STA 100 transmits a probe request to the AP (S103) and obtains access information by receiving a probe response from the AP (S105).

The STA 100 that successfully receives wireless access information in the scanning step performs the authentication step by transmitting an authentication request (S107a) and receiving an authentication response from the AP 200 (S107b). After the authentication step is performed, the STA 100 performs the association step by transmitting an association request (S109a) and receiving an association response from the AP 200 (S109b). In this specification, an association basically means a wireless association, but the present invention is not limited thereto, and the association may include both the wireless association and a wired association in a broad sense.

Meanwhile, an 802.1X based authentication step (S111) and an IP address obtaining step (S113) through DHCP may be additionally performed. In FIG. 5, the authentication server 300 is a server that processes 802.1X based authentication with the STA 100 and may be present in physical association with the AP 200 or present as a separate server.

Figure 6:
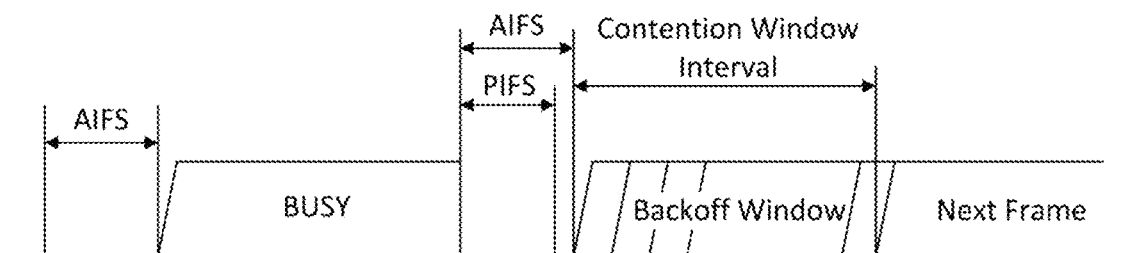
FIG. 6 illustrates a carrier sense multiple access (CSMA)/collision avoidance (CA) method used in wireless LAN communication.

FIG. 6 is a diagram illustrating a carrier sense multiple access (CSMA)/collision avoidance (CA) method used in wireless LAN communication.

A terminal that performs a wireless LAN communication checks whether a channel is busy by performing carrier sensing before transmitting data. When a wireless signal having a predetermined strength or more is sensed, it is determined that the corresponding channel is busy and the terminal delays the access to the corresponding channel. Such a process is referred to as clear channel assessment (CCA) and a level to decide whether the corresponding signal is sensed is referred to as a CCA threshold. When a wireless signal having the CCA threshold or more, which is received by the terminal, indicates the corresponding terminal as a receiver, the terminal processes the received wireless signal. Meanwhile, when a wireless signal is not sensed in the corresponding channel or a wireless signal having a strength smaller than the CCA threshold is sensed, it is determined that the channel is idle.

When it is determined that the channel is idle, each terminal having data to be transmitted performs a backoff procedure after an inter frame space (IFS) time depending on a situation of each terminal, for instance, an arbitration IFS (AIFS), a PCF IFS (PIFS), or the like elapses. According to the embodiment, the AIFS may be used as a component which substitutes for the existing DCF IFS (DIFS). Each terminal stands by while decreasing slot time(s) as long as a random number determined by the corresponding terminal during an interval of an idle state of the channel and a terminal that completely exhausts the slot time(s) attempts to access the corresponding channel. As such, an interval in which each terminal performs the backoff procedure is referred to as a contention window interval.

When a specific terminal successfully accesses the channel, the corresponding terminal may transmit data through the channel. However, when the terminal which attempts the access collides with another terminal, the terminals which collide with each other are assigned with new random numbers, respectively to perform the backoff procedure again. According to an embodiment, a random number newly assigned to each terminal may be decided within a range (2*CW) which is twice larger than a range (a contention window, CW) of a random number which the corresponding terminal is previously assigned. Meanwhile, each terminal attempts the access by performing the backoff procedure again in a next contention window interval and in this case, each terminal performs the backoff procedure from slot time(s) which remained in the previous contention window interval. By such a method, the respective terminals that perform the wireless LAN communication may avoid a mutual collision for a specific channel.

Figure 7:
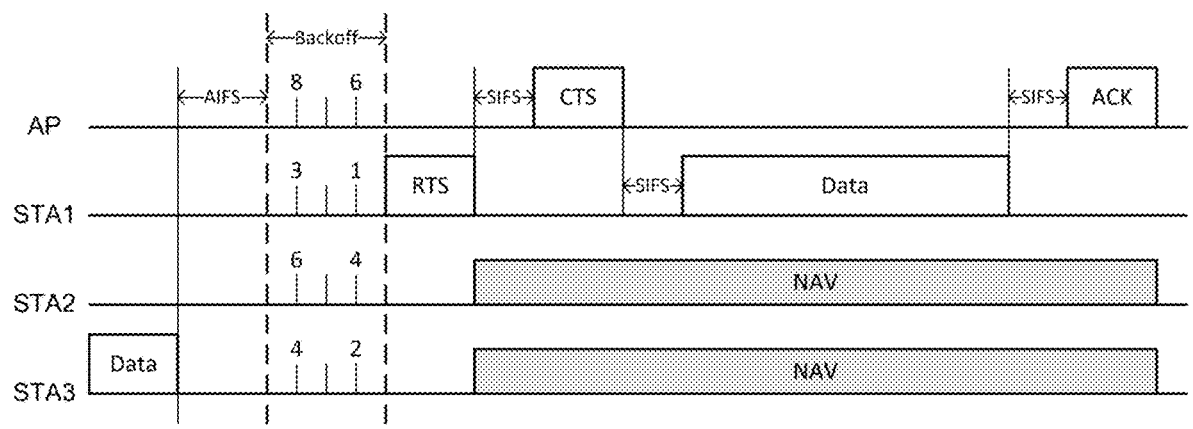
FIG. 7 illustrates a method for performing a distributed coordination function (DCF) using a request to send (RTS) frame and a clear to send (CTS) frame.

FIG. 7 is a diagram illustrating a method for performing a distributed coordination function using a request to send (RTS) frame and a clear to send (CTS) frame.

The AP and STAs in the BSS contend in order to obtain an authority for transmitting data. When data transmission at the previous step is completed, each terminal having data to be transmitted performs a backoff procedure while decreasing a backoff counter (alternatively, a backoff timer) of a random number assigned to each terminal after an AFIS time. A transmitting terminal in which the backoff counter expires transmits the request to send (RTS) frame to notify that corresponding terminal has data to transmit. According to an exemplary embodiment of FIG. 7, STA1 which holds a lead in contention with minimum backoff may transmit the RTS frame after the backoff counter expires. The RTS frame includes information on a receiver address, a transmitter address, and duration. A receiving terminal (i.e., the AP in FIG. 7) that receives the RTS frame transmits the clear to send (CTS) frame after waiting for a short IFS (SIFS) time to notify that the data transmission is available to the transmitting terminal STA1. The CTS frame includes the information on a receiver address and duration. In this case, the receiver address of the CTS frame may be set identically to a transmitter address of the RTS frame corresponding thereto, that is, an address of the transmitting terminal STA1.

The transmitting terminal STA1 that receives the CTS frame transmits the data after a SIFS time. When the data transmission is completed, the receiving terminal AP transmits an acknowledgment (ACK) frame after a SIFS time to notify that the data transmission is completed. When the transmitting terminal receives the ACK frame within a predetermined time, the transmitting terminal regards that the data transmission is successful. However, when the transmitting terminal does not receive the ACK frame within the predetermined time, the transmitting terminal regards that the data transmission is failed. Meanwhile, adjacent terminals that receive at least one of the RTS frame and the CTS frame in the course of the transmission procedure set a network allocation vector (NAV) and do not perform data transmission until the set NAV is terminated. In this case, the NAV of each terminal may be set based on a duration field of the received RTS frame or CTS frame.

In the course of the aforementioned data transmission procedure, when the RTS frame or CTS frame of the terminals is not normally transferred to a target terminal (i.e., a terminal of the receiver address) due to a situation such as interference or a collision, a subsequent process is suspended. The transmitting terminal STA1 that transmitted the RTS frame regards that the data transmission is unavailable and participates in a next contention by being assigned with a new random number. In this case, the newly assigned random number may be determined within a range (2*CW) twice larger than a previous predetermined random number range (a contention window, CW).

Figure 8:
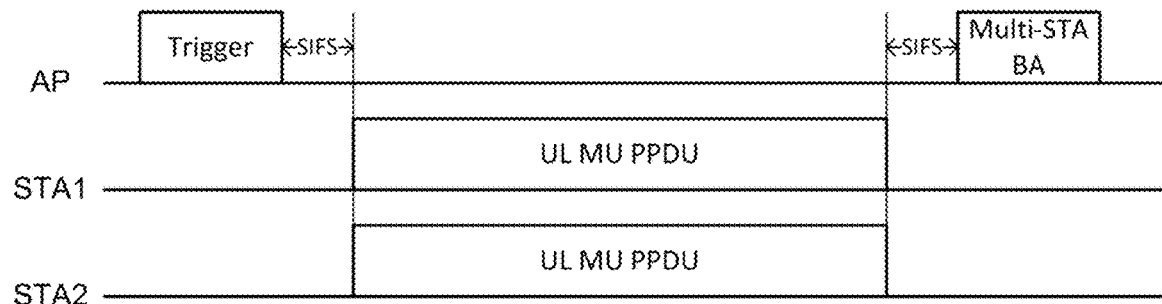
FIGS. 8 and 9 illustrate multi-user transmission methods according to an embodiment of the present invention.
Figure 9:
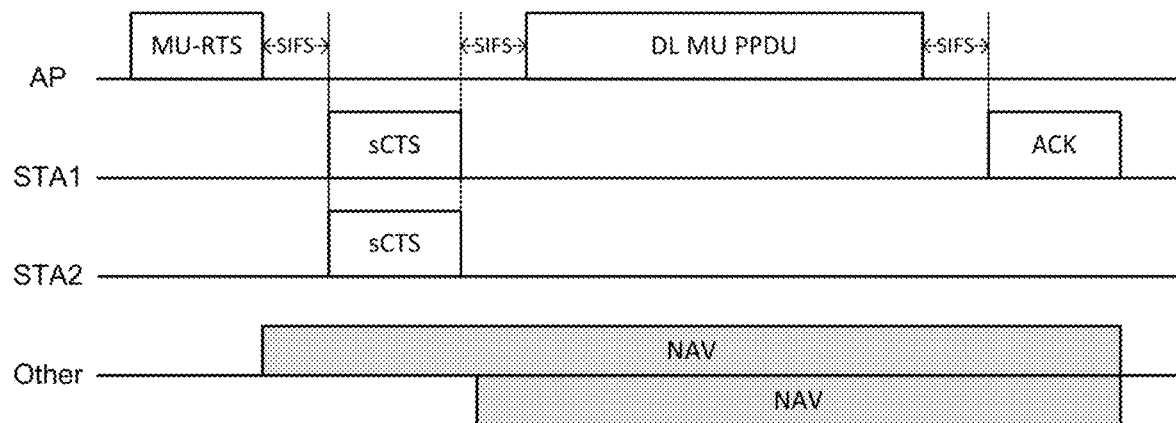

FIGS. 8 and 9 illustrate multi-user transmission methods according to an embodiment of the present invention. When using orthogonal frequency division multiple access (OFDMA) or multi-input multi-output (MIMO), one wireless communication terminal can simultaneously transmit data to a plurality of wireless communication terminals. Further, one wireless communication terminal can simultaneously receive data from a plurality of wireless communication terminals. For example, a downlink multi-user (DL-MU) transmission in which an AP simultaneously transmits data to a plurality of STAs, and an uplink multi-user (UL-MU) transmission in which a plurality of STAs simultaneously transmit data to the AP may be performed.

FIG. 8 illustrates a UL-MU transmission process according to an embodiment of the present invention. In order to perform the UL-MU transmission, the channel to be used and the transmission start time of each STA that performs uplink transmission should be adjusted. In order to efficiently schedule the UL-MU transmission, state information of each STA needs to be transmitted to the AP. According to an embodiment of the present invention, information for scheduling of a UL-MU transmission may be indicated through a predetermined field of a preamble of a packet and/or a predetermined field of a MAC header. For example, a STA may indicate information for UL-MU transmission scheduling through a predetermined field of a preamble or a MAC header of an uplink transmission packet, and may transmit the information to an AP. In this case, the information for UL-MU transmission scheduling includes at least one of buffer status information of each STA, and channel state information measured by each STA. The buffer status information of the STA may indicate at least one of whether the STA has uplink data to be transmitted, the access category (AC) of the uplink data and the size (or the transmission time) of the uplink data.

According to an embodiment of the present invention, the UL-MU transmission process may be managed by the AP. The UL-MU transmission may be performed in response to a trigger frame transmitted by the AP. The STAs simultaneously transmit uplink data a predetermined IFS (e.g., SIFS) time after receiving the trigger frame. The trigger frame solicits UL-MU transmission of STAs and may inform channel (or subchannel) information allocated to the uplink STAs. Upon receiving the trigger frame from the AP, a plurality of STAs transmit uplink data through each allocated channel (or, subchannel) in response thereto. After the uplink data transmission is completed, the AP transmits an ACK to the STAs that have successfully transmitted the uplink data. In this case, the AP may transmit a predetermined multi-STA block ACK (M-BA) as an ACK for a plurality of STAs.

In the non-legacy wireless LAN system, subcarriers of a specific number, for example, 26, 52, or 106 tones may be used as a resource unit (RU) for a subchannel-based access in a channel of 20 MHz band. Accordingly, the trigger frame may indicate identification information of each STA participating in the UL-MU transmission and information of the allocated resource unit. The identification information of the STA includes at least one of an association ID (AID), a partial AID, and a MAC address of the STA. Further, the information of the resource unit includes the size and placement information of the resource unit.

On the other hand, in the non-legacy wireless LAN system, a UL-MU transmission may be performed based on a contention of a plurality of STAs for a specific resource unit. For example, if an AID field value for a specific resource unit is set to a specific value (e.g., 0) that is not assigned to STAs, a plurality of STAs may attempt random access (RA) for the corresponding resource unit.

FIG. 9 illustrates a DL-MU transmission process according to an embodiment of the present invention. According to an embodiment of the present invention, RTS and/or CTS frames of a predetermined format may be used for NAV setting in the DL-MU transmission process. First, the AP transmits a multi-user RTS (MU-RTS) frame for NAV setting in the DL-MU transmission process. The duration field of the MU-RTS frame is set to a time until the end of the DL-MU transmission session. That is, the duration field of the MU-RTS frame is set based on a period until the downlink data transmission of the AP and ACK frame transmissions of the STAs are completed. The neighboring terminals of the AP set a NAV until the end of the DL-MU transmission session based on the duration field of the MU-RTS frame transmitted by the AP. According to an embodiment, the MU-RTS frame may be configured in the format of a trigger frame and requests simultaneous CTS (sCTS) frame transmissions of the STAs.

STAs (e.g., STA1 and STA2) receiving the MU-RTS frame from the AP transmit the sCTS frame. The sCTS frames transmitted by a plurality of STAs have the same waveform. That is, the sCTS frame transmitted by the STA1 on the first channel has the same waveform as the sCTS frame transmitted by the STA2 on the first channel According to an embodiment, the sCTS frame is transmitted on the channel indicated by the MU-RTS frame. The duration field of the sCTS frame is set to a time until the DL-MU transmission session is terminated based on the information of the duration field of the MU-RTS frame. That is, the duration field of the sCTS frame is set based on the period until the downlink data transmission of the AP and the ACK frame transmissions of the STAs are completed. In FIG. 9, neighboring terminals of STA1 and STA2 set a NAV until the end of the DL-MU transmission session based on the duration field of the sCTS frame.

According to an embodiment of the present invention, the MU-RTS frame and the sCTS frame may be transmitted on a 20 MHz channel basis. Accordingly, the neighboring terminals including legacy terminals can set the NAV by receiving the MU-RTS frame and/or the sCTS frame. When the transmission of the MU-RTS frame and the sCTS frame is completed, the AP performs a downlink transmission. FIG. 9 illustrates an embodiment in which the AP transmits DL-MU data to STA1 and STA2, respectively. The STAs receive the downlink data transmitted by the AP and transmit an uplink ACK in response thereto.

Figure 10:
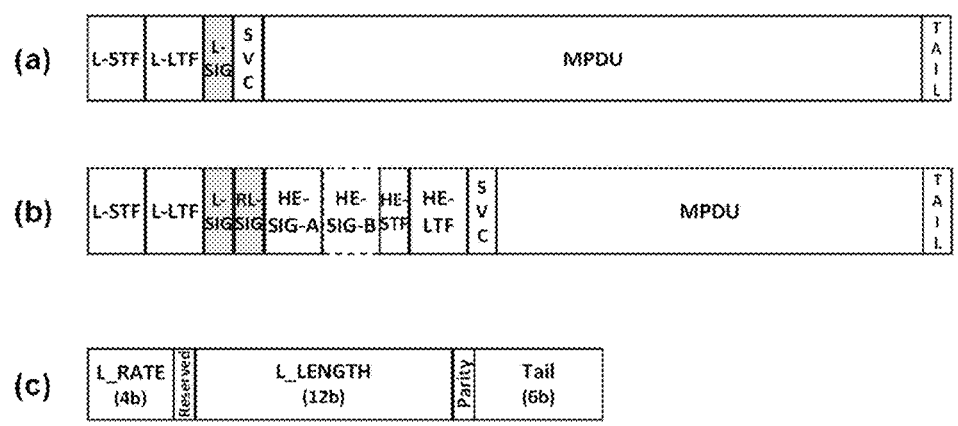
FIG. 10 illustrates an embodiment of a legacy PPDU format and a non-legacy PPDU format.

FIG. 10 illustrates an embodiment of a legacy PLCP Protocol Data Unit (PPDU) format and a non-legacy PPDU format. More specifically, FIG. 10(a) illustrates an embodiment of a legacy PPDU format based on 802.11a/g, and FIG. 10(b) illustrates an embodiment of a non-legacy PPDU based on 802.11ax. In addition, FIG. 10(c) illustrates the detailed field configuration of L-SIG and RL-SIG commonly used in the PPDU formats.

Referring to FIG. 10(a), the preamble of the legacy PPDU includes a legacy short training field (L-STF), a legacy long training field (L-LTF), and a legacy signal field (L-SIG). In an embodiment of the present invention, the L-STF, L-LTF and L-SIG may be referred to as a legacy preamble. Referring to FIG. 10(b), the preamble of the HE PPDU includes a repeated legacy short training field (RL-SIG), a high efficiency signal A field (HE-SIG-A), a high efficiency signal B field, a high efficiency short training field (HE-STF), and a high efficiency long training field (HE-LTF) in addition to the legacy preamble. In an embodiment of the present invention, the RL-SIG, HE-SIG-A, HE-SIG-B, HE-STF and HE-LTF may be referred to as a non-legacy preamble. The detailed configuration of the non-legacy preamble may be modified according to the HE PPDU format. For example, HE-SIG-B may only be used in some formats among the HE PPDU formats.

A 64 FFT OFDM is applied to the L-SIG included in the preamble of the PPDU and the L-SIG consists of 64 subcarriers in total. Among these, 48 subcarriers excluding guard subcarriers, a DC subcarrier and pilot subcarriers are used for data transmission of the L-SIG. If a modulation and coding scheme (MCS) of BPSK, Rate=1/2 is applied, the L-SIG may include information of a total of 24 bits. FIG. 10(c) illustrates a configuration of 24-bit information of the L-SIG.

Referring to FIG. 10(c), the L-SIG includes an L_RATE field and an L_LENGTH field. The L_RATE field consists of 4 bits and represents the MCS used for data transmission. More specifically, the L_RATE field represents one of the transmission rates of 6/9/12/18/24/24/36/48/54 Mbps by combining the modulation scheme such as BPSK/QPSK/16-QAM/64-QAM with the code rate such as 1/2, 2/3, 3/4. When combining the information of the L_RATE field and the L_LENGTH field, the total length of the corresponding PPDU can be represented. The non-legacy PPDU sets the L_RATE field to a 6 Mbps which is the minimum rate.

The L_LENGTH field consists of 12 bits, and may represent the length of the corresponding PPDU by a combination with the L_RATE field. In this case, the legacy terminal and the non-legacy terminal may interpret the L_LENGTH field in different ways.

First, a method of interpreting the length of a PPDU using a L_LENGTH field by a legacy terminal or a non-legacy terminal is as follows. When the L_RATE field is set to 6 Mbps, 3 bytes (i.e., 24 bits) can be transmitted for 4 us, which is one symbol duration of 64 FFT. Therefore, by adding 3 bytes corresponding to the SVC field and the Tail field to the value of the L_LENGTH field and dividing it by 3 bytes, which is the transmission amount of one symbol, the number of symbols after the L-SIG is obtained on the 64 FFT basis. The length of the corresponding PPDU, that is, the reception time (i.e., RXTIME) is obtained by multiplying the obtained number of symbols by 4 us, which is one symbol duration, and then adding a 20 us which is for transmitting L-STF, L-LTF and L-SIG. This can be expressed by the following Equation 1.

$$RXTIME(\text{us}) = \left(\left\lceil \frac{L\_LENGTH + 3}{3} \right\rceil\right) \times 4 + 20 \quad \text{[Equation 1]}$$

In this case, $\lfloor x \rfloor$ denotes the smallest natural number greater than or equal to x. Since the maximum value of the L_LENGTH field is 4095, the length of the PPDU can be set up to 5.464 ms. The non-legacy terminal transmitting the PPDU should set the L_LENGTH field as shown in Equation 2 below.

$$L\_LENGTH(\text{byte}) = \left(\left\lceil \frac{TXTIME - 20}{4} \right\rceil\right) \times 3 - 3 \quad \text{[Equation 2]}$$

Herein, TXTIME is the total transmission time constituting the corresponding PPDU, and is expressed by Equation 3 below. In this case, TX represents the transmission time of X.

$$TXTIME\ (\text{us}) = T_{L\text{-}STF} + T_{L\text{-}LTF} + T_{L\text{-}SIG} + T_{RL\text{-}SIG} + T_{HE\text{-}SIG\text{-}A} + (T_{HE\text{-}SIG\text{-}B}) + T_{HE\text{-}STF} + N_{HE\text{-}LTF} \cdot T_{HE\text{-}LTF} + T_{Data} \quad \text{[Equation 3]}$$

With reference to the above equations, the length of the PPDU is calculated based on the round-up value of L_LENGTH/3. Therefore, for any value of k, three different values of L_LENGTH={3k+1, 3k+2, 3(k+1)} indicate the same PPDU length. According to an embodiment of the present invention, the non-legacy terminal may perform additional signaling using three different L_LENGTH values indicating the same PPDU length information. More specifically, values corresponding to 3k+1 and 3k+2 among the three different L_LENGTH values may be used to indicate the HE PPDU format.

Figure 11:
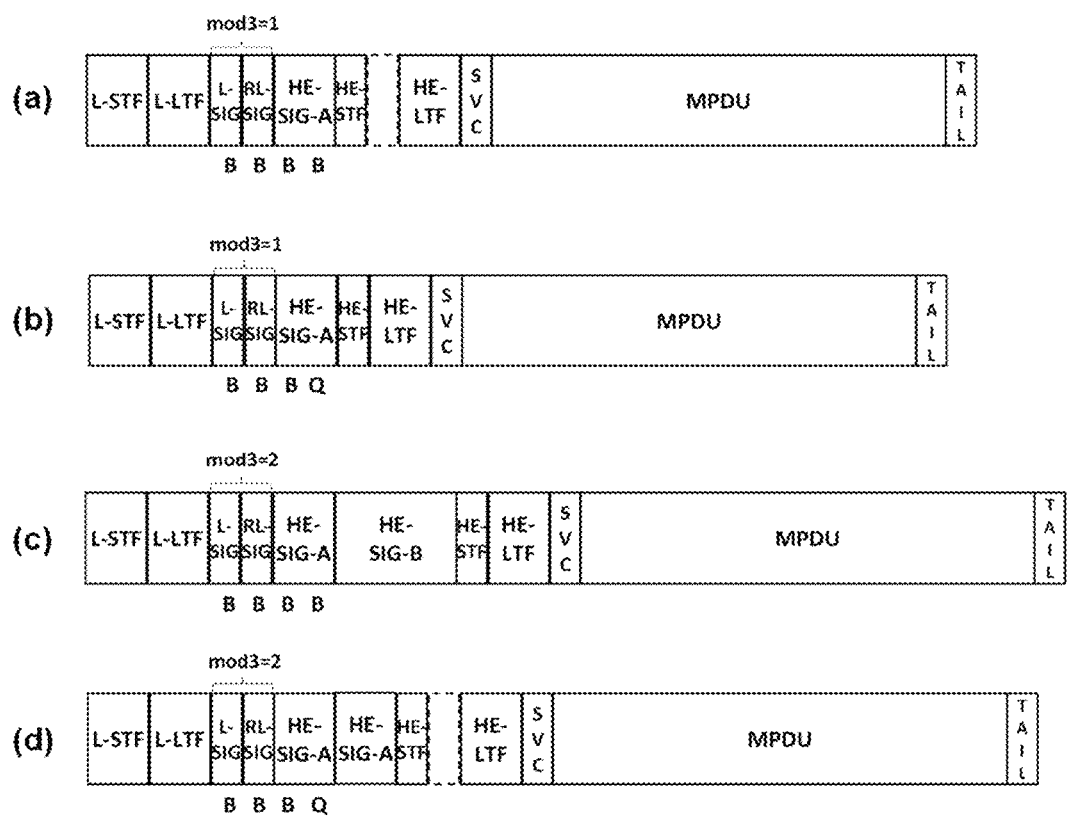
FIG. 11 illustrates various HE PPDU formats and an indication method thereof according to an embodiment of the present invention.

FIG. 11 illustrates various HE PPDU formats and an indication method thereof according to an embodiment of the present invention. According to an embodiment of the present invention, the HE PPDU format may be indicated based on the L_LENGTH field and HE-SIG-A of the corresponding PPDU. More specifically, the HE PPDU format is indicated based on at least one of the value of the L_LENGTH field and the modulation scheme applied to the HE-SIG-A symbol.

First, referring to FIG. 11(a), when the value of the L_LENGTH field is 3k+1 (i.e., when mod 3=1), the corresponding PPDU is an HE SU PPDU or an HE Trigger-based PPDU. The HE SU PPDU is a PPDU used for a single-user transmission between an AP and a single STA. Furthermore, the HE Trigger-based PPDU is an uplink PPDU used for a transmission that is a response to a trigger frame. HE SU PPDU and HE Trigger-based PPDU have the same preamble format. In the cases of the HE SU PPDU and the HE Trigger-based PPDU, two symbols of HE-SIG-A are modulated with BPSK and BPSK, respectively.

According to a further embodiment of the present invention illustrated in FIG. 11(b), when the value of the L_LENGTH field is 3k+1 and the two symbols of HE-SIG-A are modulated with BPSK and QBPSK, respectively, the corresponding PPDU is an extended PPDU. The extended PPDU is used as a new PPDU format other than the PPDU formats supported by 802.11ax.

Next, when the value of the L_LENGTH field is 3k+2 (i.e., when mod 3=2), the corresponding PPDU is an HE MU PPDU or an HE Extended Range (ER) SU PPDU. The HE MU PPDU is a PPDU used for a transmission to one or more terminals. The HE MU PPDU format is illustrate in FIG. 11(c) and additionally includes HE-SIG-B in the non-legacy preamble. In the case of the HE MU PPDU, the two symbols of HE-SIG-A are modulated with BPSK and BPSK, respectively. On the other hand, HE ER SU PPDU is used for a single-user transmission with a terminal in an extended range. The HE ER SU PPDU format is illustrated in FIG. 11(d), where HE-SIG-A of the non-legacy preamble is repeated on the time axis. In the case of the HE ER SU PPDU, the first two symbols of HE-SIG-A are modulated with BPSK and QBPSK, respectively. Thus, the non-legacy terminal can signal the PPDU format through the modulation scheme used for the two symbols of HE-SIG-A in addition to the value of the L_LENGTH field.

The HE MU PPDU illustrated in FIG. 11(c) may be used by an AP to perform a downlink transmission to a plurality of STAs. In this case, the HE MU PPDU may include scheduling information for a plurality of STAs to simultaneously receive the corresponding PPDU. In addition, the HE MU PPDU may be used by a single STA to perform an uplink transmission to the AP. In this case, the HE MU PPDU may transmit AID information of the receiver and/or the transmitter of the corresponding PPDU through a user specific field of the HE-SIG-B. Therefore, terminals receiving the HE MU PPDU may perform a spatial reuse operation based on the AID information obtained from the preamble of the corresponding PPDU. In addition, data transmission through some narrowband may be performed using the HE MU PPDU. Here, the narrowband may be a frequency band of less than 20 MHz. According to an embodiment, the HE MU PPDU may indicate allocation information of resource unit(s) to be used for a narrowband transmission through the HE-SIG-B.

More specifically, the resource unit allocation (RA) field of HE-SIG-B contains information on the resource unit partition type in a specific bandwidth (e.g., 20 MHz) of the frequency domain. Further, information of a STA assigned to each partitioned resource unit may be transmitted through the user specific field of the HE-SIG-B. The user specific field includes one or more user fields corresponding to each partitioned resource unit.

When a narrowband transmission using a part of the partitioned resource units is performed, the resource unit used for the transmission may be indicated through the user specific field of the HE-SIG-B. According to an embodiment, an AID of a receiver or a transmitter may be contained in a user field corresponding to resource unit(s) on which data transmission is performed among a plurality of partitioned resource units. In addition, a predetermined Null STA ID may be contained in user field(s) corresponding to the remaining resource unit(s) in which data transmission is not performed. According to another embodiment of the present invention, the narrowband transmission may be signaled through a first user field corresponding to a resource unit in which data transmission is not performed and a second user field corresponding to a resource unit in which data transmission is performed. More specifically, a predetermined null STA ID may be contained in the first user field, and the placement information of the resource unit(s) on which data transmission is performed may be indicated through the remaining subfields of the corresponding user field. Next, the AID of the receiver or transmitter may be contained in the second user field. Thus, the terminal may signal the narrowband transmission through the location information contained in the first user field and the AID information contained in the second user field. In this case, since user fields less than the number of partitioned resource units are used, the signaling overhead can be reduced.

Figure 12:
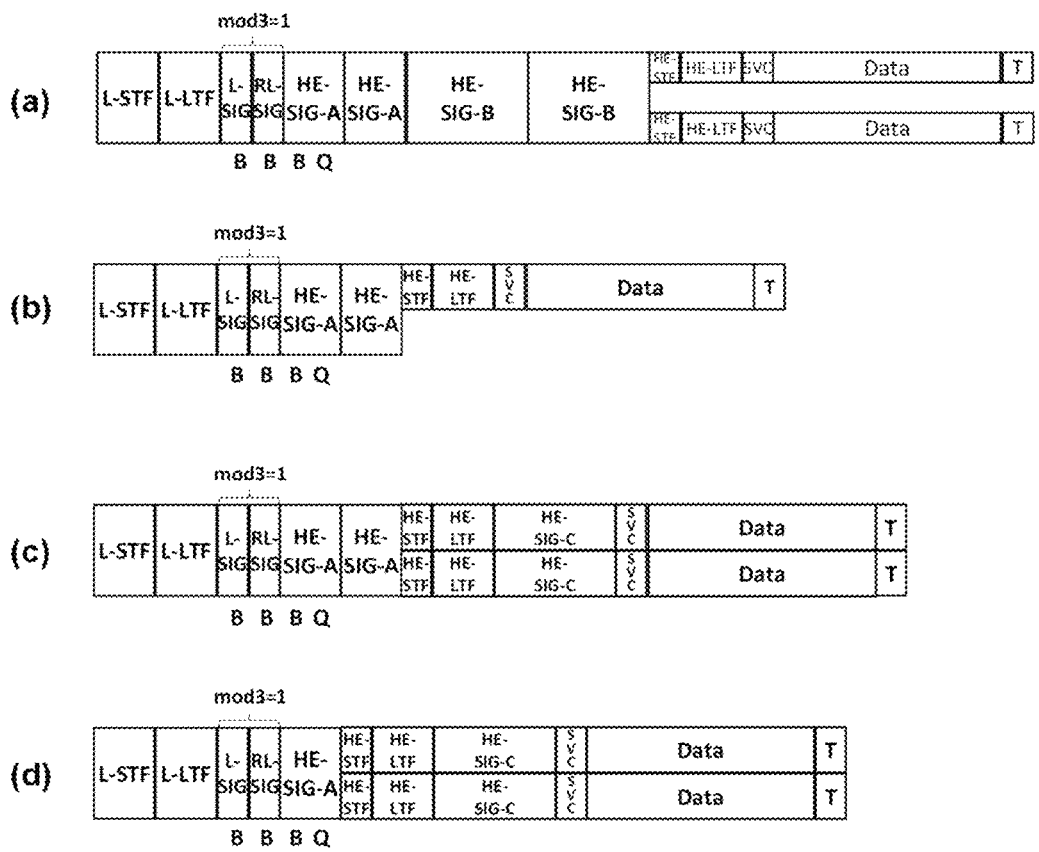
FIG. 12 illustrates HE PPDU formats according to an additional embodiment of the present invention.

FIG. 12 illustrates HE PPDU formats according to an additional embodiment of the present invention. In each embodiment of FIG. 12, it is illustrated that, in the HE PPDU, the L_LENGTH field has a value of 3k+1 (i.e., mod 3=1) and the two symbols of HE-SIG-A are modulated with BPSK and QBPSK, respectively, but the present invention is not limited thereto. That is, in each embodiment of the HE PPDU, the L_LENGTH field may have a value of 3k+2 (i.e., mod 3=2) or the two symbols of HE-SIG-A may be modulated with BPSK and BPSK, respectively, First, FIG. 12(a) illustrates an HE ER PPDU format according to an embodiment of the present invention. In the corresponding PPDU format, HE-SIG-A and HE-SIG-B are repeated in the time domain. In this case, it is possible to obtain a reception gain of 3 dB or more due to repetitive transmission of HE-SIG-A and HE-SIG-B in the time domain, thereby enabling signal reception at a long distance. Since the PPDU format according to the embodiment of FIG. 12(a) can additionally signal HE-SIG-B, it can be used for a downlink extended range (ER) multi-user transmission. In addition, the corresponding PPDU format may be used for narrowband transmission of data in uplink/downlink ER single-user transmissions. More specifically, the PPDU format may signal, via HE-SIG-B, a transmission which uses a part of the resource units of the data area transmitted on the basis of 256 FFT/20 MHz. Therefore, transmission using only 26-tone RU, 52-tone RU, or 106-tone RU which is less than 20 MHz band can be performed even in an uplink/ downlink single-user transmission situation. Through such narrowband transmission, the terminal can perform transmission by concentrating the entire allowable transmission power in the ISM band on a narrow RU. That is, in addition to the extension of the transmission distance due to the repetitive transmission of the HE-SIG-A/B in the 64 FFT/20 MHz domain, the transmission distance can be extended even in the data transmission in the following 256 FFT/20 MHz domain. In addition, the corresponding PPDU format may also be used for narrowband transmission of data in a downlink multi-user transmission. For example, as shown in FIG. 12(a), the AP may indicate partition information of the 20 MHz band via HE-SIG-B of the PPDU, and use some resource units including at least two of the partitioned resource units for the narrowband transmission. In this case, the transmission distance can be increased by concentrating the entire allowable transmission power in the ISM band to some resource units and transmitting it.

Next, FIG. 12(b) illustrates an HE ER PPDU format according to another embodiment of the present invention. In the corresponding PPDU format, HE-SIG-A is repeated in the time domain, and HE-SIG-B is not transmitted in order to reduce the preamble overhead. In this case, it is possible to obtain a reception gain of 3 dB or more due to repetitive transmission of HE-SIG-A in the time domain, thereby enabling signal reception at a long distance. According to an embodiment, the distinction between the PPDU format according to FIG. 12(a) and the PPDU format according to FIG. 12(b) may be indicated through a predetermined field of the HE-SIG-A. The PPDU format according to the embodiment of FIG. 12(b) may be used for narrowband transmission of data in uplink/downlink ER single-user transmission. In this case, the corresponding PPDU format may indicate a transmission using a specific resource unit of a data area transmitted on the basis of 256 FFT/20 MHz without signaling via HE-SIG-B. For example, transmission only using some predetermined resource units within the 20 MHz bandwidth may be indicated via a specific field (e.g., Bandwidth field) of the HE-SIG-A. In this case, the some predetermined resource units may be at least one of 26-tone RU, 52-tone RU, and 106-tone RU in a specific placement. A predetermined field of the HE-SIG-A in the HE ER PPDU may indicate whether transmission using some predetermined resource units is performed or transmission using a 20 MHz full band (i.e., 242-tone RU) is performed. As described above, according to the embodiment of FIG. 12(b), the predetermined narrowband transmission may be indicated by simple signaling of the HE-SIG-A without using the HE-SIG-B in the HE ER PPDU.

Next, FIG. 12(c) illustrates an HE ER PPDU format according to yet another embodiment of the present invention. In the corresponding PPDU format, HE-SIG-A is repeated in the time domain, and HE-SIG-B is not transmitted in order to reduce the preamble overhead. Instead, HE-SIG-C transmitted in the 256 FFT/20 MHz domain may additionally be used. In this case, it is possible to obtain a reception gain of 3 dB or more due to repetitive transmission of HE-SIG-A in the time domain, thereby enabling signal reception at a long distance. The corresponding PPDU format may indicate a transmission using a specific resource unit of a data area transmitted on the basis of 256 FFT/20 MHz without signaling via HE-SIG-B. The specific embodiments thereof are as described in the embodiment of FIG. 12(b). The HE-SIG-C may transmit information for a terminal to decode data transmitted through the corresponding resource unit, for example, MCS, whether a transmit beamforming (TxBF) is applied, binary convolutional code (BCC)/low density parity check (LDPC) coding indicator, and the like.

Finally, FIG. 12(d) illustrates an HE PPDU format according to still another embodiment of the present invention. In the corresponding PPDU format, HE-SIG-A is not repeated in the time domain, and HE-SIG-B is not transmitted. Instead, a HE-SIG-C transmitted in the 256 FFT/20 MHz domain may additionally be used. The PPDU according to the embodiment of FIG. 12(d) may be used to allow the neighboring STAs of the AP to set a NAV using the transmission opportunity (TXOP) duration information included in the HE-SIG-A. The corresponding PPDU format may indicate a transmission using a specific resource unit of a data area transmitted on the basis of 256 FFT/20 MHz without signaling via HE-SIG-B. The specific embodiments thereof are as described in the embodiment of FIG. 12(b). The HE-SIG-C may transmit information for a terminal to decode data transmitted through the corresponding resource unit as described above.

Figure 13:
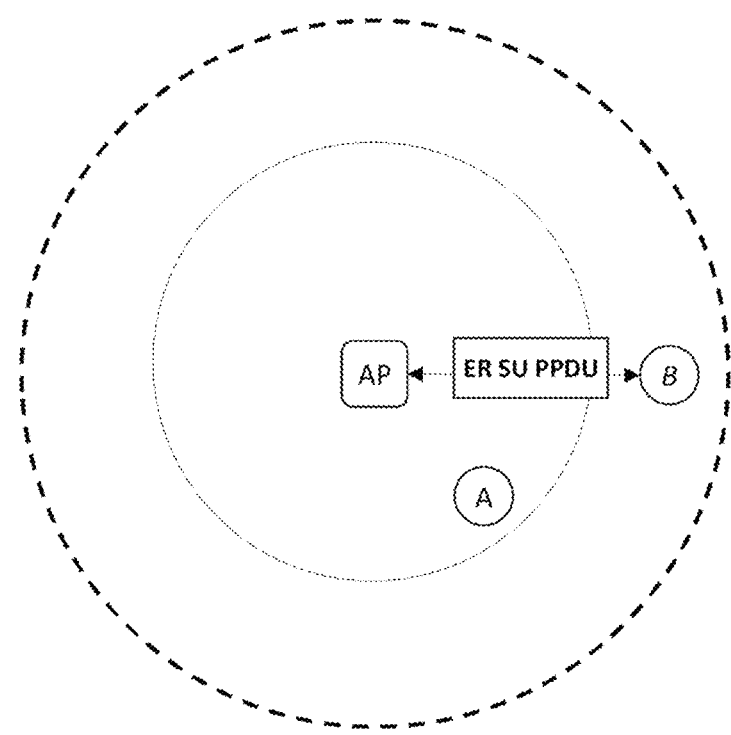
FIG. 13 illustrates a power save operation scenario based on a PPDU format according to an embodiment of the present invention.

FIG. 13 illustrates a power save operation scenario based on a PPDU format according to an embodiment of the present invention. In a BSS operated by a non-legacy AP, a STA (i.e., ER STA) that supports an extended range (ER) mode and a STA (i.e., a non-ER STA) that does not support the ER mode may be mixed. In the embodiment of FIG. 13, STA "A" represents a non-ER STA, and STA "B" represents an ER STA.

According to the embodiment of the present invention, when the non-ER STA receives an ER PPDU of the same BSS (i.e., intra-BSS), it can enter the power save mode. In the embodiment of FIG. 13, the AP exchanges an ER SU PPDU with the STA "B", and the STA "A" receiving the corresponding PPDU enters the power save mode for the length of the received PPDU. The STA negotiates whether or not to support the ER mode when performing an association with the AP. Therefore, when the non-ER STA receives the ER PPDU of the same BSS, it can enter the power save mode without additional processing because it is obvious that the corresponding PPDU is not a PPDU transmitted to itself.

FIG. 14 illustrates an embodiment of a configuration of an HE-SIG-A field according to the HE PPDU format. HE-SIG-A consists of two symbols of 64 FFT, and indicates common information for reception of the HE PPDU. The first symbol of the HE-SIG-A is modulated with BPSK, and the second symbol of the HE-SIG-A is modulated with BPSK or QBPSK. In the HE ER SU PPDU, two symbols of the HE-SIG-A may be repeatedly transmitted. That is, the HE-SIG-A of the HE ER SU PPDU consists of four symbols, the first symbol and the second symbol of which have the same data bit, and the third symbol and the fourth symbol of which have the same data bit.

First, FIG. 14(a) illustrates a subfield configuration of the HE-SIG-A field of the HE SU PPDU. According to an embodiment, the HE-SIG-A field of the HE ER SU PPDU may be configured similarly. The function of each field included in HE-SIG-A will be described as follows.

The UL/DL field indicates a transmission direction of the corresponding PPDU. That is, the corresponding field indicates whether the corresponding PPDU is transmitted with uplink or is transmitted with downlink. The format field is used to differentiate an HE SU PPDU from an HE Trigger-based PPDU. The BSS color field consists of 6 bits and indicates an identifier of the BSS corresponding to a terminal that transmitted the corresponding PPDU. The spatial reuse field carries information such as signal to interference plus noise ratio (SINR), transmission power, etc., which can be referred to by terminals to perform spatial reuse transmission during the transmission of the corresponding PPDU.

The TXOP duration field indicates duration information for TXOP protection and NAV setting. The corresponding field sets the duration of the TXOP interval in which consecutive transmission is to be performed after the corresponding PPDU, so that the neighboring terminals set a NAV for the corresponding duration. The bandwidth field indicates the total bandwidth in which the corresponding PPDU is transmitted. According to an embodiment, the bandwidth field may consist of 2 bits and indicate one of 20 MHz, 40 MHz, 80 MH and 160 MHz (including 80+80 MHz). The MCS field indicates an MCS value applied to the data field of the corresponding PPDU. The CP+LTF size field indicates the duration of the cyclic prefix (CP) or guard interval (GI) and the size of the HE-LTF. More specifically, the corresponding field indicates the combination of the HE-LTF size used among 1×, 2×, and 4× HE-LTF, and the CP (or GI) value used in the data field among 0.8 us, 1.6 us, and 3.2 us.

The coding field may indicate which coding scheme is used between binary convolutional code (BCC) and low density parity check (LDPC). In addition, the corresponding field may indicate whether an extra OFDM symbol for LDPC is present. The number of space time streams (NSTS) field indicates the number of space-time streams used for MIMO transmission. The space time block coding (STBC) field indicates whether space-time block coding is used. The transmit beamforming (TxBF) field indicates whether beamforming is applied to the transmission of the corresponding PPDU. The dual carrier modulation (DCM) field indicates whether dual carrier modulation is applied to the data field. The dual carrier modulation transmits the same information through two subcarriers in order to cope with narrowband interference. The packet extension field indicates which level of packet extension is applied to the PPDU. The beam change field indicates whether the part before the HE-STF of the corresponding PPDU is mapped spatially different from the HE-LTF. The CRC field and the tail field are used to determine the authenticity of the HE-SIG-A field information and to initialize the BCC decoder, respectively.

Next, FIG. 14(b) illustrates a subfield configuration of the HE-SIG-A field of the HE MU PPDU. Among the subfields shown in FIG. 14(b), the same subfields as those shown in FIG. 14(a) will not be described.

The UL/DL field indicates the transmission direction of the corresponding PPDU. That is, the corresponding field indicates whether the corresponding PPDU is transmitted with uplink or is transmitted with downlink. The bandwidth field of the HE MU PPDU may indicate extra bandwidths in addition to the bandwidths of the HE SU PPDU. That is, the bandwidth field of the HE MU PPDU consists of 3 bits and indicates one of 20 MHz, 40 MHz, 80 MHz, 160 MHz (including 80+80 MHz), and predetermined non-contiguous bands. The specific embodiments of the predetermined non-contiguous bands will be described later.

The SIG-B MCS field indicates the MCS applied to the HE-SIG-B field. Depending on the amount of information that requires signaling, variable MCS between MSC0 and MSC5 can be applied to the HE-SIG-B. The CP+LTF size field indicates the duration of the CP or GI and the size of the HE-LTF. The corresponding field indicates the combination of the HE-LTF size used among 2× and 4×HE-LTF, and the CP (or GI) value used in the data field among 0.8 us, 1.6 us, and 3.2 us.

The SIG-B compression field indicates whether to use a compression mode of the HE-SIG-B field. When the HE MU PPDU is transmitted using an MU-MIMO in the full bandwidth, the resource unit allocation information for each 20 MHz band becomes unnecessary. Therefore, in the full bandwidth MU-MIMO transmission, the SIG-B compression field indicates the compression mode of the HE-SIG-B field. In this case, the common block field containing the resource unit allocation field is not present in the HE-SIG-B field. The SIG-B DCM field indicates whether the HE-SIG-B field is modulated with the DCM for reliable transmission of the HE-SIG-B field. The number of HE-SIG-B symbols field indicates information on the number of OFDM symbols in the HE-SIG-B field.

On the other hand, when the HE MU PPDU is transmitted in a band of 40 MHz or more as described later, the HE-SIG-B may consist of two kinds of content channels in units of 20 MHz. The content channels are referred to as HE-SIG-B content channel 1 and HE-SIG-B content channel 2, respectively. According to an embodiment of the present invention, the number of HE-SIG-B symbols in each channel can be kept similar by differentiating MCSs applied to the HE-SIG-B content channel 1 and the HE-SIG-B content channel 2, respectively. The HE-SIG-A field of the HE MU PPDU may include a SIG-B dual MCS field. In this case, it is indicated through the corresponding field whether the MCSs applied to the HE-SIG-B content channel 1 and the HE-SIG-B content channel 2 are different with each other.

According to the embodiment of the present invention, when the SIG-B compression field indicates the compression mode of the HE-SIG-B field (i.e., when the full bandwidth MU-MIMO transmission is indicated), a specific field of the HE-SIG-A may indicate information on the number of MU-MIMO users. For example, when the full bandwidth MU-MIMO transmission is performed, the HE-SIG-B content channel 1 and the HE-SIG-B content channel 2 do not need to distribute the amount of information through different MCSs. Therefore, when the SIG-B compression field indicates the compression mode of the HE-SIG-B field, the SIG-B dual MCS field of the HE-SIG-A may indicate information on the number of MU-MIMO users. Likewise, when the full bandwidth MU-MIMO transmission is performed, information on the number of symbols in each HE-SIG-B content channel need not be delivered separately. Therefore, when the SIG-B compression field indicates the compression mode of the HE-SIG-B field, the number of HE-SIG-B symbols field in the HE-SIG-A may indicate the information on the number of MU-MIMO users. As described above, in the compression mode in which the resource unit allocation field of the HE-SIG-B is omitted, information on the number of MU-MIMO users may be indicated through a specific subfield of the HE-SIG-A.

According to an embodiment of the present invention, the HE MU PPDU may be used for the DL-MU transmission. However, in the following additional situations, the HE MU PPDU may be used for both the downlink transmission and the uplink transmission.

According to an embodiment, an HE MU PPDU may be used for OFDMA based transmission in a downlink/uplink transmission between an AP and a single STA. More specifically, transmission between an AP and a single STA may be performed using only some contiguous or non-contiguous channels among the entire band. For example, when only a secondary 20 MHz channel is busy as a result of the STA performing CCA to transmit an 80 MHz PPDU to the AP, the STA may transmit the PPDU through the primary 20 MHz channel and the secondary 40 MHz channel. In addition, a narrowband transmission using only some resource units within 20 MHz may be performed between an AP and a single STA. In the case where the transmission using the non-contiguous channel or the narrowband transmission is performed, the resource unit allocation information should be additionally transmitted via the HE-SIG-B field in the transmitted PPDU. Therefore, the terminal may perform such transmissions using the HE MU PPDU. The specific embodiments of the transmission using the non-contiguous channel and the narrowband transmission will be described later.

According to another embodiment, the HE MU PPDU may be used when a transmission of the HE-SIG-B field is required for the enhancement of the spatial reuse operation. Unlike the HE SU PPDU, the HE MU PPDU can indicate an AID of the recipient through the user field of the HE-SIG-B. However, according to an exemplary embodiment of the present invention, since it is obvious that the recipient of the corresponding PPDU is an AP when the HE MU PPDU is used for an uplink transmission, the user field of the HE-SIG-B may indicate an AID of the transmitter. The neighboring terminals that have received the HE MU PPDU may perform the spatial reuse operation.

For example, assume that there are arbitrary BSS1 and BSS2, and that STA1 of the BSS1 transmits an HE UL MU PPDU. A STA of the BSS2 overhearing the PPDU may estimate the distance between it and an AP of the BSS1 which is the recipient of the PPDU, through a DL PPDU of the AP of the BSS1 that has been previously received. Therefore, the STA of the BSS2 may perform the spatial reuse operation considering the interference to the AP of the BSS1 which is the recipient. Also, when a DL PPDU transmitted by the AP of the BSS1 to the STA1 of the BSS1 is received, the STA of the BSS2 may perform the spatial reuse operation considering the interference to the STA1 of the BSS1 which is the recipient of the corresponding PPDU. In this case, the interference is considered based on the signal strength previously measured from an HE UL MU PPDU of the STA1. In the spatial reuse operation, the STA may attempt to transmit if the received PPDU is a PPDU of other BSS (OBSS) and the interference to the recipient of the corresponding PPDU is below a predetermined level.

Next, FIG. 14(c) illustrates a subfield configuration of the HE-SIG-A field of the HE trigger-based PPDU. Among the subfields shown in FIG. 14(c), the same subfields as those shown in FIG. 14(a) or 14(b) will not be described.

The format field is used to differentiate an HE SU PPDU from an HE Trigger-based PPDU. Also, the HE Trigger-based PPDU includes the above-described BSS color field and TXOP duration field. The spatial reuse field of the HE Trigger-based PPDU consists of 16 bits and carries information for spatial reuse operation in units of 20 MHz or 40 MHz according to the total bandwidth. The bandwidth field consists of 2 bits and may indicate one of 20 MHz, 40 MHz, 80 MHz and 160 MHz (including 80+80 MHz).

Figure 15:
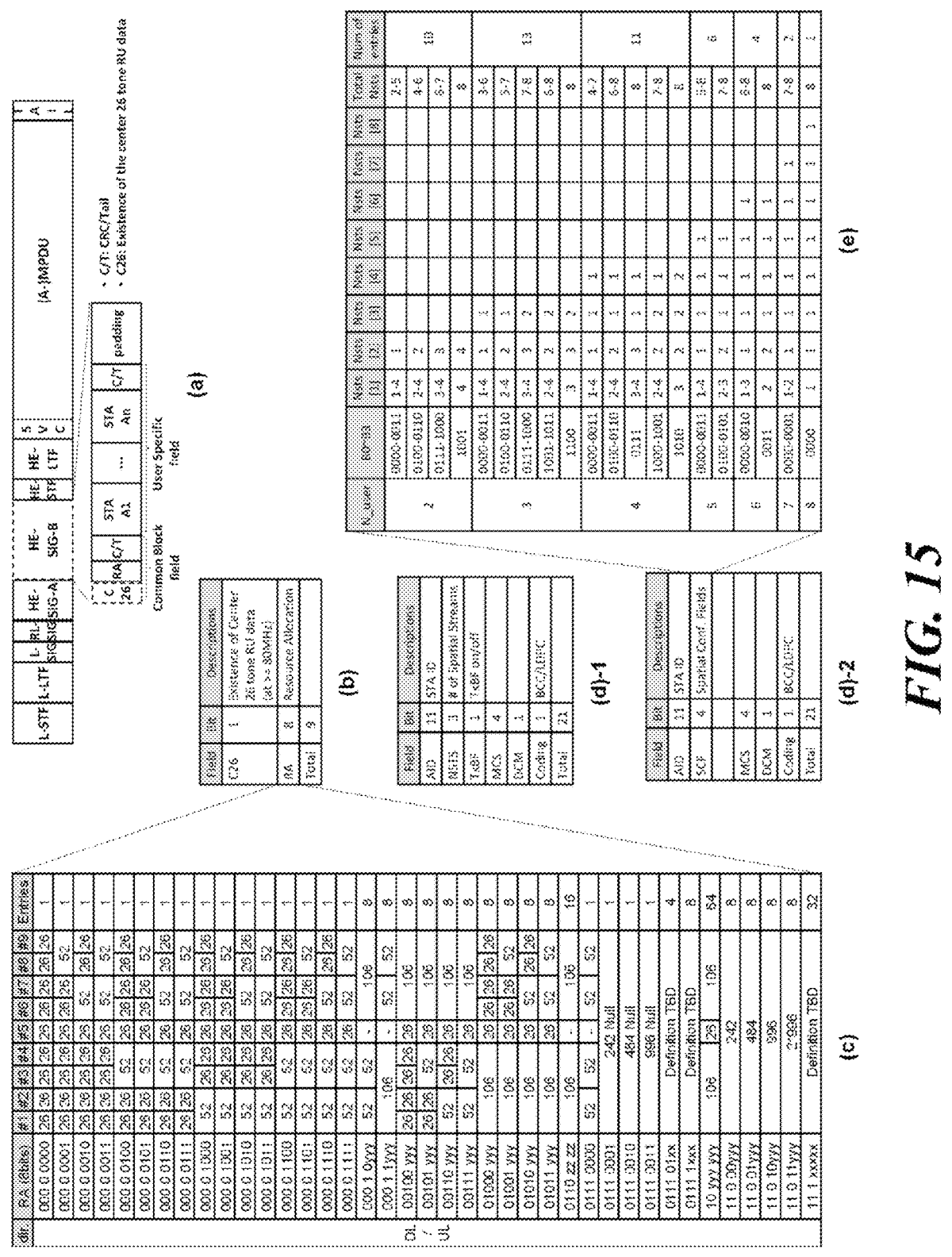

FIG. 15 illustrates a configuration of an HE-SIG-B field according to an embodiment of the present invention. The HE-SIG-B field is present in the HE MU PPDU and is transmitted in units of 20 MHz. In addition, the HE-SIG-B field indicates information necessary for receiving the HE MU PPDU. As illustrated in FIG. 15(a), the HE-SIG-B consists of a common block field and a user specific field.

FIG. 15(b) illustrates an embodiment of a subfield configuration of the common block field of the HE-SIG-B. First, the common block field includes a resource unit allocation (RA) field. FIG. 15(c) illustrates an embodiment of the RA field.

Referring to FIG. 15(c), the RA field contains information on resource unit allocation of a specific bandwidth (e.g., 20 MHz) in the frequency domain. More specifically, the RA field consists in units of 8 bits, and indexes the size of the resource units constituting the specific bandwidth and their placement in the frequency domain. Further, the RA field may indicate the number of users in each resource unit. When the total bandwidth through which the PPDU is transmitted is greater than a predetermined bandwidth (e.g., 40 MHz), the RA field may be set to a multiple of 8 bits to carry information in units of the specific bandwidth.

Each partitioned resource unit is generally assigned to one user. However, resource units of a certain bandwidth (e.g., 106-tones) or more can be assigned to a plurality of users using MU-MIMO. In this case, the RA field may indicate the number of users in the corresponding resource unit. In addition, the RA field may indicate, through a predetermined index, a specific resource unit in which a user specific field is not transmitted, i.e., a specific resource unit (i.e., an empty RU) that is not assigned to the user. According to an embodiment, the specific resource unit includes a resource unit (RU) having a bandwidth of a multiple of 20 MHz channels, i.e., 242-tone RU, 484-tone RU, 996-tone RU, and the like. In an empty RU indicated by the index value, data transmission is not performed. In this manner, the terminal may signal non-contiguous channel allocation information in units of 20 MHz through a predetermined index of the RA field of the HE-SIG-B.

According to an embodiment of the present invention, when a PPDU is transmitted through a total bandwidth of 80 MHz or more, the common block field further includes a field (hereinafter, referred to as C26 field) indicating whether a user is allocated to a center 26-tone RU of 80 MHz. The C26 field may consist of a 1-bit indicator before or after the RA field in the common block field.

On the other hand, the user specific field consists of a plurality of user fields, and carries information for a designated STA to each allocated resource unit. The total number of user fields to be included in the user specific field may be determined based on the RA field and the C26 field. A plurality of user fields are transmitted in units of a user block field. The user block field is made up of an aggregation of two user fields, a CRC field and a tail field. Depending on the total number of user fields, the last user block field may contain information for one or two STAs. For example, if a total of three users (i.e., STA1, STA2, and STA3) are designated, information for STA1 and STA2 may be coded and transmitted along with the CRC/tail field in the first user block field, and information for STA3 may be coded and transmitted along with the CRC/tail field in the last user block field.

FIGS. 15(d)-1 and 15(d)-2 illustrate embodiments of the subfield configuration of the user field of the HE-SIG-B, respectively. FIG. 15(d)-1 illustrates a user field for an OFDMA transmission, and FIG. 15(d)-2 illustrates a user field for a MU-MIMO transmission. Each user field indicates a receiver AID of the corresponding resource unit. Exceptionally, when the HE MU PPDU is used for an uplink transmission, the user field may indicate a transmitter AID. When one user is allocated to one resource unit (i.e., non-MU-MIMO allocation), the user field includes a number of spatial streams (NSTS) field, a TxBF field, an MCS field, a DCM field and a coding field as illustrated in FIG. 15(d)-1. On the other hand, when a plurality of users are allocated to one resource unit (i.e., MU-MIMO allocation), the user field includes a spatial configuration field (SCF), an MCS field, a DCM field, and a coding field as illustrated in FIG. 15(*d*)-2. Each STA that receives a PPDU through an MU-MIMO allocation should identify the location and number of spatial streams for it in the corresponding resource unit. To this end, the user field for the MU-MIMO transmission includes a spatial configuration field (SCF).

FIG. 15(*e*) illustrates an embodiment of the SCF of the HE-SIG-B. The SCF indicates the number of spatial streams for each STA and the total number of spatial streams in the MU-MIMO allocation. Each STA identifies the OFDMA and/or MIMO allocation of the corresponding PPDU through the RA field and identifies whether the STA receives data through the MU-MIMO allocation according to the order indicated in the user specific field. When the STA receives data through the non-MU-MIMO allocation, the user field is interpreted according to the format of FIG. 15(*d*)-1. However, when the STA receives data through the MU-MIMO allocation, the user field is interpreted according to the format of FIG. 15(*d*)-2. On the other hand, when the SIG-B compression field indicates the full bandwidth MU-MIMO, the RA field is not present in the HE-SIG-B. In this case, since all the STAs signaled in the user specific field receive data through the MU-MIMO allocation, the STAs interpret the user field according to the format of FIG. 15(*d*)-2.

Figure 16:
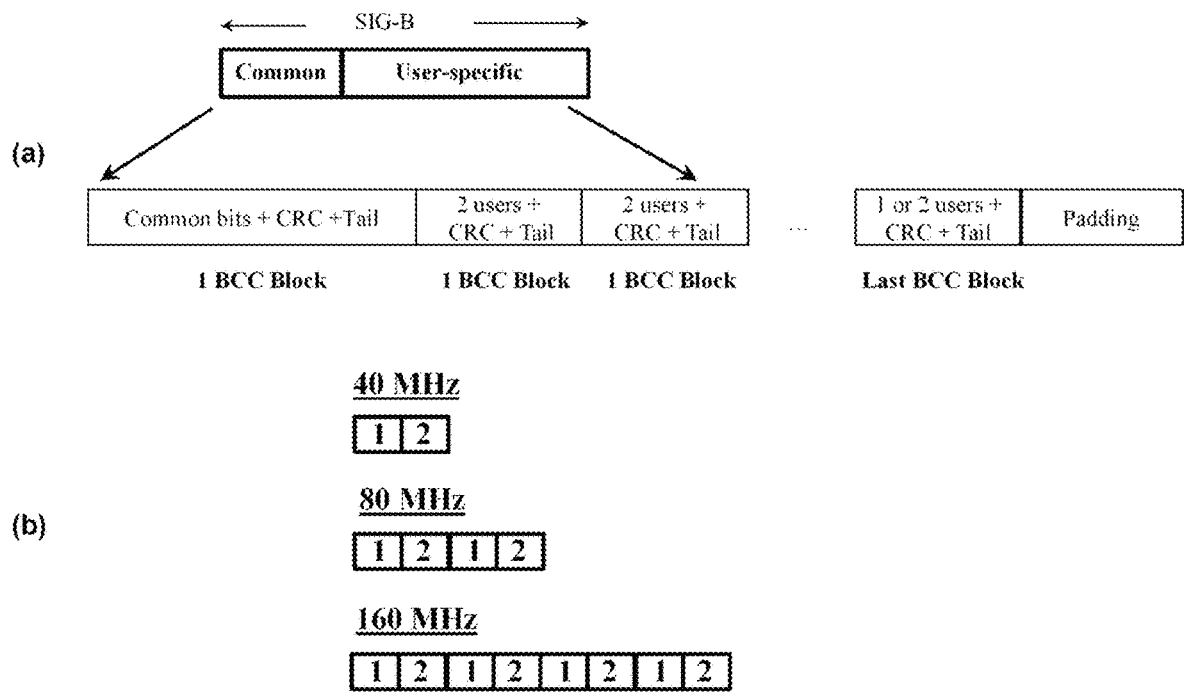
FIG. 16 illustrates an encoding structure and a transmission method of the HE-SIG-B according to an embodiment of the present invention.

FIG. 16 illustrates an encoding structure and a transmission method of the HE-SIG-B according to an embodiment of the present invention. FIG. 16(*a*) illustrates the encoding structure of the HE-SIG-B, and FIG. 16(*b*) illustrates the transmission method of the HE-SIG-B in a bandwidth of 40 MHz or more.

Referring to FIG. 16(*a*), the HE-SIG-B consists of a common block field and a user specific field. The detailed configuration of the common block field and the user specific field is as described in the embodiment of FIG. 15. Each user field of the user specific field is arranged in order of allocated users in the resource unit arrangement indicated by the RA field of the common block field.

The user specific field consists of a plurality of user fields, and a plurality of user fields are transmitted in units of a user block field. As described above, the user block field is made up of an aggregation of two user fields, a CRC field, and a tail field. If the total number of user fields is odd, the last user block field may contain one user field. At the end of the HE-SIG-B, padding may be added along the OFDM symbol boundary.

Referring to FIG. 16(*b*), HE-SIG-B is separately encoded on each 20 MHz band. In this case, the HE-SIG-B may consist of a maximum of two contents in units of 20 MHz, that is, an HE-SIG-B content channel 1 and an HE-SIG-B content channel 2. In the embodiment of FIG. 16(*b*), each box represents a 20 MHz band, and "1" and "2" in the boxes represent the HE-SIG-B content channel 1 and the HE-SIG-B content channel 2, respectively. Each HE-SIG-B content channel in the total band is arranged in order of the physical frequency band. That is, the HE-SIG-B content channel 1 is transmitted in the lowest frequency band, and the HE-SIG-B content channel 2 is transmitted in the next higher frequency band. Such a content channel configuration is then duplicated through content duplication in the next higher frequency bands. For example, for the first to fourth channels with an increasing order of the frequency constituting the entire 80 MHz band, the HE-SIG-B content channel 1 is transmitted on the first channel and the third channel, and the HE-SIG-B content channel 2 is transmitted on the second channel and the fourth channel. Likewise, for the first to eighth channels with an increasing order of the frequency constituting the entire 160 MHz band, the HE-SIG-B content channel 1 is transmitted on the first channel, the third channel, the fifth channel and the seventh channel, and the HE-SIG-B content channel 2 is transmitted on the second channel, the fourth channel, the sixth channel and the eighth channel. When the terminal can decode the HE-SIG-B content channel 1 through at least one channel and decode the HE-SIG-B content channel 2 through the other at least one channel, information on the MU PPDU configuration of the total bandwidth can be obtained. On the other hand, when the total bandwidth is 20 MHz, only one SIG-B content channel is transmitted.

Figure 17:
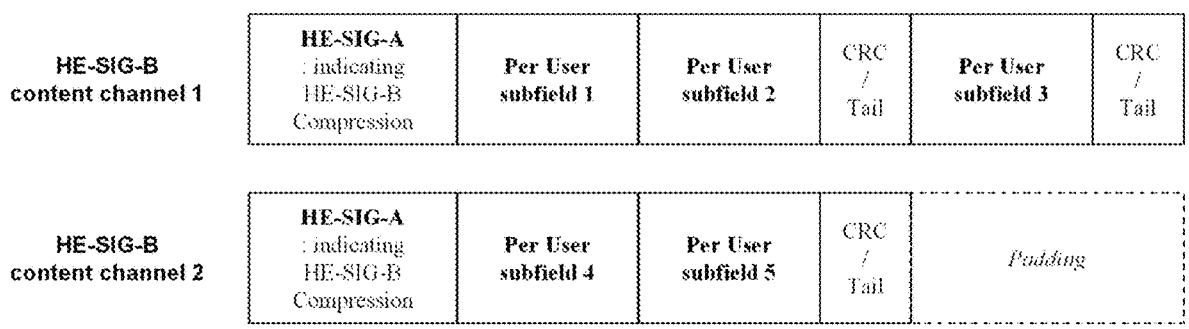
FIG. 17 illustrates a subfield configuration of the HE-SIG-B when a SIG-B compression field indicates a compression mode of the HE-SIG-B.

FIG. 17 illustrates a subfield configuration of the HE-SIG-B when a SIG-B compression field indicates a compression mode of the HE-SIG-B. As described above, when the SIG-B compression field indicates the compression mode (i.e., the full bandwidth MU-MIMO), the RA field is not present in the HE-SIG-B. Therefore, when an MU-MIMO transmission is performed through a bandwidth greater than 20 MHz, the number of users to be allocated to the HE-SIG-B content channel 1 and the HE-SIG-B content channel 2, respectively, should be separately determined. According to an embodiment of the present invention, when the MU-MIMO transmission is performed through a bandwidth greater than 20 MHz, user fields may be split equitably between the two content channels for load balancing. That is, the number of user fields transmitted in each SIG-B content channel is determined as a round up or down value of a half the total number of users. For example, when the total number of user fields is k, the first to the ceil(k/2)-th user fields may be transmitted through the HE-SIG-B content channel 1, and the ceil(k/2)-th to the k-th user fields may be transmitted through the HE-SIG-B content channel 2. If k is an odd number, the number of user fields included in the HE-SIG-B content channel 1 may be one more than the number of user fields included in the HE-SIG-B content channel 2.

Figure 18:
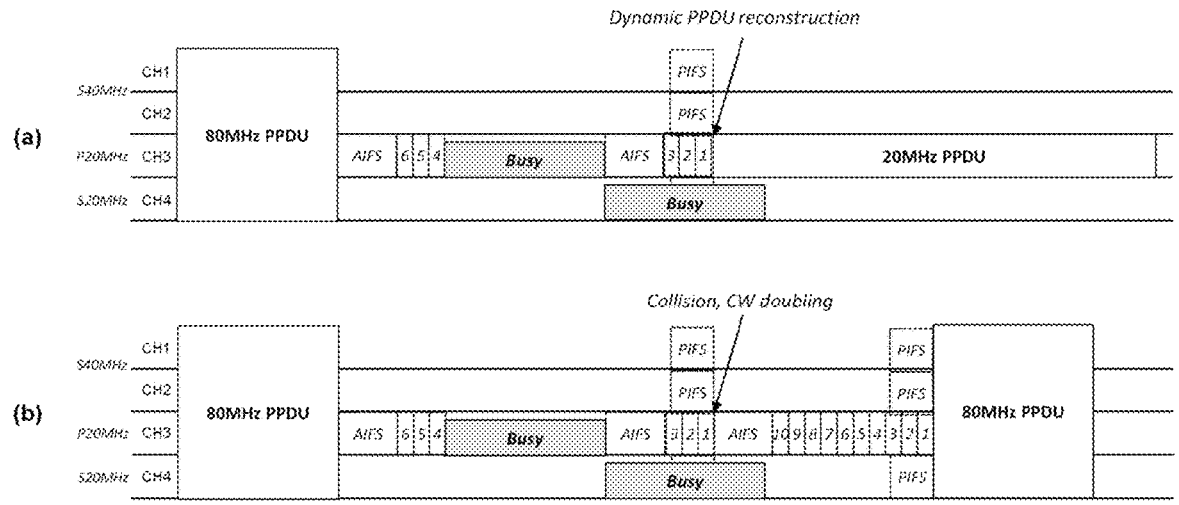
FIGS. 18 to 20 illustrate channel extension methods according to embodiments of the present invention.
Figure 19:
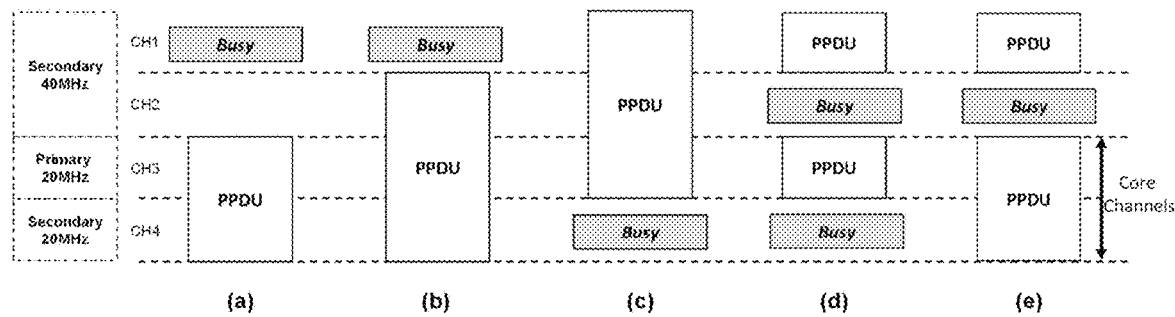
Figure 20:
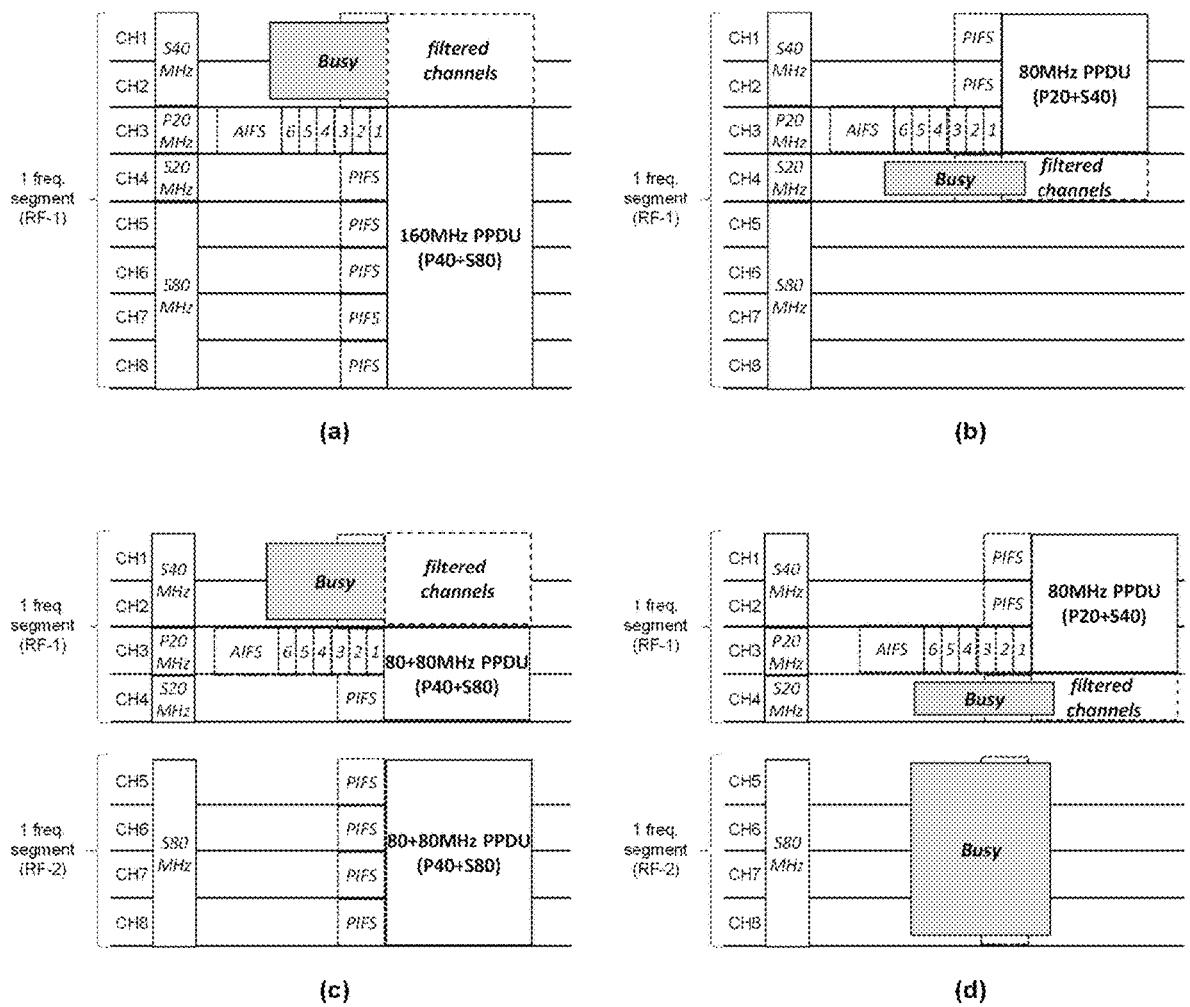

Hereinafter, channel extension methods according to embodiments of the present invention will be described with reference to FIGS. 18 to 20. In the embodiments of FIGS. 18 to 20, CH1 to CH4 refer to respective 20 MHz channels through which an 80 MHz PPDU is transmitted. Also, CH1 to CH8 refer to respective 20 MHz channels through which a 160 MHz PPDU or 80+80 MHz PPDU is transmitted. In this case, it is designated that CH3 is a primary 20 MHz channel (hereinafter, referred to as P20 channel), CH4 is a secondary 20 MHz channel (hereinafter, referred to as S20 channel), and CH1 and CH2 are a secondary 40 MHz secondary channel (hereinafter, referred to as S40 channel), respectively. In addition, it is designated that CH5 to CH8 are a secondary 80 MHz channel (hereinafter, referred to as S80 channel).

First, FIG. 18 illustrates a wideband access method according to an embodiment of the present invention. After the transmission of the previous PPDU is completed, the terminal having data to be transmitted performs a backoff procedure on the P20 channel. The backoff procedure may be started when the P20 channel is idle for an AIFS time. The terminal obtains a backoff counter within a range of a contention window (CW) for the backoff procedure. The terminal performs a CCA and decreases the backoff counter by one when the channel is idle. If the channel is busy, the terminal suspends the backoff procedure and resumes the backoff procedure an AIFS time after when the channel is idle again. When the backoff counter expires through the backoff procedure, the terminal may transmit data. In this case, the terminal performs a CCA for the secondary channels to transmit data for a PIFS time before the backoff counter expires. In the embodiment of FIG. 18, the terminal attempts to transmit an 80 MHz PPDU, and some secondary channels, that is, the S20 channel is detected as busy in the CCA procedure.

When at least a part of the secondary channels on which the CCA is performed are busy, the PPDU transmission bandwidth of the terminal is determined based on the wideband access method. First, FIG. 18(a) illustrates a wideband access method according to a dynamic bandwidth operation. According to the dynamic bandwidth operation, since the S20 channel is busy, the terminal transmits data using only a certain bandwidth, that is, P20 channel according to the conventional channel extension rule. Meanwhile, FIG. 18(b) illustrates a wideband access method according to a static bandwidth operation. According to the static bandwidth operation, since some channels for transmission are busy, the data transmission in the entire bandwidth is delayed. The terminal performs the backoff procedure again using a new backoff counter, and the terminal transmits data using the entire bandwidth when all the channels for the transmission are idle in the CCA before the backoff counter expires. As described above, in the wideband access methods according to the embodiment of FIG. 18, the bandwidth of the transmitted PPDU may be greatly reduced or the transmission of the PPDU may be delayed depending on the state of some secondary channels.

FIG. 19 illustrates a wideband access method according to another embodiment of the present invention. FIGS. 19(a) to 19(e) illustrate situations in which a wideband PPDU is transmitted based on different channel extension techniques, respectively. In each embodiment of FIG. 19, a fixed channel extension method refers to a channel extension method of predetermined unit(s) according to the conventional extension rule in order of 20 MHz, 40 MHz, 80 MHz, and 160 MHz. In addition, a flexible channel extension method refers to a channel extension method of a 20 MHz unit in order of 20 MHz, 40 MHz, 60 MHz, 80 MHz, 100 MHz, 120 MHz, 140 MHz and 160 MHz. In addition, a contiguous channel extension method refers to a channel extension method in which a band occupied by a transmitted PPDU always consists of contiguous channels. Also, a non-contiguous channel extension method refers to a channel extension method in which a band occupied by a transmitted PPDU includes at least one non-contiguous channel. In the embodiment of each figure, a CCA of the secondary channels may be performed for a PIFS time before the backoff counter of the primary channel expires, as described above in the embodiment of FIG. 18.

First, FIG. 19(a) illustrates an embodiment in which a wideband PPDU is transmitted according to a contiguous, fixed channel extension method. According to the present method, the CCA obtains up to four CCA result values for each of the P20 channel, S20 channel, S40 channel and S80 channel, and only reports information on the first channel determined to be busy among them. Since the terminal does not perform bandwidth extension from the first channel determined to be busy, the results of CCA for subsequent channels are not needed. Referring to FIG. 19(a), the S40 channel, which is the first channel determined to be busy as a CCA result, is reported. Therefore, the terminal transmits a PPDU through a 40 MHz band aggregating the P20 channel and the S20 channel According to the present method, although the burden of report of CCA result value is reduced, there is a disadvantage that the channel utilization is poor.

Next, FIG. 19(b) illustrates an embodiment in which a wideband PPDU is transmitted according to a contiguous, flexible channel extension method. According to the present method, the CCA obtains eight CCA result values for each channel constituting the 160 MHz band. According to an embodiment, all the obtained eight CCA result values may be reported. However, according to another embodiment, only information about the first channels, which are determined to be busy, of both sides based on the P20 channel may be reported. Since the terminal does not perform bandwidth extension from the first two channels, which are determined to be busy, of the both sides, the results of CCA for the subsequent channels are not needed. Referring to FIG. 19(b), channels CH1 and CH5 (not illustrated), which are determined to be busy as a CCA result, are reported. Therefore, the terminal transmits a PPDU through a 60 MHz band including CH2, CH3 and CH4. According to the present method, it is possible to transmit a PPDU having a wider bandwidth composed of contiguous channels, but there is a disadvantage that the transmission bandwidth of the wideband PPDU can be very limited depending on the position of the secondary channel occupied by OBSS terminals.

Next, FIG. 19(c) illustrates an embodiment in which a wideband PPDU is transmitted according to a non-contiguous, fixed channel extension method. According to the present method, the CCA obtains up to four CCA result values for each of the P20 channel, S20 channel, S40 channel and S80 channel, and reports information on all the channels determined to be busy among them. The terminal transmits a PPDU using channels that are not busy among the reported channels. Referring to FIG. 19(c), the S20 channel and the S80 channel (not illustrated), which are channels determined to be as a CCA result, are reported. Therefore, the terminal transmits a PPDU through a 60 MHz band including the P20 channel and the S40 channel. According to the present method, the channel utilization can be improved compared to the relatively small burden of report of CCA result values. That is, a maximum of one non-contiguous section occurs even in the 160 MHz bandwidth, and it is possible to transmit the wideband PPDU even when the S20 channel and/or the S40 channel is occupied by OBSS terminals.

Next, FIG. 19(d) illustrates an embodiment in which a wideband PPDU is transmitted according to a non-contiguous, flexible channel extension method. According to the present method, the CCA obtains eight CCA result values for each channel constituting the 160 MHz band, and reports all the obtained eight CCA result values. The terminal transmits a PPDU using channels that are not busy among the reported channels. Referring to FIG. 19(d), channels CH2, CH4, and CH5 (not illustrated) to CH8 (not illustrated), which are determined to be busy as a CCA result, are reported. Therefore, the terminal transmits a PPDU in a 40 MHz band including CH1 and CH3. According to the present method, the channel utilization is the highest, but the burden of report of CCA result value is large. In addition, a plurality of non-contiguous sections may occur in the transmitted PPDU.

Finally, FIG. 19(e) illustrates an embodiment in which a wideband PPDU is transmitted according to a non-contiguous, limited flexible channel extension method. In the embodiment of the present invention, the limited flexible channel extension method follows the flexible channel extension method described above. However, in the flexible channel extension method, the band occupied by a transmitted PPDU always consists of including the predetermined core channels along with the P20 channel. In the embodiment of FIG. 19(e), a 40 MHz channel (i.e., P40 channel) including a P20 channel and an S20 channel is set as the core channels. According to the present method, the CCA obtains eight CCA result values for each channel constituting the 160 MHz band, and reports all the obtained eight CCA result values. The terminal transmits a PPDU using channels that are not busy among the reported channels. In this case, the terminal performs the PPDU transmission only when a PPDU configuration is possible through a band including the above-described core channels. According to the present method, there are advantages that the performance similar to that of the embodiment of FIG. 19(d) is achieved, and the decoding position of the HE-SIG-B can be guaranteed within the P40 channel when the P40 channel is set as the core channels.

FIG. 20 illustrates specific embodiments for transmitting a wideband PPDU according to the non-contiguous, fixed channel extension method of the embodiment of FIG. 19(c) described above. FIGS. 20(a) and 20(b) illustrate embodiments in which the terminal is equipped with one RF module and supports transmission of a PPDU of up to 160 MHz. In addition, FIGS. 20(c) and 20(d) illustrate embodiments in which the terminal is equipped with two RF modules and supports transmission of a PPDU of up to 80+80 MHz. It is assumed that the PPDU transmitted in the embodiment of FIG. 20 is an OFDMA-based HE MU PPDU.

First, FIG. 20(a) illustrates a situation in which the terminal attempts to transmit a PPDU through a bandwidth of 160 MHz but the S40 channel is busy as a result of CCA. The terminal transmits a PPDU through a 140 MHz band including a P40 channel (i.e., P20 channel+S20 channel) and a S80 channel. In this case, the terminal postpones the transmission of data allocated to the S40 channel among the PPDU configured based on OFDMA. The S40 channel becomes a filtered channel in which no data is transmitted. In the embodiment of FIG. 20(a), the PPDU is transmitted using a 160 MHz spectral mask. Furthermore, in the S40 channel determined to be busy, filtering is performed and no data is transmitted. However, since a 40 MHz spectral mask is not applied to the signal transmitted through the P40 channel, signals of some resource units adjacent to the boundary of the S40 channel may interfere with OBSS signal transmitted through the S40 channel. Therefore, according to the embodiment of the present invention, in the non-contiguous PPDU transmission situations, some resource units of a transmission channel adjacent to an unassigned channel may be additionally filtered thereby not transmitting data.

Next, FIG. 20(b) illustrates a situation in which the terminal attempts to transmit a PPDU through a bandwidth of 80 MHz but the S20 channel is busy as a result of CCA. The terminal transmits a PPDU through a 60 MHz band including the P20 channel and the S40 channel. In this case, the terminal postpones the transmission of data allocated to the S20 channel among the PPDU configured based on OFDMA. The S20 channel becomes a filtered channel in which no data is transmitted. In the embodiment of FIG. 20(b), the PPDU is transmitted using an 80 MHz spectral mask. Furthermore, in the S20 channel determined to be busy, filtering is performed and no data is transmitted. However, since a 20 MHz spectral mask is not applied to the signal transmitted through the P20 channel, signals of some resource units adjacent to the boundary of the S20 channel may interfere with OBSS signal transmitted through the S20 channel. Therefore, according to the embodiment of the present invention, in the non-contiguous PPDU transmission situations, some resource units of a transmission channel adjacent to an unassigned channel may be additionally filtered thereby not transmitting data.

Next, FIG. 20(c) illustrates a situation in which the terminal attempts to transmit a PPDU through a bandwidth of 80+80 MHz but the S40 channel is busy as a result of CCA. The terminal transmits a PPDU through the P40 channel (i.e., P20 channel+S20 channel) and the S80 channel, respectively, using two RF modules. In this case, the terminal postpones the transmission of data allocated to the S40 channel among the PPDU configured based on OFDMA. The terminal transmits, by using the first RF module, the PPDU to which a 40 MHz spectral mask is applied through the P40 channel. In addition, the terminal transmits, by using the second RF module, the PPDU to which an 80 MHz spectral mask is applied through the S80 channel Therefore, in the embodiment of FIG. 20(c), no additional filtering of resource units included in the transmission channel is required since the transmission channel does not interfere with the unassigned channel S40.

Next, FIG. 20(d) illustrates a situation in which the terminal attempts to transmit a PPDU through a bandwidth of 80+80 MHz but the S20 channel and the S80 channel are busy as a result of CCA. The terminal transmits a PPDU through a 60 MHz band including the P20 channel and the S40 channel using only the first RF module. In this case, the second RF module need not be used, and the operation in the first RF module is as described in the embodiment of FIG. 20(b).

The PPDU transmission methods according to the embodiment of FIG. 20 may be implemented more easily than the wideband access method according to the dynamic bandwidth operation described in the embodiment of FIG. 18(a). According to the dynamic bandwidth operation, the PPDU should be reconfigured based on the available bandwidth according to the CCA result before the transmission of the wideband PPDU. In this case, since the PPDU is dynamically reconfigured, the implementation complexity is increased such that the length of the PPDU should be limited to the length of the allocated TXOP. However, according to the embodiment of FIG. 20, the implementation is relatively easy since the terminal configures an OFDMA-based PPDU in advance and then transmits only the data allocated to the idle channels and filters the data allocated to the remaining busy channels.

Figure 22:
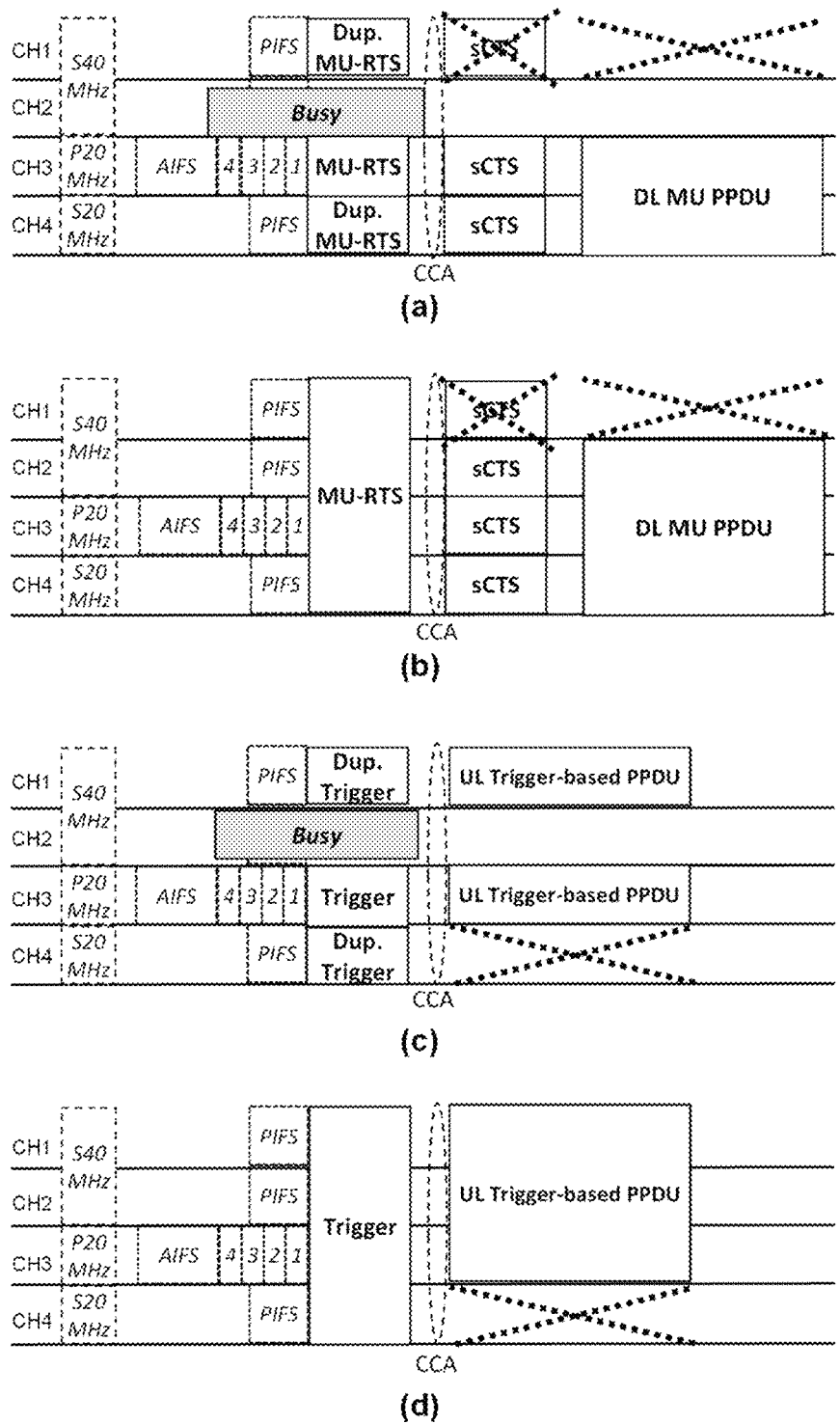
Figure 23:
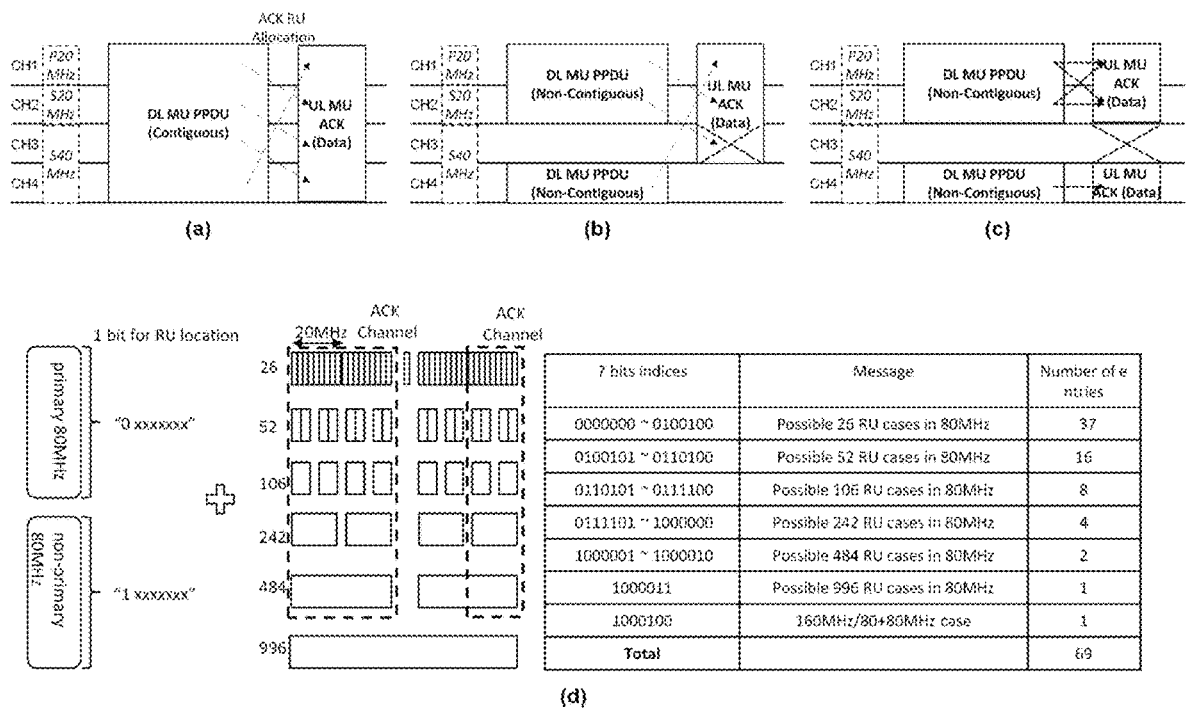

Hereinafter, transmission sequences of a non-contiguous PPDU according to embodiments of the present invention will be described with reference to FIGS. 21 to 23. In the embodiments of FIGS. 21 to 23, CH1 to CH4 refer to respective 20 MHz channels constituting the 80 MHz bandwidth. In addition, in the embodiments of FIGS. 21 and 22, it is designated that CH3 is a P20 channel, CH4 is an S20 channel, and CH1 and CH2 are an S40 channel, respectively. In the embodiments of FIGS. 21 to 23, duplicative descriptions of parts which are the same or corresponding as those of the above-described embodiments of FIGS. 8 and 9 will be omitted.

FIG. 21 illustrates a transmission sequence of a non-contiguous PPDU according to an embodiment of the present invention. FIGS. 21(a) and 21(b) illustrate downlink transmission sequences of a non-contiguous PPDU, and FIGS. 21(c) and 21(d) illustrate uplink transmission sequences of a non-contiguous PPDU.

First, FIG. 21(a) illustrates an embodiment in which an AP performs a CCA for a DL-MU transmission process but the S20 channel is busy. The AP transmits an MU-RTS frame through the P20 channel and the S40 channel which are idle. STAs receiving the MU-RTS frame from the AP transmit a sCTS frame through the corresponding channel. The AP transmits a DL MU PPDU through the channel on which the sCTS frame is received. In this case, the MU-RTS frame should indicate non-contiguous channel allocation information, that is, the P20 channel and the S40 channel (or the unassigned S20 channel). According to an embodiment, the MU-RTS frame may signal the non-contiguous channel allocation information via a bandwidth field, an RA field, or a combination thereof.

Next, FIG. 21(b) illustrates an embodiment in which an AP transmits an MU-RTS frame through an idle P80 channel (i.e., P20 channel+S20 channel+S40 channel), but a sCTS frame of STAs is not received through the S20 channel. The AP transmits a DL MU PPDU through the P20 channel and the S40 channel on which the sCTS frame is received. In this case, the MU-RTS frame should indicate channel allocation information, i.e., the P80 channel. The channel allocation information may be signaled via a separate bandwidth field. In addition, the DL MU PPDU should indicate non-contiguous channel allocation information through which the corresponding PPDU is transmitted, that is, the P20 channel and the S40 channel (or the unassigned S20 channel). The non-contiguous channel allocation information may be signaled via a bandwidth field, an RA field, or a combination thereof.

Next, FIG. 21(c) illustrates an embodiment in which an AP performs a CCA for a UL-MU transmission process but the S20 channel is busy. The AP transmits a trigger frame through the P20 channel and the S40 channel which are idle. STAs receiving the trigger frame from the AP transmit a UL MU PPDU through designated channel(s). In this case, the trigger frame should indicate non-contiguous channel allocation information, that is, the P20 channel and the S40 channel (or the unassigned S20 channel), for the UL MU PPDU transmission of STAs. In addition, the trigger frame should not assign the busy S20 channel to the uplink transmission of the STAs. According to an embodiment, the trigger frame may signal the non-contiguous channel allocation information via a bandwidth field, an RA field, or a combination thereof.

Finally, FIG. 21(d) illustrates a sequence in which an AP transmits a trigger frame through an idle P80 channel and STAs transmit a UL MU PPDU in response thereto. In this case, among the STAs receiving the trigger frame, STAs allocated to the S20 channel do not perform a transmission for the reason that the corresponding channel is detected as busy or a NAV has been set.

FIG. 22 illustrates a transmission sequence of a non-contiguous PPDU according to another embodiment of the present invention. FIGS. 22(a) and 22(b) illustrate downlink transmission sequences of a non-contiguous PPDU, and FIGS. 22(c) and 22(d) illustrate uplink transmission sequences of a non-contiguous PPDU. In the embodiment of FIG. 22 and the following embodiments, an S40A channel refers to the first 20 MHz channel (i.e., CH1) that constitutes the S40 channel, and an S40B channel refers to the second 20 MHz channel (i.e., CH2) that constitutes the S40 channel.

First, FIG. 22(a) illustrates an embodiment in which an AP performs a CCA for a DL-MU transmission process but the S40B channel is busy. The AP transmits an MU-RTS frame through the P40 channel and the S40A channel which are idle. STAs receiving the MU-RTS frame from the AP transmit a sCTS frame through the corresponding channel. In this case, the MU-RTS frame should indicate the non-contiguous channel allocation information, that is, the P40 channel and the S40A channel (or the unassigned S40B channel). According to an embodiment, the MU-RTS frame may signal the non-contiguous channel allocation information via a bandwidth field, an RA field, or a combination thereof. Meanwhile, in the embodiment of FIG. 22(a), among the STAs that have received the MU-RTS, STAs indicated to transmit the sCTS frame through the S40A channel do not transmit the sCTS for the reason that the corresponding channel is detected as busy or a NAV has been set. In this case, the AP transmits a DL MU PPDU only through the P20 channel and the S20 channel on which the sCTS is received.

Next, FIG. 22(b) illustrates an embodiment in which an AP transmits an MU-RTS frame through an idle P80 channel, but the sCTS frame of the STAs is not received on the S40A channel. The AP transmits a DL MU PPDU through the P40 channel and the S40B channel on which the sCTS frame is received. In this case, the MU-RTS frame should indicate the P80 channel as channel allocation information, and the DL MU PPDU should indicate non-contiguous channel allocation information, that is, the P40 channel and the S40B channel (or the unassigned S40A channel). The signaling method of the channel allocation information is as described above in the embodiment of FIG. 21(b).

Next, FIG. 22(c) illustrates an embodiment in which an AP performs a CCA for the UL-MU transmission process but the S40B channel is busy. The AP transmits a trigger frame through the P40 channel and the S40A channel which are idle. In this case, the trigger frame indicates non-contiguous channel allocation information, i.e., the P40 channel and the S40A channel (or the unassigned S40B channel), for the UL MU PPDU transmission of STAs. The trigger frame may signal the non-contiguous channel allocation information via a bandwidth field, an RA field, or a combination thereof. Meanwhile, among the STAs receiving the trigger frame in the embodiment of FIG. 22(c), STAs indicated to transmit uplink data through the S20 channel do not transmit uplink data for the reason that the channel is detected as busy or a NAV has been set. Thus, the AP may receive a UL MU PPDU through a band that is equal to or narrower than the band on which the trigger frame has been transmitted.

Finally, FIG. 22(d) illustrates an embodiment in which an AP transmits a trigger frame through an idle P80 channel, but STAs allocated to the S20 channel do not perform a transmission for the reason that the corresponding channel is detected as busy or a NAV has been set.

FIG. 23 illustrates an embodiment of an ACK frame transmission method in a PPDU transmission sequence. In the embodiment of FIG. 23, it is designated that CH1 is a P20 channel, CH2 is an S20 channel, and CH3 and CH4 are an S40 channel, respectively.

First, FIG. 23(a) illustrates an embodiment of an ACK frame transmission method in a transmission sequence of a contiguous PPDU. The AP transmits a DL MU PPDU using a contiguous bandwidth of 80 MHz, and the receiving STAs transmit a UL MU response. In this case, the STAs transmit an immediate uplink response according to scheduling information included in the A-MPDU of the received DL MU PPDU. The scheduling information is obtained from a trigger frame included in the A-MPDU or a UL MU response scheduling field included in a MAC header of a specific MPDU constituting the A-MPDU. Also, the uplink response transmitted by the STAs includes uplink ACK, uplink data, and the like. According to an embodiment of the present invention, the scheduling information, that is, the resource units through which the STAs perform the UL MU response may be indicated via a separate resource unit allocation (RA) field. FIG. 23(d) illustrates an embodiment in which resource units for uplink transmission are assigned through the separate RA field.

Referring to FIG. 23(d), the RA field consists of 8 bits in total, and the first bit indicates whether the corresponding resource unit(s) is located at the primary 80 MHz or the secondary 80 MHz. The remaining 7 bits of the RA field indicate resource unit allocation within the corresponding 80 MHz band. That is, a size of a predetermined resource unit and a placement of the corresponding resource unit are indicated according to the index value of the RA field. In the embodiment of FIG. 23(a), STAs may transmit an uplink ACK through a designated resource unit within an 80 MHz band on which the DL MU PPDU has been transmitted.

However, as in the embodiment of FIG. 23(b), a problem may occur in a resource unit allocation for ACK frame transmission in the transmission sequence of a non-contiguous PPDU. More specifically, as illustrated in FIG. 23(b), when there is no constraint on the resource unit through which the ACK frame for the non-contiguous PPDU is transmitted, an uplink ACK may be transmitted through a channel (i.e., CH3) which is not used for the DL MU PPDU transmission. This may cause interference with OBSS signal transmitted through CH3. As described above in the embodiment of FIGS. 21 and 22, the transmission of the non-contiguous PPDU may be determined immediately before the PPDU transmission according to the CCA results for multiple channels. Thus, it may be impossible to adjust the scheduling information for the resource units on which the UL MU response of the STAs is to be performed, immediately before the transmission of the non-contiguous PPDU.

In order to solve such a problem, as illustrated in FIG. 23(c), a constraint may be applied to resource unit allocation for the ACK frame transmission. According to the embodiment of the present invention, STAs receiving the DL MU PPDU from the AP transmit an uplink ACK within a 20 MHz channel where the resource unit on which the corresponding PPDU has been received is located. If a STA receives a DL MU PPDU with MU-MIMO through a 40 MHz channel or an 80 MHz channel, the STA may transmit an uplink ACK within the corresponding 40 MHz channel or 80 MHz channel. The AP signals such scheduling information for the ACK frame transmission of STAs.

Referring to FIG. 23(c), the AP transmits a DL MU PPDU through the P40 channel and the S40B channel. In this case, STAs receiving the PPDU through the S40B channel (i.e., a 20 MHz channel) transmit an ACK frame within the S40B channel. If a full bandwidth MU-MIMO transmission is performed on the P40 channel (i.e., a 40 MHz channel), STAs may transmit an ACK frame within the P40 channel. However, if an OFDMA transmission is performed on the P40 channel, STAs transmit an ACK frame within a 20 MHz channel where a resource unit on which the PPDU has been received is located.

Meanwhile, although an embodiment of the ACK frame transmission method in the DL-MU transmission process has been described with reference to FIG. 23, the present invention is not limited thereto and may be similarly applied to the UL-MU transmission process. That is, in response to a trigger frame of the AP, STAs may transmit an HE Trigger-based PPDU through the allocated resource unit. The AP transmits a downlink ACK in response to the HE Trigger-based PPDU(s) transmitted by the STAs. In this case, the AP transmits an ACK frame for each STA within a 20 MHz channel where a resource unit on which the corresponding STA has transmitted the HE Trigger-based PPDU is located. Therefore, a STA that has transmitted the HE Trigger-based PPDU may receive the ACK frame within the 20 MHz channel where the resource unit on which the PPDU has been transmitted is located.

FIG. 24 illustrates a method of setting a TXOP of an MU transmission process as an additional embodiment of the present invention. According to the embodiment of the present invention, a TXOP may be set using both of TXOP information of the HE-SIG-A and duration field information of the MAC header.

FIG. 24(a) illustrates an embodiment of an arrangement situation of terminals adjacent to a specific BSS. In the embodiment of FIG. 24(a), an AP communicates with STA1 and STA2, and hidden nodes L1, H1, L2 and H2 are present based on a specific terminal. Here, L1 and L2 refer to a legacy STA, respectively, and H1 and H2 refer to a non-legacy STA, respectively. L1 and H1 can sense messages of the AP, but cannot receive messages of STA1 and STA2. Thus, L1 and H1 may interfere with the AP when the AP receives messages from STA1 and STA2. On the other hand, L2 and H2 can sense messages of STA2, but cannot receive messages of AP. Thus, L2 and H2 may interfere with STA2 when STA2 receives messages from the AP. Therefore, in order to protect the MU transmission process, a NAV should be set in the hidden nodes L1, H1, L2 and H2.

FIG. 24(b) illustrates a method in which a TXOP of a UL-MU transmission process is set in the arrangement situation of the terminals of FIG. 24(a). First, the AP transmits an MU-RTS frame on multiple channels (for example, 40 MHz). In this case, the legacy preambles such as L-STF, L-LTF, and L-SIG are transmitted in duplicate for each 20 MHz channel. If the MU-RTS frame is transmitted in the legacy format, H1 and L1 which have received the MU-RTS frame set a NAV based on a duration field of a MAC header of the MU-RTS frame.

Next, STA1 and STA2 receiving the MU-RTS frame transmit a sCTS frame after a SIFS time. In this case, the sCTS frame may be transmitted in units of 20 MHz channel STAs receiving the MU-RTS may restrict a transmission of the sCTS frame considering a NAV already set in the corresponding terminal. H2 and L2 receiving the sCTS frame set a NAV based on a duration field of a MAC header of the sCTS frame.

The AP receiving the sCTS frame may transmit a trigger frame in HE PPDU format. In this case, in the trigger frame, the TXOP duration field of the HE-SIG-A and the duration field of the MAC header indicate duration information, respectively. The two duration fields may have different bit configurations with each other. For example, the number of bits in the TXOP duration field may be less than the number of bits in the duration field of the MAC header. In this case, the setting method of each duration field and/or the interpretation method of each duration field should be determined in order to set a correct NAV of the neighboring terminals.

According to an embodiment of the present invention, when the TXOP duration field consists of t bits and the duration field of the MAC header consists of m bits (where t<m), the value of the duration field of the MAC header may be set to not exceed the value of the TXOP duration field. For example, if the TXOP duration field consists of 12 bits and the duration field of the MAC header consists of 15 bits, the value of the duration field of the MAC header shall not exceed the maximum value that the TXOP duration field can represent, that is, $2^{12}=4096$ us. In this case, the interpretation of each duration field may be performed in the same way.

According to another embodiment of the present invention, when the number of bits in the TXOP duration field and the number of bits in the duration field of the MAC header are different from each other, a predetermined scaling factor may be multiplied when performing an interpretation of any one of the above fields. For example, if the TXOP duration field consists of 12 bits and the duration field of the MAC header consists of 15 bits, the value of the TXOP duration field may be used after a scaling factor 8 is multiplied. In this way, by using the predetermined scaling factor, duration information indicated by the duration fields of different number of bits may have similar range.

However, if the value of the TXOP duration field is used after the scaling factor 8 is multiplied, duration information obtained from the two duration fields may have a difference of up to jus. According to an embodiment of the present invention, a STA that has interpreted all of the two duration fields may set a NAV based on the duration field of the MAC header having a larger number of bits. However, a STA which can only interpret the TXOP duration field of the HE-SIG-A among the two duration fields sets a NAV based on the TXOP duration field. In preparation for this situation, the value of the TXOP duration field in a PPDU may be set to a value which is larger or smaller than the value of the duration field of the MAC header by the maximum offset (e.g., 7 us).

In the embodiment of FIG. 24(*b*), since H1 receiving the trigger frame can interpret both the TXOP duration field of the HE-SIG-A and the duration field of the MAC header, it may update a NAV using both the two fields. However, L1 cannot update a NAV because it cannot interpret the non-legacy preamble and MPDU of the HE PPDU.

On the other hand, STA1 and STA2 receiving the trigger frame transmit an HE Trigger-based PPDU. In this case, since H2 receiving the HE Trigger-based PPDU can interpret both the duration field of the HE-SIG-A TXOP and the duration field of the MAC header, it may update a NAV using both the two fields. However, L2 cannot update a NAV because it cannot interpret the non-legacy preamble and MPDU of the HE Trigger-based PPDU.

FIGS. 25 to 31 illustrate methods of signaling non-contiguous channel allocation information according to various embodiments of the present invention. In the embodiment of the present invention, non-contiguous channel allocation refers to channel allocation in which a band occupied by the transmitted packet (i.e., PPDU) includes at least one non-contiguous channel (or non-contiguous resource unit). However, a full bandwidth 80+80 MHz channel is regarded as a contiguous channel like a full bandwidth 160 MHz channel. Thus, a non-contiguous channel (or non-contiguous PPDU) in the embodiments of the present invention may refer to non-contiguous channels except for the full bandwidth 80+80 MHz channel. In the embodiments of FIGS. 25 to 31, channel A to channel D refer to each 20 MHz channel through which an 80 MHz PPDU is transmitted. In this case, it is designated that channel A is a P20 channel, channel B is an S20 channel, and channel C and channel D are an S40 channel, respectively. Also, in each embodiment, an S40A channel may refer to channel C, and an S40B channel may refer to channel D.

In the embodiment of the present invention, a transmitter (e.g., an AP) signals non-contiguous channel allocation information through embodiments illustrated in each figure or combinations thereof. The transmitter may perform a CCA of multiple channels for a wideband packet transmission. In this case, the wideband may refer to a band having a total bandwidth of 40 MHz or more, but the present invention is not limited thereto. The transmitter transmits a packet through at least one channel which is idle based on the result of performing the CCA of multiple channels. In this case, when the packet is transmitted through a non-contiguous channel, the transmitter signals non-contiguous channel allocation information via a non-legacy preamble of the packet. As such, the transmitter transmits a wireless packet in which non-contiguous channel allocation information is signaled. A receiver (e.g., a STA) receives the wireless packet and obtains the non-contiguous channel allocation information from the received packet. The receiver decodes the received packet based on the obtained non-contiguous channel allocation information. In this case, the received packet may be an HE MU PPDU, but the present invention is not limited thereto.

Figure 25:
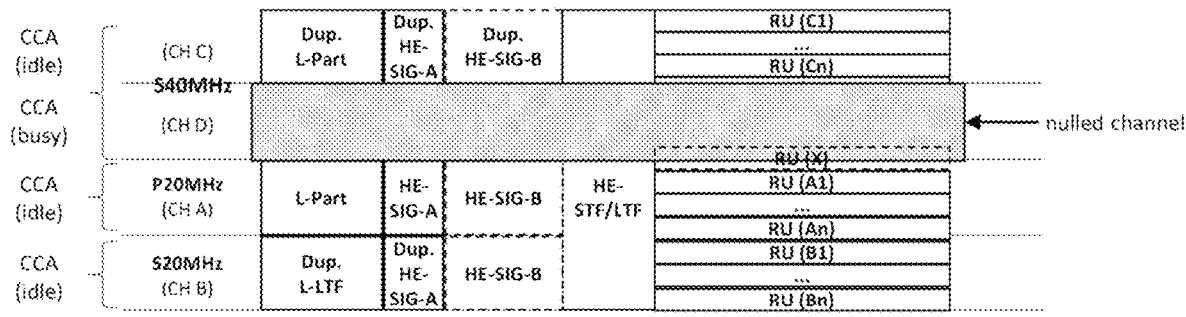
FIGS. 25 to 31 illustrate methods of signaling non-contiguous channel allocation information according to various embodiments of the present invention.

FIG. 25 illustrates a signaling method of non-contiguous channel allocation information according to an embodiment of the present invention. In the embodiment of FIG. 25, the AP performs a CCA of channel A to channel D to transmit a DL MU PPDU through a total bandwidth of 80 MHz, and the S40B channel is determined to be busy. The AP transmits a PPDU through the P40 channel and the S40A channel which are idle. The AP performs nulling of data tones of the busy S40B channel and does not transmit any signal. In this case, non-contiguous channel allocation information, that is, allocation information of the P40 channel and the S40A channel (or information of the unassigned S40B channel) should be signaled on the transmitted PPDU.

First, the non-contiguous channel allocation information may be indicated via the bandwidth field of the HE-SIG-A. The bandwidth field may indicate specific non-contiguous channel allocation information through a predetermined index. According to an embodiment, the bandwidth field may explicitly indicate specific non-contiguous channel allocation information. Therefore, the allocation information of the P40 channel and the S40A channel may be indicated via the bandwidth field.

Also, the non-contiguous channel allocation information may be indicated via the RA field of the HE-SIG-B. The RA field may indicate a specific resource unit not assigned to a user through a predetermined index. For example, the RA field may indicate that a resource unit of a multiple of a 20 MHz channel, i.e. 242-tone, 484-tone or 996-tone, is not assigned to a user. Data transmission is not performed in an empty resource unit indicated by a predetermined index value.

Also, the non-contiguous channel allocation information may be indicated by carrying a null STA ID in a specific user field of the HE-SIG-B. That is, a predetermined null STA ID is contained in a user field corresponding to an unassigned resource unit in which data is not transmitted. Therefore, no STA receives data through the unassigned resource unit.

Figure 26:
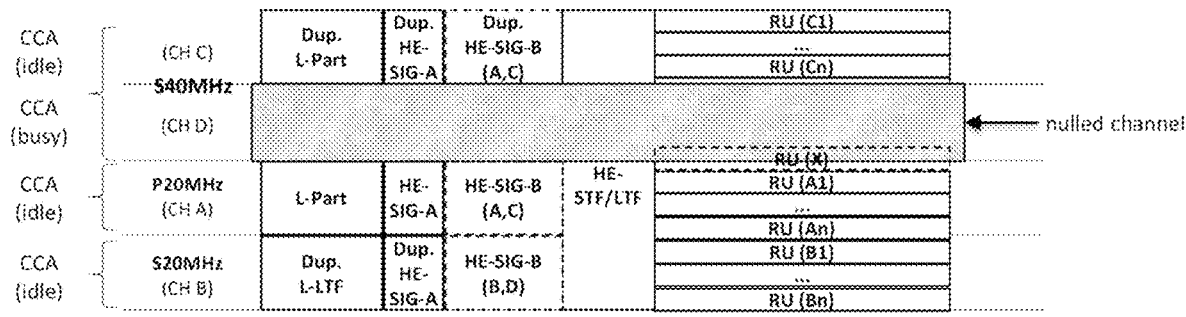

FIG. 26 illustrates a method of signaling non-contiguous channel allocation information via the bandwidth field of the HE-SIG-A according to an embodiment of the present invention. The bandwidth field of an HE MU PPDU may indicate predetermined non-contiguous channel bandwidths in addition to the contiguous channel bandwidths of 20 MHz, 40 MHz, 80 MHz, and 160 MHz (including 80+80 MHz). If the bandwidth field indicates a predetermined non-contiguous channel bandwidth, additional allocation information of the non-contiguous channel may be indicated via a subfield of the HE-SIG-B.

As described above, the HE-SIG-B may consist of a maximum of two content channels, i.e., the HE-SIG-B content channel 1 and the HE-SIG-B content channel 2 in units of 20 MHz. Each HE-SIG-B content channel in the total band is arranged in order of the physical frequency band. That is, the HE-SIG-B content channel 1 is transmitted in the lowest frequency band, and the HE-SIG-B content channel 2 is transmitted in the next higher frequency band. Such a content channel configuration is then duplicated through content duplication in the next higher frequency bands. In the embodiment of FIG. 26, the HE-SIG-B content channel 1 signals resource unit allocation information of channel A and channel C, and the HE-SIG-B content channel 2 signals resource unit allocation information of channel B and channel D. The HE-SIG-B content channel 1 is transmitted through channel A and channel C. However, since a PPDU transmission is not performed in channel D, the HE-SIG-B content channel 2 is transmitted only through channel B. In this case, the HE-SIG-B content channel 2 transmitted through the channel B may indicate that channel D is not used.

Figure 27:
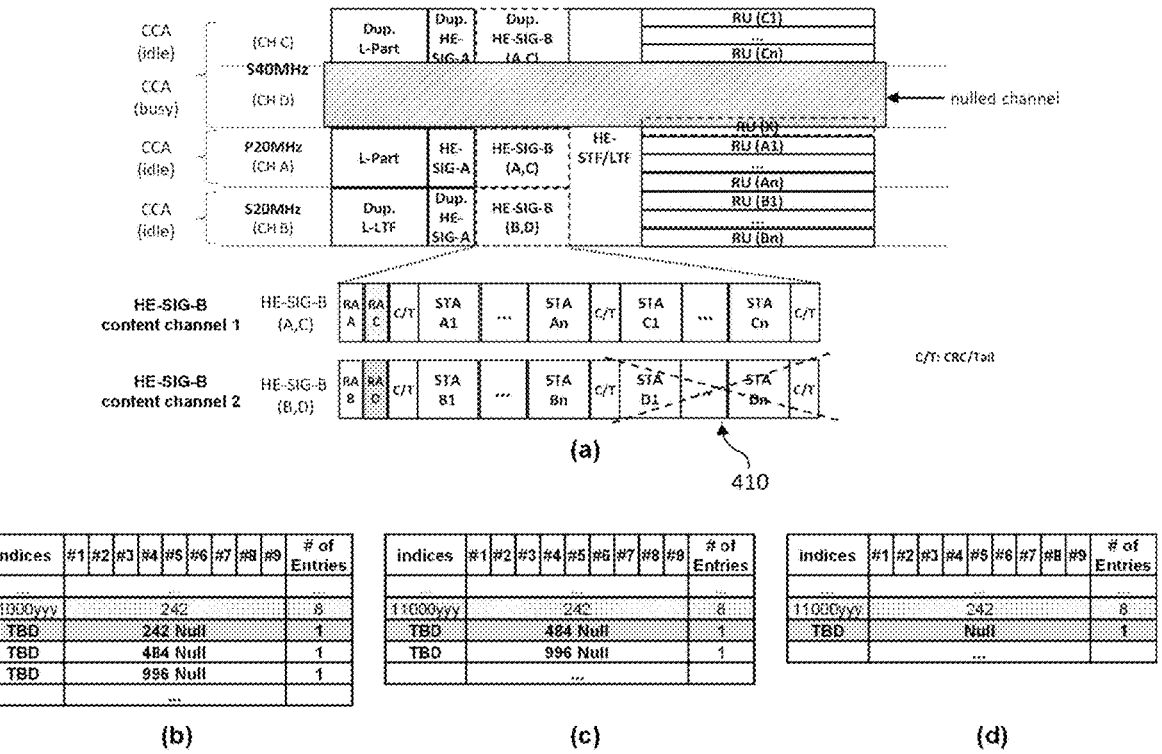

FIG. 27 illustrates a method of signaling non-contiguous channel allocation information via the RA field of the HE-SIG-B according to an embodiment of the present invention. As described above, the RA field consists in units of 8 bits, and indexes the sizes of the resource units constituting the specific bandwidth and their placement in the frequency domain. Further, the RA field may indicate the number of users in each resource unit. In this case, the RA field may indicate a specific resource unit (i.e., an unassigned RU) not assigned to a user through a predetermined index. According to an embodiment, the specific resource unit includes a resource unit (RU) having a bandwidth of a multiple of a 20 MHz channel, i.e., 242-tone RU, 484-tone RU, 996-tone RU, and the like. Data transmission is not performed in the unassigned RU indicated by the index value.

As shown in FIG. 27(*a*), when the total bandwidth through which a PPDU is transmitted is 80 MHz, two RA fields are transmitted in each HE-SIG-B content channel. That is, the first RA field (i.e., 8 bits) of the HE-SIG-B content channel 1 signals resource unit allocation information of channel A, and the second RA field (i.e., 8 bits) of the HE-SIG-B content channel 1 signals resource unit allocation information of channel C. Similarly, the first RA field (i.e., 8 bits) of the HE-SIG-B content channel 2 signals resource unit allocation information of channel B, and the second RA field (i.e., 8 bits) of the HE-SIG-B content channel 2 signals resource unit allocation information of channel D. If the channel D is busy as in the embodiment of FIG. 27(*a*), the HE-SIG-B content channel 2 is transmitted only through channel B, and the HE-SIG-B content channel 1 is transmitted through channel A and channel C. In this case, specific embodiments of signaling through the RA field of the HE-SIG-B that the channel D is not assigned to a user will be described with reference to FIGS. 27(*b*) to 27(*d*).

First, according to an embodiment of the present invention, as shown in FIG. 27(*b*), the RA field corresponding to the unassigned 20 MHz channel, that is, the second RA field of the HE-SIG-B content channel 2 may indicate a nulling of 242-tone RU. However, the second RA field of the HE-SIG-B content channel 1 indicates a 242-tone RU or indicates RUs partitioned into smaller sizes according to resource allocation information of channel C. As above, the RA field may perform independent and explicit signaling for each channel Therefore, the RA field corresponding to the unassigned channel D indicates that the corresponding resource unit is not assigned to a user (i.e. nulling).

Next, according to another embodiment of the present invention, as shown in FIG. 27(*c*), the RA field corresponding to the unassigned 20 MHz channel, that is, the second RA field of the HE-SIG-B content channel 2 may indicate a nulling of 484-tone RU. However, since the second RA field of the HE-SIG-B content channel 1 indicates resource allocation information of the channel C, it can be identified that the unassigned channel is channel D of a 20 MHz bandwidth.

Next, according to yet another embodiment of the present invention, as shown in FIG. 27(*d*), the RA field corresponding to the unassigned 20 MHz channel may indicate a general nulling rather than a nulling of resource units of a specific bandwidth such as 242-tone RU, 484-tone RU, 996-tone RU, and the like. In this case, the nulling indicated by the RA field may implicitly be interpreted as a nulling of 242-tone RU (i.e., 20 MHz channel), and information of resource units assigned to users may be obtained via another RA field.

As such, when the RA field indicates that a specific resource unit is not assigned to a user, a user specific field corresponding to the resource unit is not transmitted. Thus, as shown in FIG. 27(*a*), the HE-SIG-B content channel 2 signaling resource unit allocation information of channel D does not carry the user specific field 410 corresponding to channel D.

Figure 28:
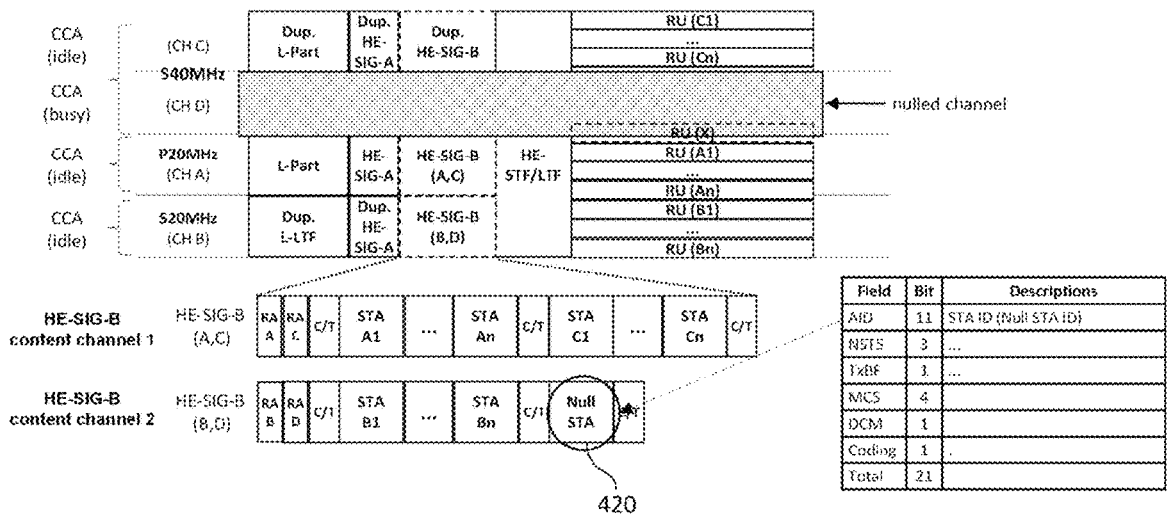

FIG. 28 illustrates a method of signaling non-contiguous channel allocation information via the user field of the HE-SIG-B according to an embodiment of the present invention. As described above, the non-contiguous channel allocation information may be indicated by carrying a null STA ID in a specific user field of the HE-SIG-B. The RA field of the HE-SIG-B may indicate resource allocation information corresponding to an unassigned resource unit, and a predetermined null STA ID may be contained in a user field corresponding to the unassigned resource unit.

If channel D is not used as in the embodiment of FIG. 28, the second RA field of the HE-SIG-B content channel 2 corresponding to channel D indicates a 242-tone resource unit and one user. Thus, the second RA field indicates that one user field 420 is carried for the corresponding 242-tone resource unit. The user specific field of the HE-SIG-B content channel 2 carries user fields of the total number of users indicated in the first RA field and the second RA field of the HE-SIG-B content channel 2. In this case, a predetermined null STA ID is contained in the user field 420 corresponding to the unassigned channel i.e., channel D. According to the embodiment of the present invention, the null STA ID may be an unassigned AID among AIDs from 1 to 2007 of the corresponding BSS, a reserved AID (e.g., 2046) which has a value greater than 2007, or a predetermined AID among AIDs from 1 to 2007. When a null STA ID is contained in the user field 420, a non-contiguous channel allocation may be performed since no STA in the BSS receives data through the corresponding resource unit.

Figure 29:
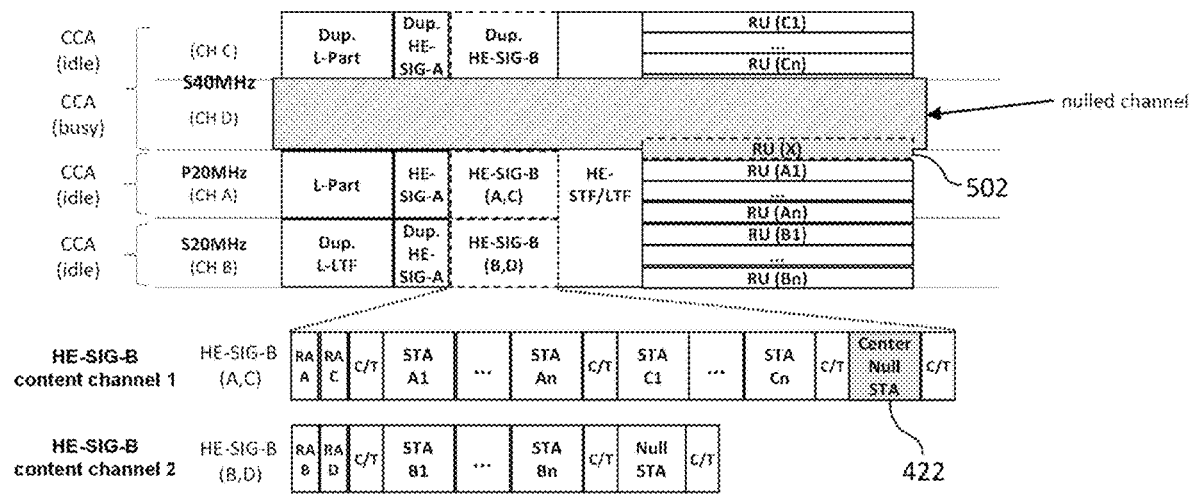

FIG. 29 illustrates a signaling method of non-contiguous channel allocation information according to a further embodiment of the present invention. According to the embodiment of FIG. 29, whether a user is allocated to a center 26-tone resource unit 502 may be signaled via a user field 422 of the HE-SIG-B. In an embodiment of the present invention, the center 26-tone resource unit (RU) refers to the RU 502 located at the center of an 80 MHz bandwidth. As described below, whether or not a user is allocated to the center 26-tone RU 502 may be determined according to various embodiments.

According to the embodiment of the present invention, the user field 422 corresponding to the center 26-tone RU 502 may be carried in the HE-SIG-B content channel 1 as shown in FIG. 29. In this case, the user field 422 may be carried as the last user field in the HE-SIG-B content channel 1. According to an embodiment of the present invention, whether a user is allocated to the center 26-tone RU 502 may be indicated via a STA ID contained in the corresponding user field 422. That is, when the center 26-tone RU 502 is not assigned to a user, a null STA ID may be contained in the corresponding user field 422. A specific embodiment of the null STA ID is as described in the embodiment of FIG. 28. However, when the center 26-tone RU 502 is assigned to a particular user, a STA ID of the particular user may be contained in the corresponding user field 422.

Figure 30:
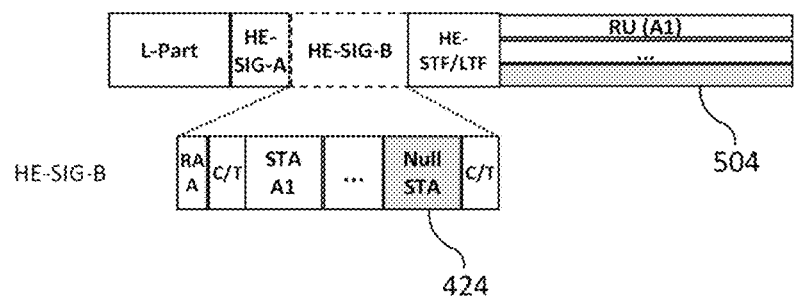

FIG. 30 illustrates a signaling method of non-contiguous channel allocation information according to a further embodiment of the present invention. According to the embodiment of FIG. 30, whether or not an arbitrary resource unit 504 is assigned to a user may be signaled via a user field 424 of the HE-SIG-B. An OFDMA-based DL MU PPDU includes resource units up to nine within a 20 MHz bandwidth, each of which consists of 26 subcarriers. In this case, data may be transmitted through only eight resource units among the nine RUs, and data may not be transmitted through one resource unit. In addition, a PPDU in a total bandwidth of 80 MHz may include resource units up to 37, some of which may not transmit data. As such, when some of the resource units constituting the total bandwidth are not assigned to a user, a method of indicating the unassigned resource unit is required.

According to an embodiment of the present invention, such non-contiguous channel allocation information may be indicated via the RA field and the user field of the HE-SIG-B. As described above, the RA field indicates information on the arrangement of resource units constituting a specific bandwidth and the number of users. The user fields corresponding to each resource unit are carried in the user specific field of the HE-SIG-B according to the order of resource unit allocation indicated by the RA field. According to the embodiment of the present invention, the unassigned resource unit may be indicated via a null STA ID contained in the user field 424 corresponding to the specific resource unit 504 in the resource unit arrangement indicated by the RA field. In this case, the unassigned resource unit that can be indicated includes at least one of 26-tone RU, 52-tone RU, and 106-tone RU, but the present invention is not limited thereto. That is, as described in FIG. 28, the unassigned resource unit that can be indicated via the null STA ID may include 242-tone RU, 484-tone RU, and 996-tone RU of a 20 MHz bandwidth or more. A specific embodiment of the null STA ID is as described in the embodiment of FIG. 28.

Figure 31:
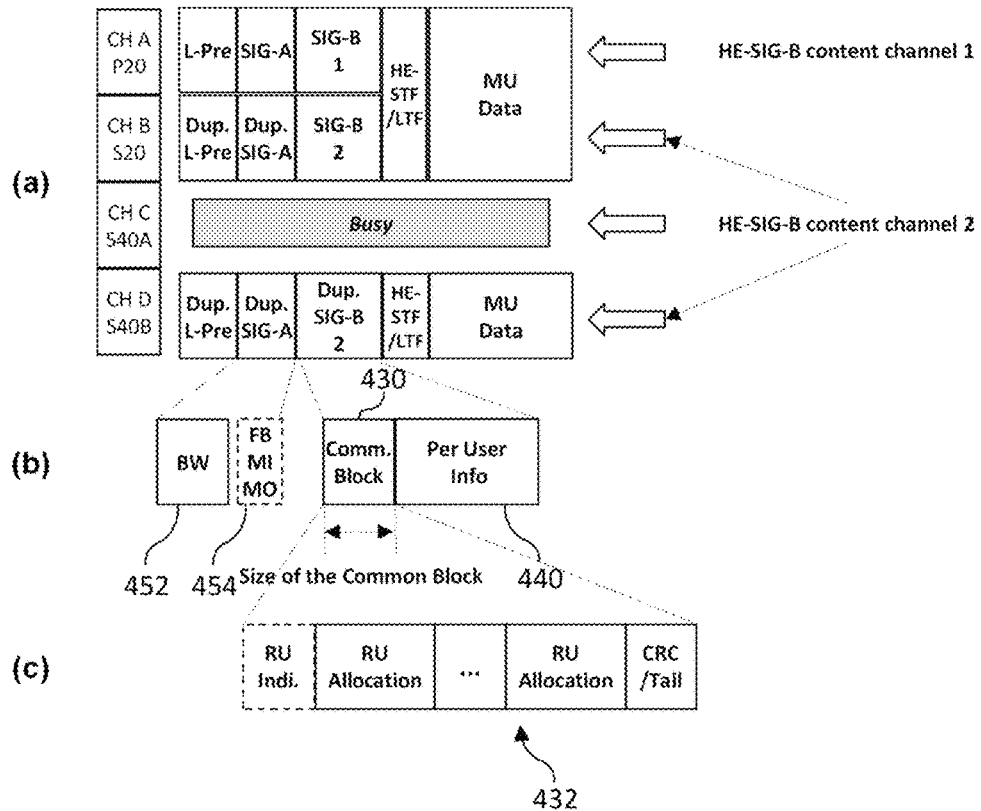

Next, with reference to FIG. 31, matters that can be considered when signaling the non-contiguous channel allocation information will be described. The HE MU PPDU performs signaling through the HE-SIG-A and the HE-SIG-B. The HE-SIG-A carries overall information including bandwidth information of the PPDU, and the HE-SIG-B carries information for a simultaneous multi-user transmission. In a total PPDU bandwidth of 40 MHz or more, the HE-SIG-B may consist of HE-SIG-B content channel 1 and HE-SIG-B content channel 2. According to the embodiment of the present invention, when a transmission of a non-contiguous PPDU is performed, the following matters can be considered.

First, all types of non-contiguous PPDUs should assign the P20 channel. That is, the non-contiguous PPDU may include one or more unassigned channels (or unassigned resource units), but the P20 channel should be assigned to one or more users.

Second, the HE-SIG-A of the non-contiguous PPDU should be able to indicate channel information on which the content channel(s) of the HE-SIG-B of the PPDU is transmitted. Referring to FIG. 31(*a*), channels of an 80 MHz bandwidth consist of channel A, channel B, channel C and channel D in an increasing order of the frequency, and a non-contiguous PPDU may be transmitted through channel A, channel B and channel D except a busy channel C. In this case, the HE-SIG-B content channel 1 is transmitted through channel A, and the HE-SIG-B content channel 2 is transmitted through channel B and channel D. In this case, the bandwidth field of the HE-SIG-A may indicate information about at least which channel each of the HE-SIG-B content channels of the corresponding PPDU is transmitted through. As described below, the bandwidth field of the HE-SIG-A may index puncturing of the S20 channel, and puncturing of at least one of two channels of the S40 channel, respectively. When the bandwidth field indicates puncturing of the S20 channel, at least one content channel of the two HE-SIG-B content channels may be transmitted through the S40 channel. On the other hand, when the bandwidth field indicates puncturing of at least one of two 20 MHz channels in the S40 channel as shown in FIG. 31(*a*), all of the two HE-SIG-B content channels may be transmitted through at least the P40 channel.

Finally, the HE-SIG-A may explicitly or implicitly indicate the size information of the common block field of the HE-SIG-B in the corresponding PPDU. As illustrated in FIG. 31(*b*), the HE-SIG-B consists of a common block field 430 and a user specific field 440, and the common block field 430 includes an RA field. When a total bandwidth of the PPDU is 20 MHz or 40 MHz, each HE-SIG-B content channel carries one RA field. However, when the total bandwidth of the PPDU is 80 MHz or 160 MHz (80+80 MHz), each HE-SIG-B content channel may carry multiple RA fields 432 as shown in FIG. 31(*c*). That is, when the total bandwidth of the PPDU is 80 MHz, each HE-SIG-B content channel carries two RA fields 432. Furthermore, when the total bandwidth of the PPDU is 160 MHz (or 80+80 MHz), each HE-SIG-B content channel carries four RA fields 432. Therefore, the number of RA fields 432 carried in the common block field 430 of the HE-SIG-B varies according to the information indicated by the bandwidth field 452 of the HE-SIG-A. The bandwidth field 452 of the HE-SIG-A may indicate the number of RA fields 432 carried in the common block field 430 of the HE-SIG-B, thereby explicitly or implicitly indicating the size information of the common block field 430.

According to the embodiment of the present invention, the non-contiguous channel allocation information may be indicated via any one of subfield(s) of the HE-SIG-A, subfield(s) of the HE-SIG-B, and a combination thereof. The non-contiguous channel allocation information may be signaled as the following specific embodiments.

First, the non-contiguous channel allocation information may be signaled solely via subfield(s) of the HE-SIG-A. The bandwidth field 452 of the HE-SIG-A may indicate specific non-contiguous channel allocation information through a predetermined index. When the non-contiguous channel allocation information is signaled through the subfield of the HE-SIG-A, the receiver may promptly obtain the entire configuration information of the PPDU. In addition, the additional signaling overhead through the HE-SIG-B is reduced when the non-contiguous channel allocation information is signaled via only the subfield of the HE-SIG-A.

However, due to the limitation of the available number of bits in the HE-SIG-A, various non-contiguous channel allocation information may not be signaled. Thus, according to an embodiment of the present invention, the bandwidth field 452 may explicitly indicate only some non-contiguous channel allocation information among the various options of the non-contiguous channel allocation. According to another embodiment of the present invention, some subfields of the HE-SIG-A that are unnecessary when non-contiguous channel allocation is performed may be used for additional signaling of the non-contiguous channel allocation information. For example, when the non-contiguous channel allocation is performed, a SIG-B compression field 454 indicating whether to use the full bandwidth MU-MIMO is unnecessary. Thus, when the non-contiguous channel allocation is performed, the SIG-B compression field 454 may be used for other purposes. For example, the HE-SIG-A may indicate non-contiguous channel allocation information using both the bandwidth field 452 and the SIG-B compression field.

Next, the non-contiguous channel allocation information may be signaled solely via subfield(s) of the HE-SIG-B. In this case, the bandwidth field of the HE-SIG-A indicates the existing contiguous bandwidths, and information of the unassigned channel (or unassigned resource unit) may be indicated via the RA field 432 and/or the user field of the HE-SIG-B. In this case, the signaling overhead of the HE-SIG-A may be reduced, but the signaling overhead of the HE-SIG-B may increase.

Finally, the non-contiguous channel allocation information may be signaled via a combination of subfield(s) of the HE-SIG-A and subfield(s) of the HE-SIG-B. The subfield(s) of the HE-SIG-A may signal at least a portion of the non-contiguous channel allocation information, and the subfield(s) of the HE-SIG-B may signal the remaining information. According to an embodiment, a subfield of the HE-SIG-A may signal the detailed information of the PPDU configuration of the P80 channel and information on whether to transmit the S80 channel. If the subfield of the HE-SIG-A indicates transmission of the S80 channel, the subfield(s) of the HE-SIG-B may signal the detailed information of the PPDU configuration of the S80 channel According to another embodiment, the subfield of the HE-SIG-A may signal channel information on which the HE-SIG-B content channel(s) of the corresponding PPDU is transmitted and size information of the common block field 430. The subfield(s) of the HE-SIG-B signal additional information of the corresponding PPDU configuration. According to yet another embodiment, when the transmission band of the non-contiguous PPDU always includes the P40 channel, the size information of the common block field 430 of the HE-SIG-B may be signaled via the subfield of the HE-SIG-A.

Figure 32:
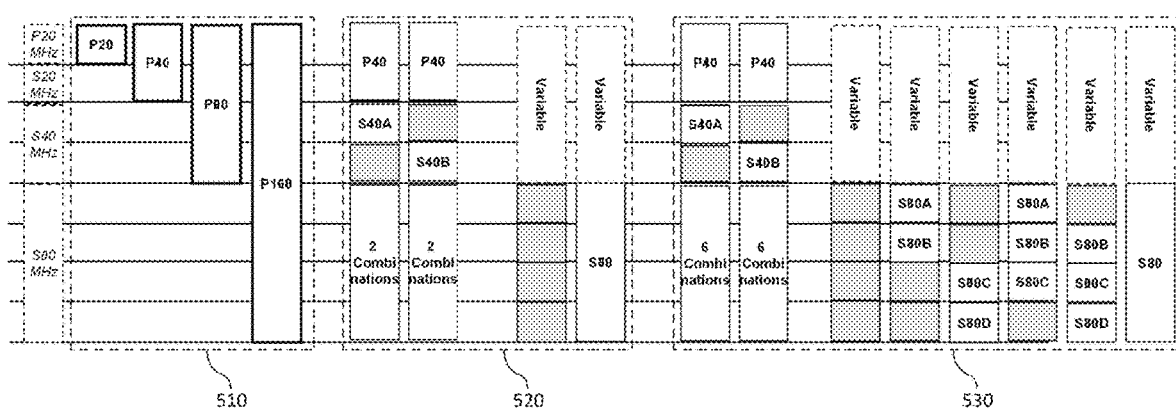
FIGS. 32 to 34 illustrate non-contiguous channel allocation methods according to various embodiments of the present invention.
Figure 33:
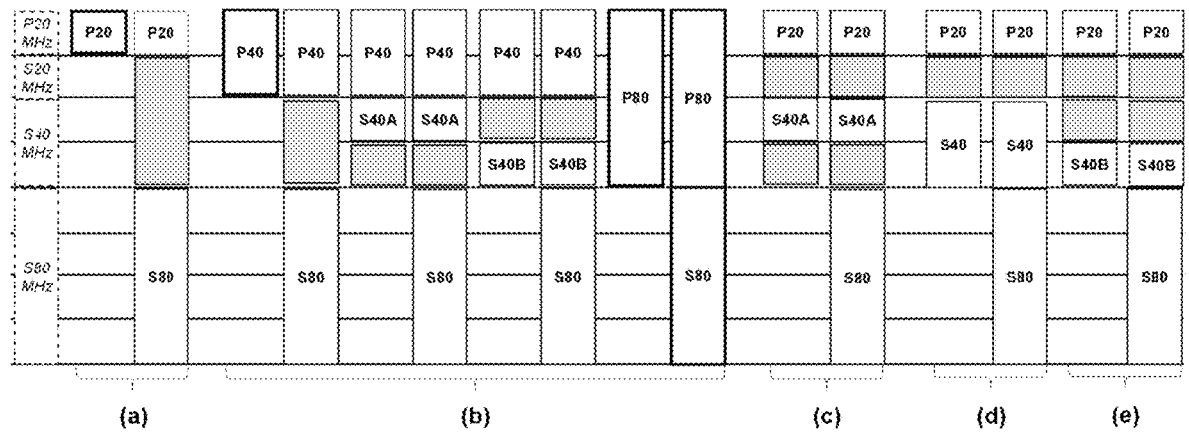
Figure 34:
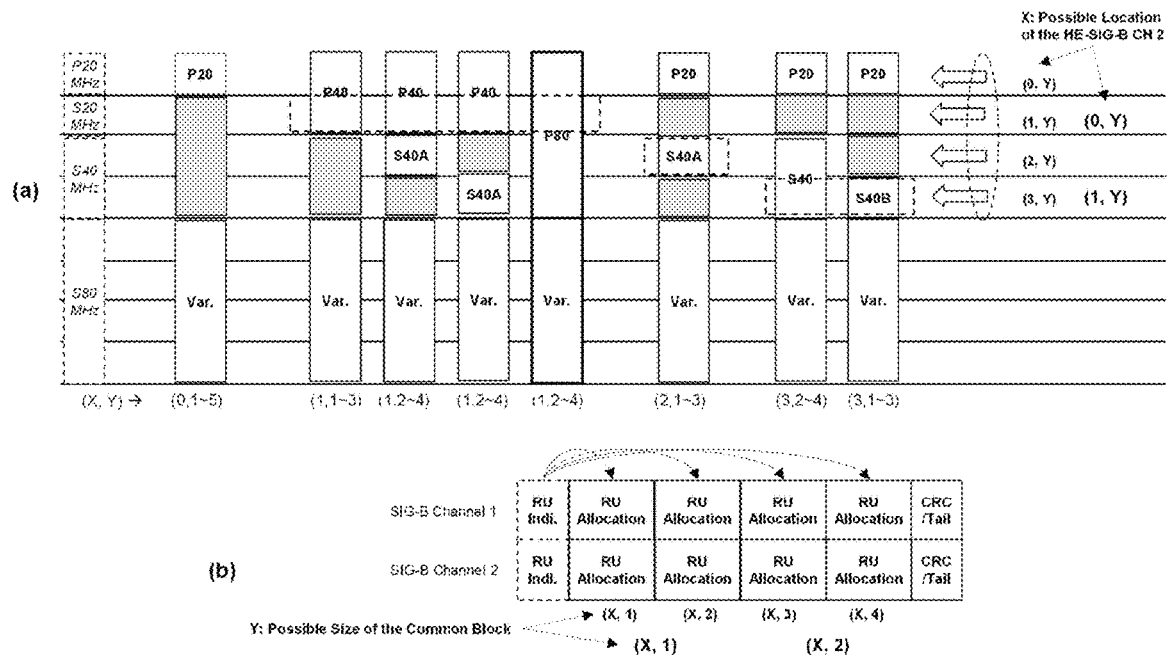

FIGS. 32 to 34 illustrate non-contiguous channel allocation methods according to various embodiments of the present invention. The non-contiguous channel allocation information according to the embodiments of FIGS. 32-34 may be signaled via a combination of at least one of the various embodiments described in FIGS. 25 to 31.

FIG. 32 illustrates a non-contiguous channel allocation method according to an embodiment of the present invention. According to an embodiment of the present invention, the non-contiguous channel allocation information may be signaled solely via the bandwidth field of the HE-SIG-A. FIG. 32 illustrates an embodiment in which the P40 channel is always allocated in a non-contiguous PPDU to fix the decoding position of the HE-SIG-B content channel. In this case, both the HE-SIG-B content channel 1 and the HE-SIG-B content channel 2 may be transmitted through at least the P40 channel. In the embodiment of 32 and the following embodiments, an S80A channel, an S80B channel, an S80C channel, and an S80D channel refer to the first, second, third and fourth 20 MHz channels, respectively, constituting the S80 channel.

The bandwidth field of the HE-SIG-A may basically index information of four contiguous channels 510, that is, 20 MHz, 40 MHz, 80 MHz and 160 MHz (including 80+80 MHz), respectively. When the bandwidth field consists of 3 bits, the bandwidth field may index information of four additional non-contiguous channels 520. First, the bandwidth field may index each puncturing of one of two 20 MHz channels in the S40 channel. In addition, the bandwidth field may index whether the S80 channel is allocated, in combination with the configuration of the S40 channel Therefore, the bandwidth field may index four non-contiguous channel configurations in total by combining two configurations of P40+S40A and P40+S40B in the P80 channel and two configurations according to whether the S80 channel is allocated.

Next, when the bandwidth field consists of 4 bits, the bandwidth field may additionally index information of eight non-contiguous channels 530 in addition to the information of the four non-contiguous channels 520. First, the bandwidth field may index each puncturing of two 20 MHz channels in the S40 channel. In addition, the bandwidth field may index information of six non-contiguous channels in the S80 channel in combination with the configuration of the S40 channel. In this case, the information of the six non-contiguous channels includes whether the S80 channel is allocated, and may include four puncturing options that may allocate a contiguous 40 MHz band as shown in FIG. 32.

FIG. 33 illustrates a non-contiguous channel allocation method according to another embodiment of the present invention. According to the embodiment of FIG. 33, the location where at least one of the HE-SIG-B content channels is transmitted may be variable. In this case, the receiver should be able to variably set the decoding channel for receiving the HE-SIG-B content channel. In the embodiment of FIG. 33, it is assumed that the HE-SIG-B content channel 1 is transmitted through the P20 channel and the channel through which the HE-SIG-B content channel 2 is transmitted may vary. However, depending on the physical frequency order of the P20 channel within the P40 channel, the HE-SIG-B content channel 2 may be transmitted through the P20 channel. In this case, the channel through which the HE-SIG-B content channel 1 is transmitted may vary depending on the channel configuration. The non-contiguous channel allocation information according to the embodiment of the present invention may support at least some configurations among the channel configurations listed in FIG. 33.

FIG. 33(a) illustrates a channel configuration in which only the P20 channel is allocated among the P80 (i.e., primary 80 MHz) band. In this case, the HE-SIG-B content channel 2 is not transmitted in the P80 band. FIG. 33(b) illustrates a channel configuration in which the P40 channel is basically allocated among the P80 band. In this case, both the HE-SIG-B content channel 1 and the HE-SIG-B content channel 2 may be transmitted through at least the P40 channel According to the embodiment, a non-contiguous channel in which any one among the two 20 MHz channels, that is, the S40A channel and the S40B channel of the S40 channel is allocated may be used. When both the S40A channel and the S40B channel are allocated, a contiguous channel of 80 MHz or 160 MHz bandwidth is configured.

FIG. 33(c) illustrates a channel configuration in which only the P20 channel and the S40A channel are allocated among the P80 band. According to an embodiment, the HE-SIG-B content channel 1 may be transmitted through the P20 channel and the HE-SIG-B content channel 2 may be transmitted through the S40A channel. The S40A channel is originally a channel through which the HE-SIG-B content channel 1 is transmitted. However, if there is no other channel through which the HE-SIG-B content channel 2 is to be transmitted in the P80 band configuration of the non-contiguous PPDU, the HE-SIG-B content channel 2 may be transmitted through the S40A channel. However, since the change of the HE-SIG-B content channel increases the burden of the PPDU configuration, the channel configuration of FIG. 33(c) may not be used depending on the embodiment.

FIG. 33(d) illustrates a channel configuration in which only the P20 channel and the S40 channel are allocated among the P80 band. In this case, the HE-SIG-B content channel 1 may be transmitted through the P20 channel and the S40A channel, and the HE-SIG-B content channel 2 may be transmitted through the S40B channel. In addition, FIG. 33(e) illustrates a channel configuration in which only the P20 channel and the S40B channel are allocated among the P80 band. In this case, the HE-SIG-B content channel 1 may be transmitted through the P20 channel, and the HE-SIG-B content channel 2 may be transmitted through the S40B channel. In the embodiments of FIGS. 33(d) and 33(e), the HE-SIG-B content channel 1 and the HE-SIG-B content channel 2 may be transmitted based on the HE-SIG-B content channel transmission rule according to the embodiment of the present invention Meanwhile, due to the limitation of the number of bits in the bandwidth field of the HE-SIG-A, the bandwidth field may indicate some configurations among the above channel configurations. When the bandwidth field consists of 3 bits, the bandwidth field may index four additional non-contiguous channel allocation information. According to the embodiment of the present invention, the bandwidth field may indicate the total bandwidth information through which the PPDU is transmitted and some channel information to be punctured within the total bandwidth. In this case, the total bandwidth may be either 80 MHz bandwidth or 160 MHz (or 80+80 MHz) bandwidth. According to an embodiment of the present invention, the bandwidth field may index puncturing of the S20 channel shown in FIG. 33(d), and puncturing of at least one of two 20 MHz channels in the S40 channel shown in FIG. 33(b), respectively.

According to the embodiment of the present invention, in the channel configuration indicated by the bandwidth field of the HE-SIG-A, additional puncturing information may be indicated via the RA field of the HE-SIG-B. For example, when the bandwidth field indicates puncturing of one of two 20 MHz channels in the S40 channel at the total bandwidth of 80 MHz (e.g., the third and fifth channel configuration in FIG. 33(b)), the resource unit allocation field may indicate which 20 MHz channel in the S40 channel is punctured. Also, when the bandwidth field indicates puncturing of at least one of two 20 MHz channels in the S40 channel at the total bandwidth of 160 MHz or 80+80 MHz (e.g., the second, fourth and sixth channel configurations in FIG. 33(b)), the resource unit allocation field may indicate which 20 MHz channel in the S40 channel is punctured. In addition, when the bandwidth field indicates puncturing of at least one of two 20 MHz channels in the S40 channel in a total bandwidth of 160 MHz or 80+80 MHz (e.g., the second, fourth and sixth channel configurations in FIG. 33(b)), the resource unit allocation field may indicate additional puncturing in the S80 channel. Further, when the bandwidth field indicates puncturing of the S20 channel in the total bandwidth of 160 MHz or 80+80 MHz (e.g., the second channel configuration in FIG. 33(d)), the resource unit allocation field may indicate additional puncturing in the S80 channel.

Channels in which puncturing is indicated as described above are not assigned to the user. A terminal receiving the non-contiguous PPDU may obtain the total bandwidth information through which the PPDU is transmitted and the channel information to be punctured within the total bandwidth via the bandwidth field of the HE-SIG-A of the corresponding PPDU. Further, the terminal may obtain additional channel puncturing information via the RA field of the HE-SIG-B of the corresponding PPDU. The terminal decodes the PPDU based on the obtained non-contiguous channel allocation information.

FIG. 34 illustrates a non-contiguous channel allocation method according to yet another embodiment of the present invention. Also in the embodiment of FIG. 34, the location where at least one of the HE-SIG-B content channels is transmitted may be variable. In this case, the receiver should be able to variably set the decoding channel for receiving the HE-SIG-B content channel. In the embodiment of FIG. 34, it is assumed that the HE-SIG-B content channel 1 is transmitted through the P20 channel and the channel through which the HE-SIG-B content channel 2 is transmitted may vary.

According to the embodiment of FIG. 34, the bandwidth field of the HE-SIG-A indicates location information X of the HE-SIG-B content channel and size information Y of the common block field of the HE-SIG-B. FIG. 34 illustrates a combination of (X, Y) that can be indicated by the bandwidth field.

First, the location information X of the HE-SIG-B content channel may indicate a channel through which the HE-SIG-B content channel 2 is transmitted within the P80 channel. When the location information consists of 2 bits, it may indicate a total of four channels, that is, P20, S20, S40A and S40B. When the location information consists of 1 bit, it may indicate a total of two channels, that is, S20 and S40B. In the latter case, even when only the P20 channel is assigned to a user, it can be signaled that the HE-SIG-B content channel is transmitted through the S20 channel. However, since no signal is actually transmitted through the S20 channel and the receiver would fail to decode the HE-SIG-B content channel on the S20 channel, there is no problem in a PPDU transmission configured only on the P20 channel.

Next, the size information Y of the common block field may be different depending on the number of RA fields to be carried. When the size information consists of 2 bits, the number of RA fields included in the common block field may be indicated as one, two, three, or four. When the size information consists of 1 bit, the number of RA fields included in the common block field may be indicated as 2 or 4. In the latter case, an unnecessary RA field may be additionally transmitted. However, it is possible to prevent additional signaling overhead by causing the unnecessary RA field to indicate the unassigned RU described in the embodiment of FIG. 27.

The receiver may determine a channel to receive the HE-SIG-B content channel based on the location information X of the HE-SIG-B content channel. In addition, the receiver decodes the common block field of the HE-SIG-B based on the size information of the common block field. The additional unassigned channel information of the transmitted PPDU may be indicated via the RA field of the common block field. According to an embodiment of the present invention, a resource unit indication field representing which channel each of a plurality of RA fields indicates within a bandwidth up to 160 MHz may be used. In this case, the resource unit indication field may indicate, via a bitmap representing eight 20 MHz channels in a bandwidth up to 160 MHz, channels in which the subsequent RA fields sequentially indicate information.

Figure 35:
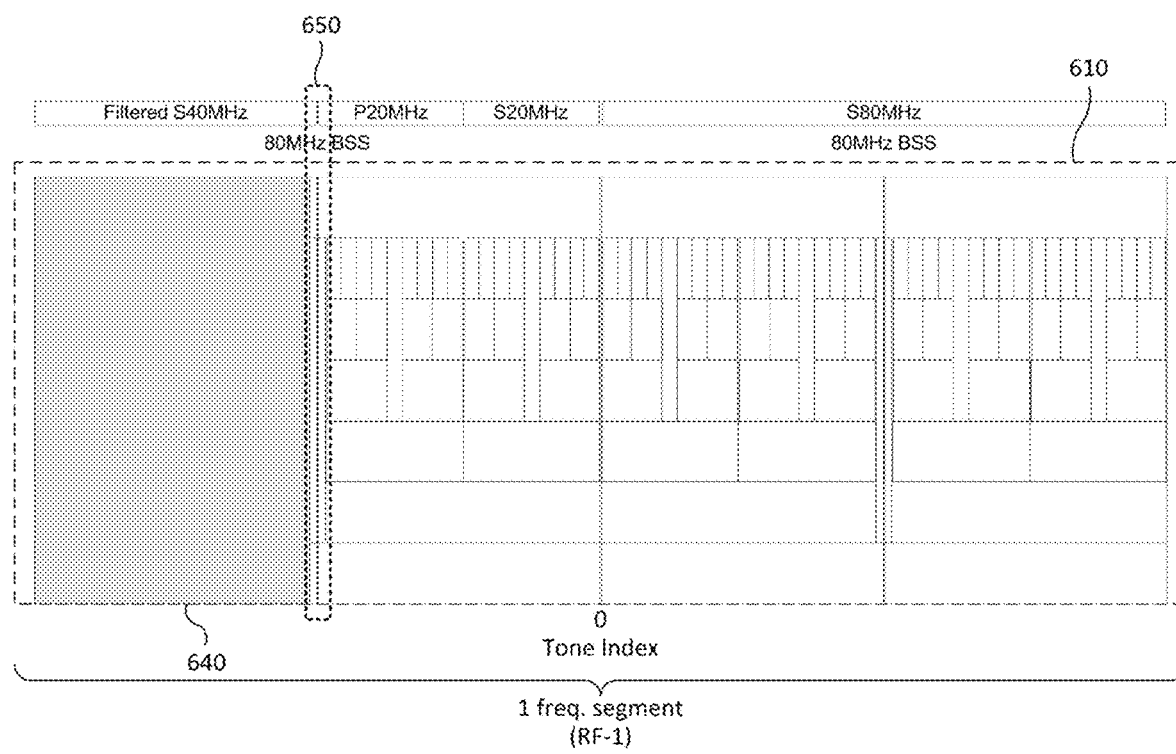
FIGS. 35 to 37 illustrate embodiments of a resource unit filtering according to additional embodiments of the present invention.
Figure 36:
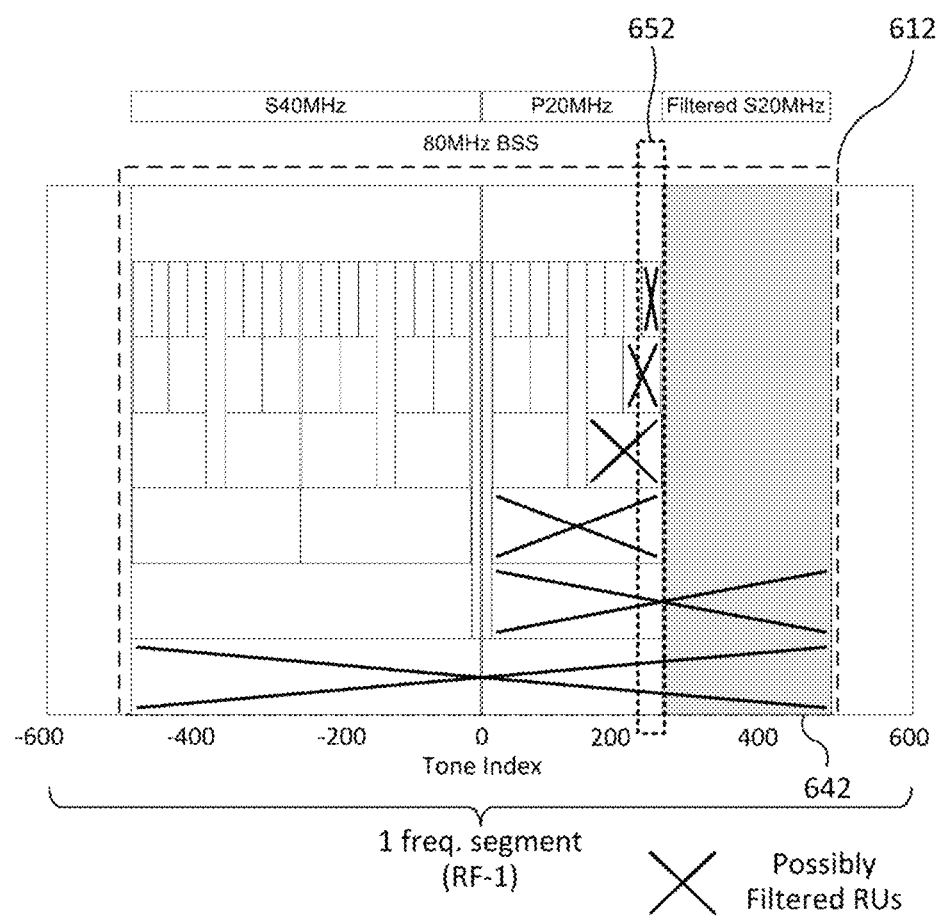
Figure 37:
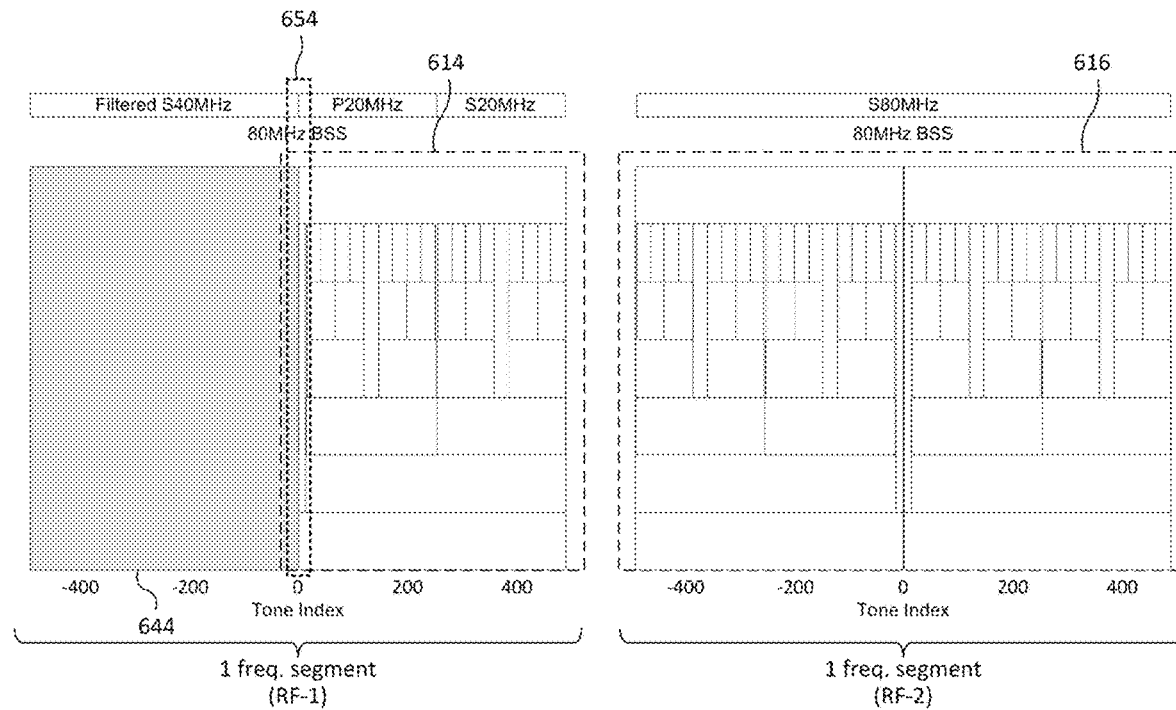

FIGS. 35 to 37 illustrate embodiments of a resource unit filtering according to additional embodiments of the present invention. Referring to FIG. 20, several embodiments for transmitting a non-contiguous PPDU have been described. FIGS. 35 to 37 illustrate embodiments in which additional resource units are filtered in the non-contiguous PPDU transmission process described above with reference to FIG. 20. In the embodiment of the present invention, a filtered resource unit (or channel) may refer to an unassigned resource unit (or channel).

FIG. 35 illustrates a situation in which a terminal equipped with one RF module attempts to transmit a PPDU through a bandwidth of 160 MHz but an S40 channel 640 is busy as a result of CCA. The terminal transmits a non-contiguous PPDU through a 140 MHz band including the P40 channel (i.e., P20 channels+S20 channels) and the S80 channel. In this case, the non-contiguous PPDU is transmitted using a 160 MHz spectral mask 610. Furthermore, in the S40 channel 640 determined to be busy, filtering is performed and no data is transmitted. However, since a 40 MHz spectral mask is not applied to the signal transmitted through the P40 channel, signals of some resource units adjacent to the boundary of the S40 channel may interfere with OBSS signal transmitted through the S40 channel.

Therefore, according to the embodiment of the present invention, in the non-contiguous PPDU transmission situations, the resource unit adjacent to the unassigned S40 channel 640 may be additionally filtered and be set as the unassigned resource unit. Depending on the location of the S40 channel 640 within the entire bandwidth, a maximum of two adjacent resource units, including a center 26-tone RU 650, on either side of the S40 channel 640 may exist. According to the embodiment of the present invention, when a 40 MHz bandwidth channel is set to an unassigned channel, additional filtering may be performed on a resource unit adjacent to that channel, e.g., the center 26-tone RU 650. Moreover, if there is a possibility that some resource units in a transmission channel (i.e., P20 channel) adjacent to the unassigned S40 channel 640 may interfere with OBSS signal in the unassigned S40 channel 640, additional filtering may be performed on the some resource units. Whether to perform such an additional filtering of resource units may be determined based on information of a transmission power of a transmitter, the maximum transmission power per frequency band, the strength of the received OBSS signal, and the like.

According to an embodiment of the present invention, whether to filter the center 26-tone RU 650 (i.e., to set as an unassigned resource unit) may be determined as below according to a CCA result of the unassigned S40 channel 640. First, if a legacy PPDU using 64 FFT/20 MHz is detected in the unassigned S40 channel 640, filtering of the center 26-tone RU 650 may be performed. Second, if an HE PPDU using 256 FFT/20 MHz is detected in the unassigned S40 channel 640, whether to filter the center 26-tone RU 650 may be determined based on a band occupied by the HE PPDU. When the band occupied by the HE PPDU is more than a predetermined frequency interval away from the center 26-tone RU 650, the center 26-tone RU 650 may not be filtered. However, when the band occupied by the HE PPDU is less than the predetermined frequency interval from the center 26-tone RU 650, filtering of the center 26-tone RU 650 may be performed. Third, if a legacy PPDU or HE PPDU is not detected and an arbitrary radio signal is detected in the unassigned S40 channel 640, whether to filter the center 26-tone RU 650 may be determined based on a band occupied by the signal. When the edge of the band occupied by the signal is more than a predetermined frequency interval away from the center 26-tone RU 650, the center 26-tone RU 650 may not be filtered.

Next, FIG. 36 illustrates a situation in which a terminal equipped with one RF module attempts to transmit a PPDU through a bandwidth of 80 MHz but an S20 channel 642 is busy as a result of CCA. The terminal transmits a non-contiguous PPDU through a 60 MHz band including the P20 channel and the S40 channel. In this case, the non-contiguous PPDU is transmitted using an 80 MHz spectral mask 612. Furthermore, in the S20 channel 642 determined to be busy, filtering is performed and no data is transmitted. However, since a 20 MHz spectral mask is not applied to the signal transmitted through the P20 channel, signals of some resource units adjacent to the boundary of the S20 channel may interfere with OBSS signal transmitted through the S20 channel.

Likewise in the embodiment of FIG. 36, whether to filter the center 26-tone RU 652 and/or the adjacent resource units may be determined according to the method described in the embodiment of FIG. 35. Moreover, if there is a possibility that some resource units in a transmission channel (i.e., P20 channel) adjacent to the unassigned S20 channel 642 may interfere with OBSS signal in the unassigned S20 channel 642, additional filtering may be performed on the some resource units. According to an embodiment of the present invention, the transmitter may minimize resource waste by allocating resource units of a narrow bandwidth to a band adjacent to the unassigned channel in the transmission channel.

Next, FIG. 37 illustrates a situation in which a terminal equipped with two RF modules attempts to transmit a PPDU through a bandwidth of 80+80 MHz but an S40 channel 644 is busy as a result of CCA. The terminal transmits a non-contiguous PPDU through the P40 channel (i.e., P20 channel+S20 channel) and the S80 channel, respectively, using the two RF modules. The terminal transmits, by using the first RF module, the PPDU to which a 40 MHz spectral mask 614 is applied through the P40 channel. In addition, the terminal transmits, by using the second RF module, the PPDU to which an 80 MHz spectral mask 616 is applied through the S80 channel. Therefore, in the embodiment of FIG. 37, no additional filtering of some resource units included in the transmission channel (i.e., P20 channel) adjacent to the unassigned S40 channel 644 is required. However, at least a half of a center 26-tone RU 654 adjacent to the unassigned S40 channel 644 should be filtered. Thus, according to the embodiment of the present invention, the center 26-tone RU 654 may be set as an unassigned resource unit.

FIGS. 38 to 42 illustrate methods of signaling an HE MU PPDU according to additional embodiments of the present invention. In the embodiments of FIGS. 38 to 42, channel A to channel D refer to respective 20 MHz channels through which an 80 MHz PPDU is transmitted. In this case, it is designated that channel A is a P20 channel, channel B is an S20 channel, and channel C and channel D are an S40 channel. In addition, HE-SIG-B content channel 1 is transmitted through at least one of channel A and channel C, and HE-SIG-B content channel 2 is transmitted through at least one of channel B and channel D.

Figure 38:
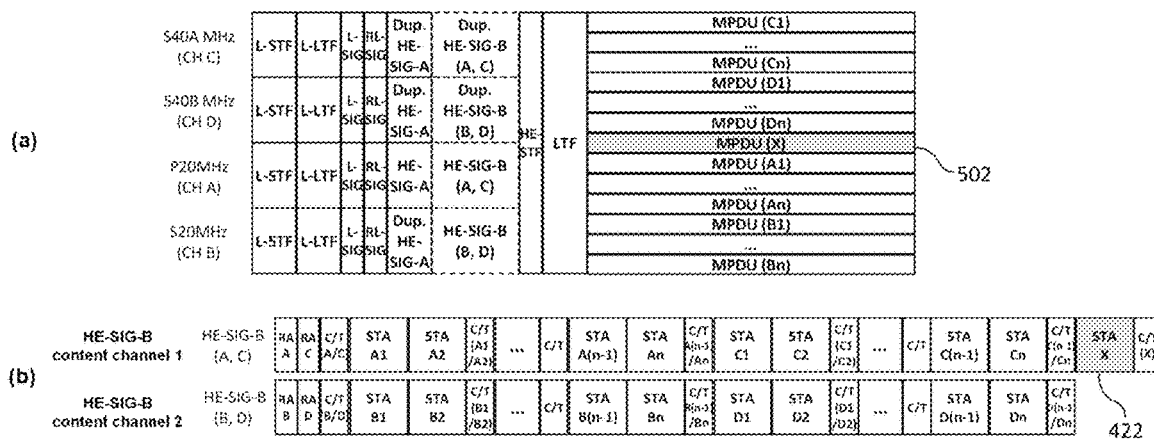
FIGS. 38 to 42 illustrate methods of signaling an HE MU PPDU according to additional embodiments of the present invention.

FIG. 38 illustrates an embodiment of a method of signaling allocation information of a center 26-tone RU in an HE MU PPDU. FIG. 38(a) illustrates resource units constituting a PPDU in a total bandwidth of 80 MHz, and FIG. 38(b) illustrates a configuration of HE-SIG-B content channel 1 and HE-SIG-B content channel 2 carried via the PPDU. The specific method in which the RA field and the user field are carried in each HE-SIG-B content channel is as described in the previous embodiments.

When a PPDU is transmitted in a total bandwidth of 80 MHz or more, a center 26-tone RU 502 as shown in FIG. 38(a) may additionally be used. As described above, the common block field of the HE-SIG-B may further include a C26 field (not illustrated) indicating whether a user is allocated to the center 26-tone RU 502. The C26 field may consist of a 1-bit indicator located before or after the RA field in the common block field. According to the embodiment of the present invention, the C26 field may be carried in both the HE-SIG-B content channel 1 and the HE-SIG-B content channel 2. When the C26 field indicates assignment of the center 26-tone RU 502, a user field 422 corresponding to the center 26-tone RU 502 should be carried in the HE-SIG-B.

When a PPDU is transmitted in a total bandwidth of 80 MHz, both of a C26 field carried in the HE-SIG-B content channel 1 and a C26 field carried in the HE-SIG-B content channel 2 indicate whether a user is allocated to the center 26-tone RU 502 in the total bandwidth of 80 MHz. In this case, when the C26 field indicates the assignment of the center 26-tone RU 502, the user field 422 corresponding to the center 26-tone RU 502 may be carried in the user specific field of the HE-SIG-B content channel 1. However, when the C26 field indicates non-assignment of the center 26-tone RU 502, the user field 422 corresponding to the center 26-tone RU 502 is not carried.

On the other hand, when a PPDU is transmitted in a total bandwidth of 160 MHz or 80+80 MHz, the total bandwidth may consist of the first 80 MHz bandwidth and the second 80 MHz bandwidth. In this case, the first 80 MHz bandwidth may be a frequency band lower than the second 80 MHz bandwidth. A center 26-tone RU may be present in each 80 MHz bandwidth. In this case, the first C26 field carried in the HE-SIG-B content channel 1 may indicate whether a user is allocated to the first center 26-tone RU of the first 80 MHz bandwidth. In addition, the second C26 field carried in HE-SIG-B content channel 2 may indicate whether a user is allocated to the second center 26-tone RU of the second 80 MHz bandwidth. When the first C26 field indicates the assignment of the first center 26-tone RU, a user field corresponding to the first center 26-tone RU may be carried in the user specific field of the HE-SIG-B content channel 1. Also, when the second C26 field indicates the assignment of the second center 26-tone RU, a user field corresponding to the second center 26-tone RU may be carried in the user specific field of the HE-SIG-B content channel 2. However, when the first C26 field and/or the second C26 field indicate non-assignment of the center 26-tone RU, the corresponding user field is not carried.

Figure 39:
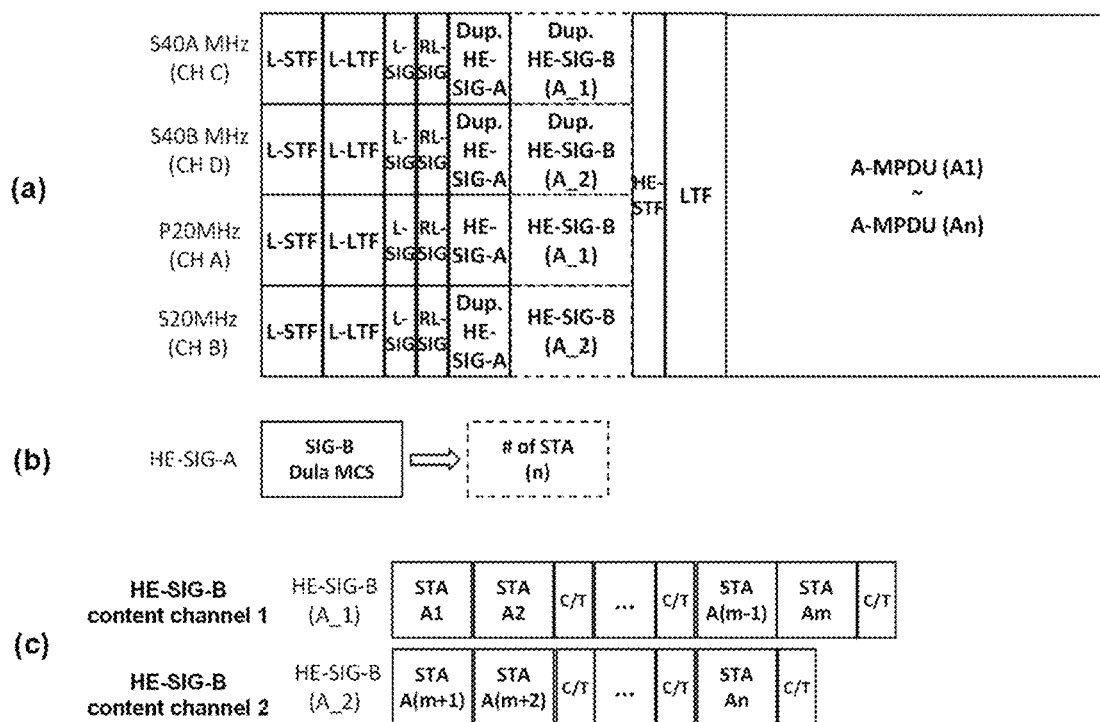

FIG. 39 illustrates a method of signaling HE-SIG-B in an HE MU PPDU transmitted through a full bandwidth MU-MIMO. When the full bandwidth MU-MIMO transmission is performed as shown in FIG. 39(a), the RA field of the HE-SIG-B need not be transmitted. Thus, the SIG-B compression field of the HE-SIG-A may indicate the compression mode of the HE-SIG-B field. Meanwhile, the user fields are carried as split to the HE-SIG-B content channel 1 and the HE-SIG-B content channel 2. The receiver decodes both the HE-SIG-B content channel 1 and the HE-SIG-B content channel 2 to identify whether the user field corresponding to the corresponding terminal is transmitted.

FIG. 39(b) illustrates an embodiment in which a specific subfield of the HE-SIG-A indicates information on the number of MU-MIMO users when a full bandwidth MU-MIMO transmission is performed (i.e., the SIG-B compression field indicates the compression mode of the HE-SIG-B field). According to an embodiment of the present invention, when the full bandwidth MU-MIMO transmission is performed, the SIG-B dual MCS field of the HE-SIG-A may indicate information on the number of MU-MIMO users. It is because the HE-SIG-B content channel 1 and the HE-SIG-B content channel 2 do not need to distribute the amount of information through different MCSs when the full bandwidth MU-MIMO transmission is performed. According to another embodiment of the present invention, when the full bandwidth MU-MIMO transmission is performed, the number of HE-SIG-B symbols field in the HE-SIG-A may indicate information on the number of MU-MIMO user. It is because, when full-bandwidth MU-MIMO transmission is performed, it is easier to transmit the information on the number of MU-MIMO users and the MCS information than to transmit the number of HE-SIG-B symbols and MCS information for the decoding of the receiver.

FIG. 39(c) illustrates the detailed configuration of the HE-SIG-B content channel 1 and the HE-SIG-B content channel 2 when the full bandwidth MU-MIMO transmission is performed. When the full-bandwidth MU-MIMO is performed, the RA field is not present in the HE-SIG-B. Therefore, when an MU-MIMO transmission is performed through a bandwidth greater than 20 MHz, the number of users to be allocated to the HE-SIG-B content channel 1 and the HE-SIG-B content channel 2, respectively, should be separately determined.

According to the embodiment of the present invention, when the MU-MIMO transmission is performed through a bandwidth greater than 20 MHz, user fields may be split equitably between the two content channels for load balancing. That is, the number of user fields transmitted in each SIG-B content channel is determined as a round up or down value of a half the total number of users. For example, when the total number of user fields is n, the first to m-th (where m is ceil (n/2)) user fields may be transmitted through the HE-SIG-B content channel 1, and the m+1-th to the n-th user fields may be transmitted through the HE-SIG-B content channel 2. If n is an odd number, the number of user fields included in the HE-SIG-B content channel 1 may be one more than the number of user fields included in the HE-SIG-B content channel 2. A total of n user fields are allocated in order of each user field of the HE-SIG-B content channel 1, and then each user field of the HE-SIG-B content channel 2.

Figure 40:
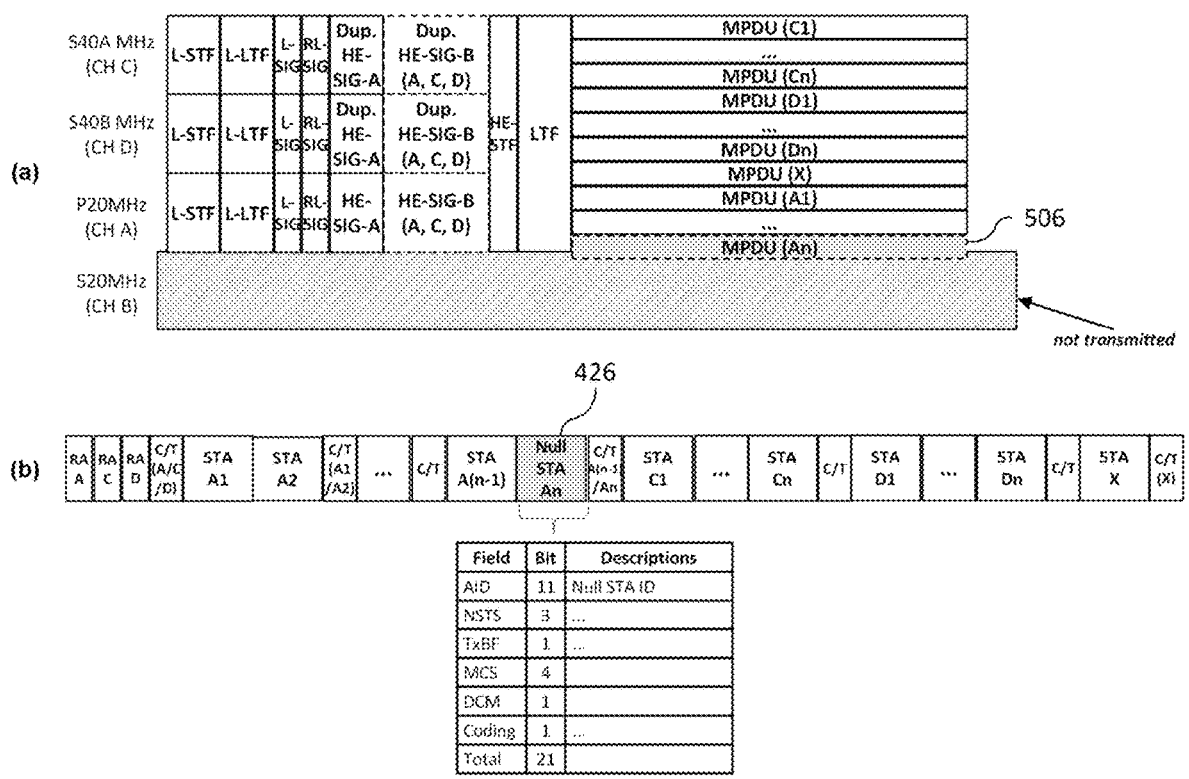

FIG. 40 illustrates an embodiment of signaling a non-assignment of a specific resource unit in a non-contiguous PPDU. As described in the embodiments of FIGS. 35 to 37, in the non-contiguous PPDU transmission process, additional filtering may be performed on some resource units 506 of the transmission channel adjacent to the unassigned channel Referring to FIG. 40(a), additional filtering may be performed on the resource unit 506 of the transmission channel (i.e., channel A) adjacent to the unassigned channel, that is, channel B.

FIG. 40(b) illustrates a configuration of the HE-SIG-B indicating the non-assignment of the specific resource unit

506 in a non-contiguous PPDU. Referring to FIG. 40(*b*), the RA field of the HE-SIG-B indicates resource unit allocation information of the transmission channel (i.e., channel A). Each resource unit of channel A is assigned to STA A1 to STA An. A user specific field of the HE-SIG-B carries a user field corresponding to each resource unit. In this case, a null STA ID may be contained in a user field 426 corresponding to the resource unit 506 to be filtered. The specific embodiment of the null STA ID is as described above in the embodiments of the previous figures.

Figure 41:
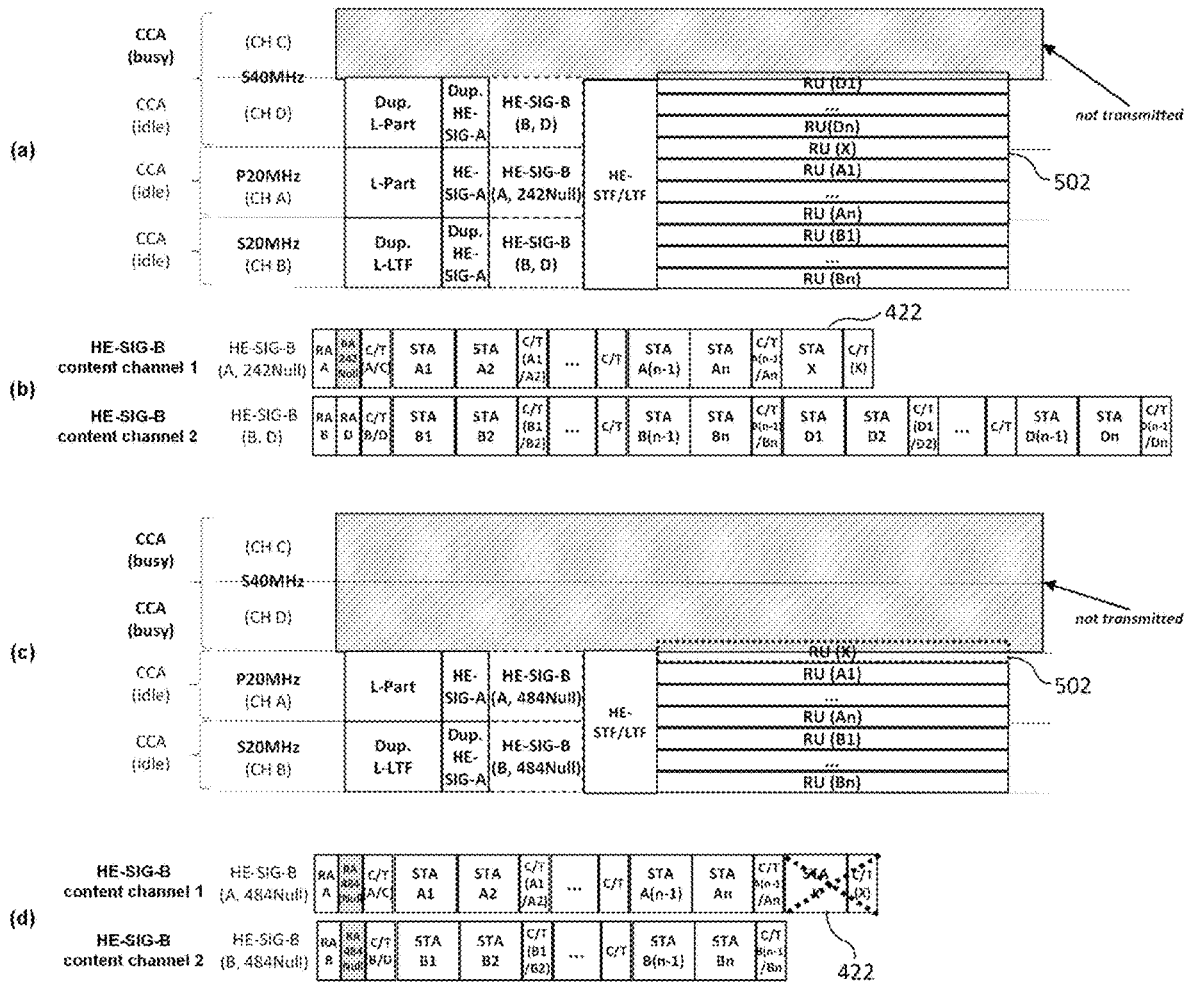

FIG. 41 illustrates another embodiment of signaling allocation information of the center 26-tone RU 502 in a non-contiguous PPDU. As described above, the RA field may indicate a specific channel that is not assigned to a user through a predetermined index. That is, the RA field may indicate nulling of a bandwidth of a multiple of a 20 MHz channel, i.e., 242-tone, 484-tone or 996-tone resource unit. As above, when the bandwidth information of the unassigned channel is indicated via the RA field, whether the center 26-tone RU 502 is assigned may be implicitly identified.

First, FIG. 41(*a*) illustrates a situation in which the S40A channel (i.e., channel C) is busy in a total bandwidth of 80 MHz. The terminal transmits a PPDU in a 60 MHz band including the P40 channel and the S40B channel (i.e., channel D). In this case, the RA field corresponding to channel C indicates nulling of 242-tone RU. FIG. 41(*b*) illustrates a configuration of the HE-SIG-B content channel 1 and the HE-SIG-B content channel 2 of the PPDU transmitted according to the embodiment of FIG. 41(*a*). Since the nulling of 242-tone RU is indicated by the RA field of the HE-SIG-B content channel 1, the receiver may identify that a user can be allocated to the center 26-tone RU 502. Thus, the HE-SIG-B content channel 1 carries a user field 422 corresponding to the center 26-tone RU 502.

On the other hand, FIG. 41(*c*) illustrates a situation in which the S40 channel is busy in the total bandwidth of 80 MHz. The terminal transmits a PPDU through the P40 channel. In this case, the RA fields corresponding to channel C and channel D indicate nulling of 484-tone RU. FIG. 41(*d*) illustrates a configuration of the HE-SIG-B content channel 1 and the HE-SIG-B content channel 2 of the PPDU transmitted according to the embodiment of FIG. 41(*c*). Since the nulling of 484-tone RU is indicated by the RA fields of the HE-SIG-B content channel 1 and the HE-SIG-B content channel 2, the receiver may identify that the center 26-tone RU 502 is not assigned to a user. That is, since the entire S40 channel is not assigned to a user, the center 26-tone RU 502 may also be set as an unassigned resource unit. Thus, the HE-SIG-B content channel 1 may not carry the user field 422 corresponding to the center 26-tone RU 502.

Figure 42:
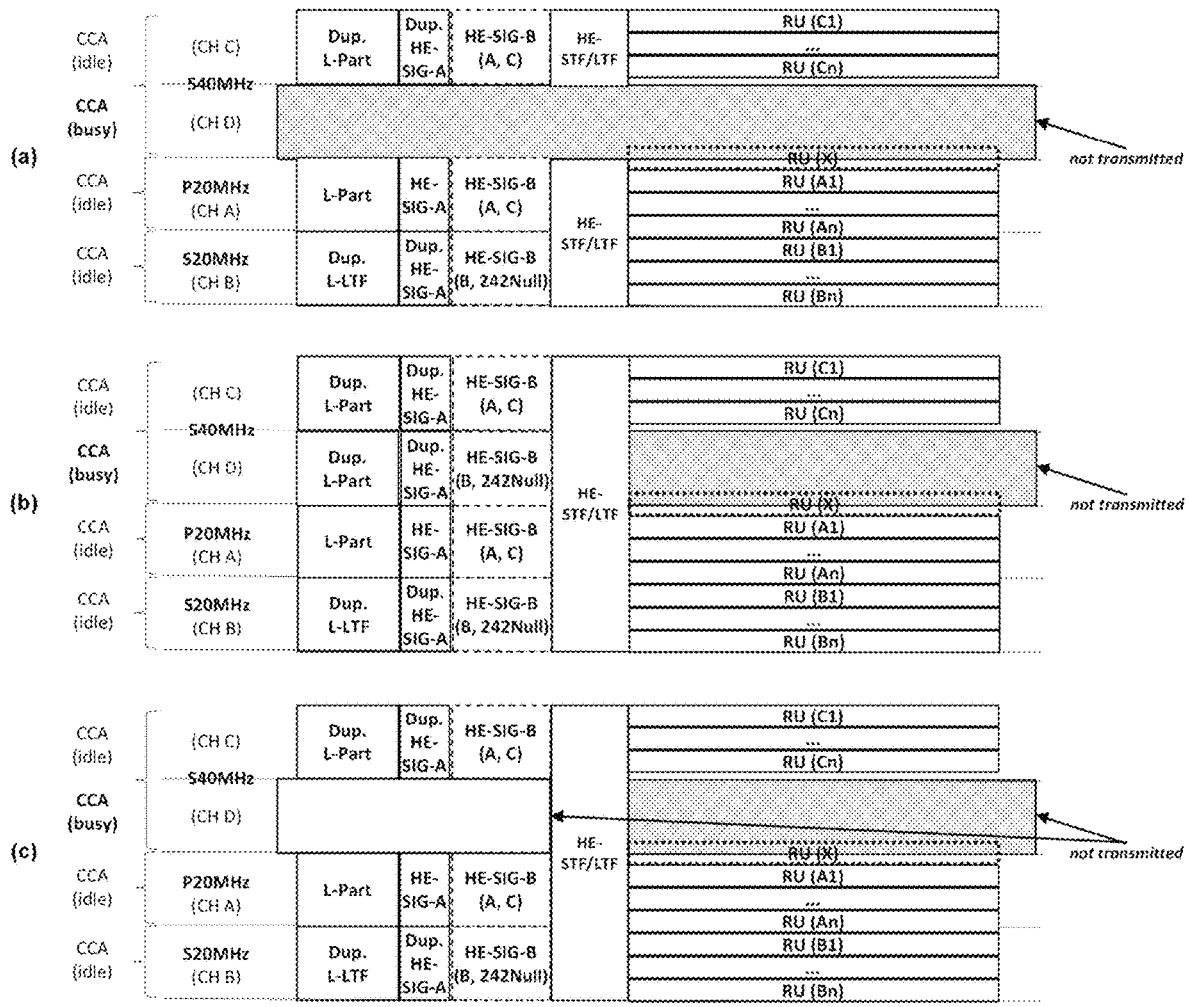

FIG. 42 illustrates a method of transmitting a preamble and data when a non-contiguous PPDU is transmitted according to the embodiment of the present invention. In each embodiment of FIGS. 42(*a*) to 42(*c*), it is assumed that the S40B channel (i.e., channel D) is busy in the total bandwidth of 80 MHz. The terminal transmits a PPDU in a 60 MHz band including the P40 channel and the S40A channel (i.e., channel C).

First, according to the embodiment of FIG. 42(*a*), when transmitting the non-contiguous PPDU, the terminal may not transmit the preamble in addition to the data through the unassigned channel. In this case, the terminal does not transmit both the legacy preamble and the non-legacy preamble through the unassigned channel. In such a case, there is an advantage that no interference may occur to OBSS signal already transmitted through the corresponding channel. In addition, if a transmission is not performed through a specific channel, the dispersion amount of the transmission power is reduced in spite of the transmission of the wideband PPDU, and the reception ratio of the PPDU is increased. However, this method has a disadvantage in that the signaling of the HE-SIG-B becomes complicated when the S20 channel is busy. In addition, while the HE-STF has a repetitive pattern on the time axis when the PPDU is transmitted through a total bandwidth of 80 MHz, it is difficult to have a repetitive pattern on the time axis when the HE-STF is not transmitted on some channels.

Therefore, according to the embodiment of FIG. 42(*b*), when transmitting a non-contiguous PPDU, the terminal may not transmit data but may transmit the preamble through the unassigned channel. In this case, the terminal may transmit both the legacy preamble and the non-legacy preamble through the unassigned channel. In such a case, an interference may occur to OBSS signal already transmitted through the corresponding channel. However, since the transmission power may be dispersed to the entire band in the case of the wideband PPDU transmission, there may be no significant damage to the OBSS signal.

According to yet another embodiment of the present invention, the terminal may transmit only HE-STF and HE-LTF (or only HE-STF) through the unassigned channel as shown in FIG. 42(*c*). That is, a transmission of the legacy preamble, the HE-SIG-A and the HE-SIG-B, of which reception through the entire band is not required, may be restricted and only a transmission of the HE-STF and the HE-LTF, of which reception through the entire band is required, may be performed, thereby minimizing interference to the OBSS signal.

Figure 43:
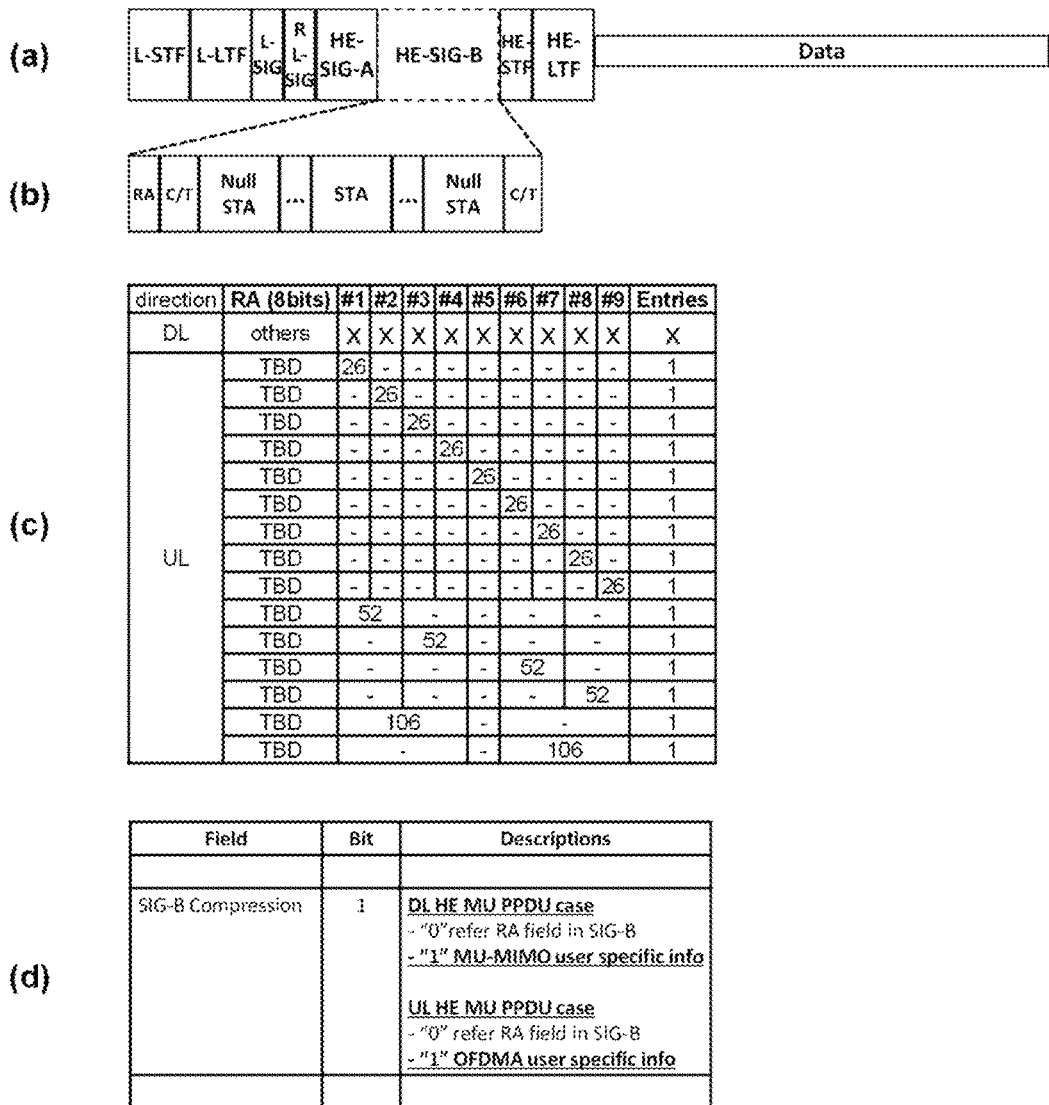
FIGS. 43 to 44 illustrate embodiments in which a transmission using an HE MU PPDU is performed between a single STA and an AP.
Figure 44:
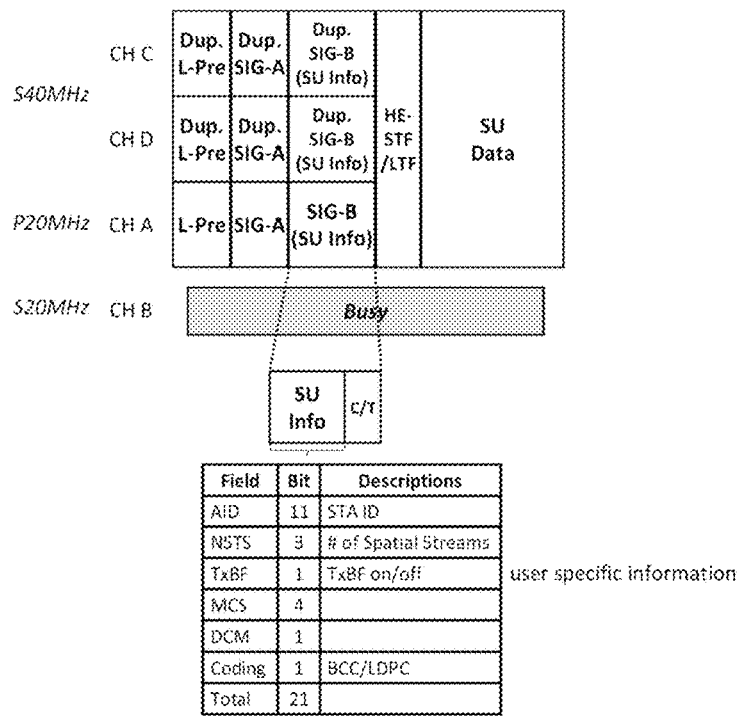

FIGS. 43 to 44 illustrate embodiments in which a transmission using an HE MU PPDU is performed between a single STA and an AP. As described above, the HE MU PPDU may be used not only for a DL-MU transmission but also for an uplink transmission.

FIG. 43 illustrates an embodiment in which an HE MU PPDU is used in an uplink transmission of a single STA. According to the embodiment of the present invention, a STA may perform a transmission using a resource unit of 20 MHz bandwidth or less (i.e., a narrowband) as shown in FIG. 43(*a*). The STA may increase a transmission distance of data by concentrating the transmission power on a specific resource unit. FIGS. 43(*b*) to 43(*d*) illustrate embodiments for signaling such a narrowband transmission.

According to an embodiment of the present invention, the narrowband transmission may be signaled via a null STA ID contained in a user field of the HE-SIG-B, as shown in FIG. 43(*b*). More specifically, the RA field of the HE-SIG-A may indicate information on resource unit partition type in a specific channel. For example, if a bandwidth of 20 MHz is partitioned into nine resource units based on OFDMA, the RA field may signal "00000000" as shown in FIG. 15(*c*). In this case, an AID of a receiver or a transmitter may be contained in a user field corresponding to a resource unit used for an uplink data transmission among the nine partitioned resource units. On the other hand, a null STA ID may be contained in user fields corresponding to the remaining resource units through which data transmission is not performed.

For example, when data is transmitted only through the third 26-tone RU among the nine resource units, a null STA ID may be contained in the first to second user fields and the fourth to ninth user fields. However, if the signaling structure of the HE-SIG-B, which is designed based on the DL-MU transmission, is directly used in the uplink narrowband transmission, the signaling overhead may be increased. Thus, other signaling methods may be used to reduce the signaling overhead. According to another embodiment of the present invention, user fields after a user field in which the AID of the receiver or transmitter is contained may be excluded from the signaling. That is, in the above embodiment, the null STA ID is contained in the first to second user fields, and the AID of the receiver or transmitter may be contained in the third user field. However, the fourth to ninth user fields may not be transmitted. It is because the AP receiving the PPDU does not need to receive additional user fields after obtaining information of the transmitting STA in the third user field.

According to another embodiment of the present invention, index values for the uplink resource unit allocation may be newly defined in the RA field of the HE-SIG-B for the narrowband transmission as shown in FIG. 43(c). More specifically, the RA field of the HE-SIG-B may index a specific 26-tone RU, 52-tone RU and/or 106-tone RU through which an uplink transmission is performed. In this case, since only one user field corresponding to a resource unit indicated by the RA field is carried, the signaling overhead may be greatly reduced. According to an embodiment, index values for the uplink resource unit allocation may be used among unassigned (i.e., TBD) indices of the RA field configuration for the DL-MU transmission. According to another embodiment, the index values for the uplink resource unit allocation may be newly defined in the RA field.

According to yet another embodiment of the present invention, the narrowband transmission may be signaled by recycling unnecessary fields of the HE-SIG-A. For example, if the HE MU PPDU is used in the uplink transmission, the number of HE-LTF symbols field and the number of HE-SIG-B symbols field in the HE-SIG-A may be used for other purposes. Since the number of HE-LTF symbols field has a function redundant with the NSTS field of the user specific field of the HE-SIG-B, no separate signaling is required. Also, in a signaling of a single STA, since the amount of signaling information is fixed and the number of symbols can be fixed according to the design, it is not necessary to indicate the number of symbols separately through the number of HE-SIG-B symbols field. Accordingly, it is possible to perform signaling of the uplink HE MU PPDU using at least one of the above fields. For example, in the resource unit allocation indicated by the RA field, the location of the resource unit through which the STA transmits the uplink data may be indicated using at least one of the above fields. In this case, the RA field of the HE-SIG-B is set to be the same as the conventional one, and the signaling overhead can be reduced since only one user field is carried.

Meanwhile, according to still another embodiment of the present invention, the uplink transmission using the HE MU PPDU may be performed not only through the narrowband but also through the entire bandwidth of 20 MHz, 40 MHz, 80 MHz, or 160 MHz (80+80 MHz). In this case, the bandwidth field of the HE-SIG-A may indicate the total bandwidth of the PPDU, and the SIG-B compression field may indicate the compression mode of the HE-SIG-B field. Therefore, the RA field of the HE-SIG-B may be omitted in an uplink HE MU PPDU. On the other hand, when the SIG-B compression field indicates the compression mode of the HE-SIG-B field in a downlink HE MU PPDU, MU-MIMO based user specific information could be indicated.

However, when the SIG-B compression field indicates the compression mode of the HE-SIG-B field in an uplink HE MU PPDU, OFDMA-based user specific information may be indicated as shown in FIG. 43(c).

FIG. 44 illustrates a method of configuring the HE-SIG-B when a single STA transmits a non-contiguous PPDU to an AP. In the embodiment of FIG. 44, the S20 channel is busy in a total bandwidth of 80 MHz. Therefore, the STA transmits a PPDU in a 60 MHz band including the P20 channel and the S40 channel.

The bandwidth field of the HE-SIG-A defined in the existing HE SU PPDU format is not suitable for signaling a non-contiguous PPDU. Therefore, the STA may perform the transmission of the non-contiguous PPDU using the HE MU PPDU format. In this case, the bandwidth field of the HE-SIG-A indicates puncturing of the S20 channel in the total bandwidth of 80 MHz. The HE-SIG-B carries information of the single STA (i.e., SU Info) through the P20 channel and the S40 channel.

Meanwhile, since the configuration information of the non-contiguous PPDU is signaled via the bandwidth field, the common block field of the HE-SIG-B may be omitted. Therefore, the SIG-B compression field may indicate the compression mode of the HE-SIG-B field. In addition, the user specific field of the HE-SIG-B may carry only one user field. In this case, an AID of a transmitter, not an AID of a receiver, is contained in the user field. When the HE MU PPDU is used for the uplink transmission, it is obvious that the receiver of the corresponding PPDU is an AP. When the UL/DL field of the HE MU PPDU indicates an uplink transmission, the AP may interpret the AID contained in the user field as the AID of the transmitter.

Figure 45:
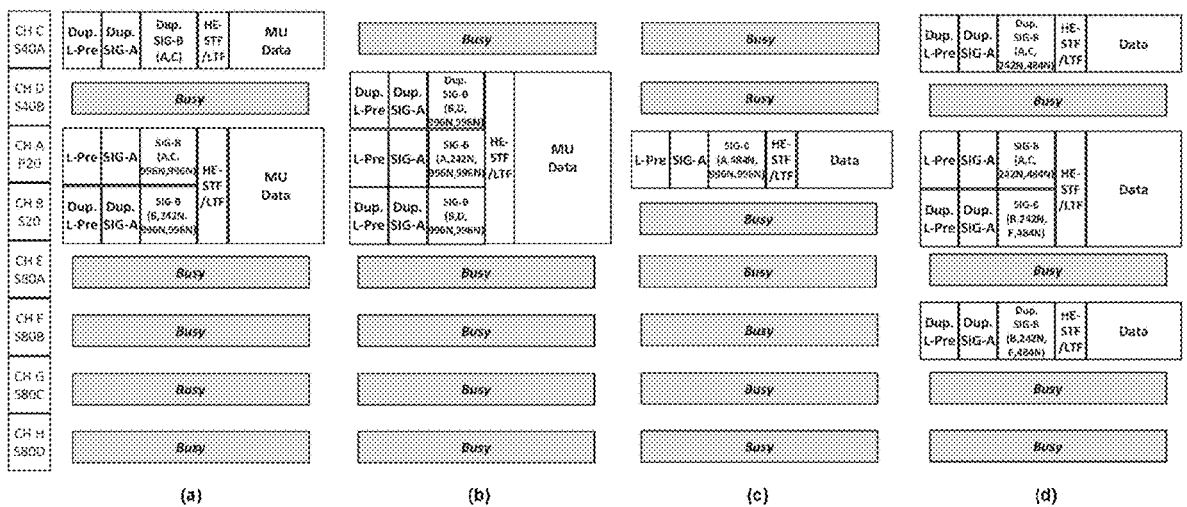
FIGS. 45 to 46 illustrate methods of a non-contiguous channel allocation and a signaling thereof according to additional embodiments of the present invention.
Figure 46:
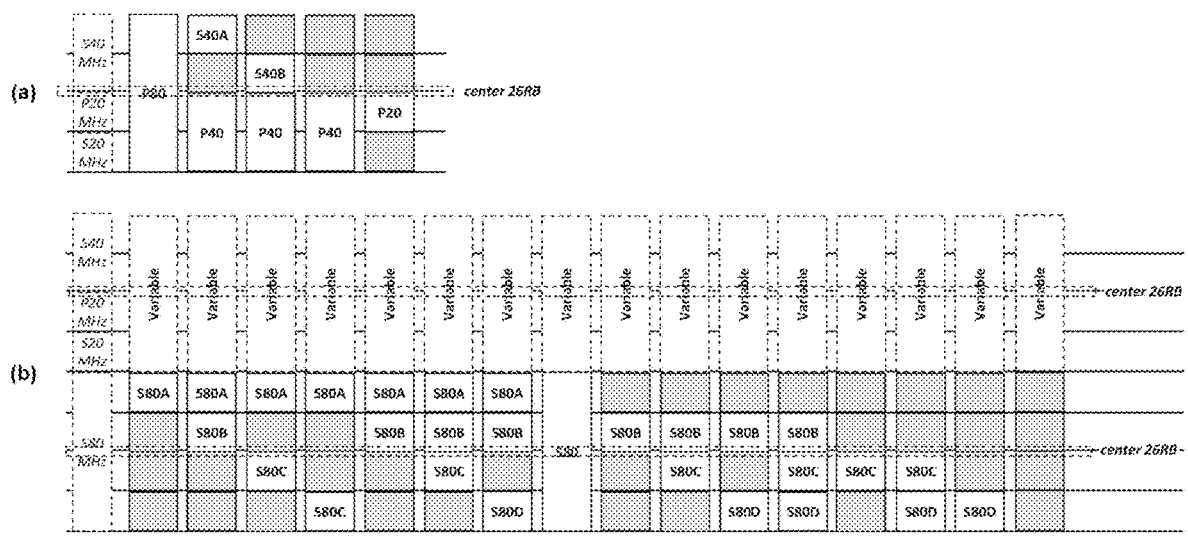

FIGS. 45 to 46 illustrate methods of a non-contiguous channel allocation and a signaling thereof according to additional embodiments of the present invention. As described above, according to an embodiment of the present invention, a wideband PPDU may be transmitted according to a non-contiguous, limited flexible channel extension method.

FIG. 45 illustrates a method of signaling the HE-SIG-A and the HE-SIG-B when a PPDU is transmitted according to a non-contiguous, limited flexible channel extension method. As described above with reference to FIG. 19(e), the flexible channel extension method refers to a channel extension method in which a band occupied by a transmitted PPDU always includes predetermined core channels including the P20 channel. In the embodiment of FIG. 45, the P40 channel including the P20 channel and the S20 channel is set as the core channels. However, the core channels are selected bandwidths to reduce the signaling burden of the HE-SIG-B, and if the signaling burden of the HE-SIG-B is not increased, the core channels can be changed according to the embodiment.

First, FIG. 45(a) illustrates a situation in which the S40B channel and the S80 channel are busy in a total bandwidth of 160 MHz. The terminal transmits a non-contiguous PPDU through a 60 MHz band including the P40 channel and the S40A channel. In this case, the bandwidth field of the HE-SIG-A of the transmitted PPDU may indicate 160 MHz. The HE-SIG-B content channel 1 carries allocation information of channel A and channel C (i.e., A, C, 996-null, 996-null) and is transmitted through channel A and channel C. The HE-SIG-B content channel 2 carries allocation information of CH B (i.e., B, 242-Null, 996-null, 996-null) and is transmitted through channel B.

Next, FIG. 45(b) illustrates a situation in which the S40A channel and the S80 channel are busy in a total bandwidth of 160 MHz. The terminal transmits a non-contiguous PPDU through a 60 MHz band including the P40 channel and the S40B channel. In this case, the bandwidth field of the HE-SIG-A of the transmitted PPDU may indicate 160 MHz. The HE-SIG-B content channel 1 carries allocation information of channel A (i.e., A, 242-Null, 996-null, 996-null) and is transmitted through channel A. HE-SIG-B content channel 2 carries allocation information of channel B and channel D (i.e., B, D, 996-null, 996-null) and is transmitted through channel B and channel D.

Next, FIG. 45(c) illustrates a situation in which a PPDU is transmitted only through the P20 channel in a total bandwidth of 160 MHz. In this case, the bandwidth field of the HE-SIG-A of the transmitted PPDU indicates 160 MHz, and the HE-SIG-B content channel 1 carries allocation information of channel A (i.e., A, 242-Null, 996-null, 996-null). In this case, since the signaling burden of the HE-SIG-B is not increased, it is possible to transmit a PPDU not occupying at least a part of the core channels.

Finally, FIG. 45(d) illustrates a situation in which the S40B channel, the S80A channel, the S80C channel and the S80D channel are busy in a total bandwidth of 160 MHz. The terminal transmits a non-contiguous PPDU through an 80 MHz band including the P40 channel, the S40A channel, and the S80B channel. In this case, the bandwidth field of the HE-SIG-A of the transmitted PPDU may indicate 160 MHz. The HE-SIG-B content channel 1 carries allocation information of channel A and channel C (i.e., A, C, 242-null, 484-null) and is transmitted through channel A and channel C. The HE-SIG-B content channel 2 carries allocation information of channel B and channel F (i.e., B, 242-Null, F, 484-Null) and is transmitted through channel B and channel F.

In the channel allocation information (i.e., A1, A2, A3 and A4) described with reference to the respective drawings, the A1, A2, A3 and A4 denote the first RA field, the second RA field, the third RA field and the fourth RA field which are carried in the HE-SIG-B content channel, respectively. As above, according to the embodiment of the present invention, various non-contiguous PPDUs may be signaled via a combination of the HE-SIG-A and the HE-SIG-B.

FIG. 46 illustrates a channel allocation method when a PPDU is transmitted according to a non-contiguous, limited flexible channel extension method. FIG. 46(a) illustrates options of non-contiguous channel allocation in a total bandwidth of 80 MHz, and FIG. 46(b) illustrates options of non-contiguous channel allocation in a total bandwidth of 160 MHz. In FIG. 46(b), the P80 channel may consist of any one of the channels shown in FIG. 46(a).

The non-assignment information of the S80 channel shown in FIG. 46(b) may be indicated via the RA field of the HE-SIG-B or indicated by the null STA ID of the user field, as described above. In addition, whether the center 26-tone RU shown in FIGS. 46(a) and 46(b) is assigned may be indicated via the C26 field of the HE-SIG-B.

Although the present invention is described by using the wireless LAN communication as an example, the present invention is not limited thereto and the present invention may be similarly applied even to other communication systems such as cellular communication, and the like. Further, the method, the apparatus, and the system of the present invention are described in association with the specific embodiments, but some or all of the components and operations of the present invention may be implemented by using a computer system having universal hardware architecture.

The detailed described embodiments of the present invention may be implemented by various means. For example, the embodiments of the present invention may be implemented by a hardware, a firmware, a software, or a combination thereof.

In case of the hardware implementation, the method according to the embodiments of the present invention may be implemented by one or more of Application Specific Integrated Circuits (ASICSs), Digital Signal Processors (DSPs), Digital Signal Processing Devices (DSPDs), Programmable Logic Devices (PLDs), Field Programmable Gate Arrays (FPGAs), processors, controllers, micro-controllers, micro-processors, and the like.

In case of the firmware implementation or the software implementation, the method according to the embodiments of the present invention may be implemented by a module, a procedure, a function, or the like which performs the operations described above. Software codes may be stored in a memory and operated by a processor. The processor may be equipped with the memory internally or externally and the memory may exchange data with the processor by various publicly known means.

The description of the present invention is used for exemplification and those skilled in the art will be able to understand that the present invention can be easily modified to other detailed forms without changing the technical idea or an essential feature thereof. Thus, it is to be appreciated that the embodiments described above are intended to be illustrative in every sense, and not restrictive. For example, each component described as a single type may be implemented to be distributed and similarly, components described to be distributed may also be implemented in an associated form.

The scope of the present invention is represented by the claims to be described below rather than the detailed description, and it is to be interpreted that the meaning and scope of the claims and all the changes or modified forms derived from the equivalents thereof come within the scope of the present invention.

INDUSTRIAL APPLICABILITY

Various exemplary embodiments of the present invention have been described with reference to an IEEE 802.11 system, but the present invention is not limited thereto and the present invention can be applied to various types of mobile communication apparatus, mobile communication system, and the like.

The invention claimed is:

1. A wireless communication terminal, the terminal comprising:
   a processor, wherein the processor is configured to:
   receive a preamble of a physical layer protocol data unit (PPDU),
   wherein the preamble includes an High Efficiency Signal A (HE-SIG-A) field including a bandwidth field related to bandwidth over which the PPDU is transmitted and an High Efficiency Signal B (HE-SIG-B) field,
   wherein the HE-SIG-B field includes a resource unit (RU) allocation subfield related to allocating a resource unit and a station (STA) identifier (ID) subfield related to a STA to which the resource unit is assigned, and
   receive a data of the PPDU based on the bandwidth field, the RU allocation subfield and the STA ID subfield,
   wherein the data is transmitted in the resource units excluding unassigned resource unit in the bandwidth, and wherein the unassigned resource unit is explicitly indicated with a specific value based on a combination of the bandwidth field, the RU allocation subfield and the STA ID subfield.

2. The wireless communication terminal of claim 1, wherein the bandwidth field is related to a punctured channel in the bandwidth.

3. The wireless communication terminal of claim 1, wherein a specific index value of the RU allocation subfield indicates the unassigned resource unit.

4. The wireless communication terminal of claim 1, wherein the specific value is included in the STA ID subfield.

5. The wireless communication terminal of claim 1, wherein the unassigned resource unit is a resource unit that is not allocated to any user.

6. The wireless communication terminal of claim 1, wherein the HE-SIG-B field further includes C26 field indicating whether a center 26-tone resource unit of 80 MHz is assigned to a user, when the bandwidth is 80 MHz or more.

7. The wireless communication terminal of claim 6, wherein the HE-SIG-B field comprises HE-SIG-B content channel 1 and HE-SIG-B content channel 2 in units of 20 MHz, and
wherein the C26 field is carried in both the HE-SIG-B content channel 1 and the HE-SIG-B content channel 2.

8. The wireless communication terminal of claim 7, wherein both of a C26 field carried in the HE-SIG-B content channel 1 and a C26 field carried in the HE-SIG-B content channel 2 indicate whether the center 26-tone resource unit in the bandwidth of 80 MHz is assigned to the user, when the bandwidth is 80 MHz.

9. A wireless communication method of a wireless communication terminal, the method comprising:
receiving a preamble of a physical layer protocol data unit (PPDU),
wherein the preamble includes a High Efficiency Signal A (HE-SIG-A) field including a bandwidth field related to bandwidth over which the PPDU is transmitted and a High Efficiency Signal B (HE-SIG-B) field,
wherein the HE-SIG-B field includes a resource unit (RU) allocation subfield related to allocating a resource unit and a station (STA) identifier (ID) subfield related to a STA to which the resource unit is assigned;
receiving a data of the PPDU based on the bandwidth field, the RU allocation subfield and the STA ID subfield,
wherein the data is transmitted in the resource units excluding unassigned resource unit in the bandwidth, and
wherein the unassigned resource unit is explicitly indicated with a specific value based on a combination of the bandwidth field, the RU allocation subfield and the STA ID subfield.

10. The wireless communication terminal of claim 9, wherein the bandwidth field is related to a punctured channel in the bandwidth.

11. The wireless communication terminal of claim 9, wherein the specific value is included in the STA ID subfield.

12. The wireless communication terminal of claim 9, wherein a null STA ID of the STA ID subfield indicates the unassigned resource unit.

13. The wireless communication terminal of claim 9, wherein the unassigned resource unit is a resource unit that is not allocated to any user.

14. The wireless communication terminal of claim 9, wherein the HE-SIG-B field further includes C26 field indicating whether a center 26-tone resource unit of 80 MHz is assigned to a user, when the bandwidth is 80 MHz or more.

15. The wireless communication terminal of claim 14, wherein the HE-SIG-B field comprises HE-SIG-B content channel 1 and HE-SIG-B content channel 2 in units of 20 MHz, and
wherein the C26 field is carried in both the HE-SIG-B content channel 1 and the HE-SIG-B content channel 2.

16. The wireless communication terminal of claim 14, wherein both of a C26 field carried in the HE-SIG-B content channel 1 and a C26 field carried in the HE-SIG-B content channel 2 indicate whether the center 26-tone resource unit in the bandwidth of 80 MHz is assigned to the user, when the bandwidth is 80 MHz.

\* \* \* \* \*